United States Patent [19]

Eisenberg et al.

[11] Patent Number: 5,890,166
[45] Date of Patent: Mar. 30, 1999

[54] VERSIONED-DATABASE MANAGEMENT SYSTEM IN WHICH TASKS ARE ASSOCIATED WITH PROMOTE GROUPS WHICH COMPRISE A SET OF PARTS WHOSE CHANGES ARE TO BE PROMOTED

[75] Inventors: Neal Richard Eisenberg, San Jose; Robert Louis Huddleston, Sunnyvale; John Marland Garth, Gilroy; Mary Claire Lehner, San Jose; Charles Siegfried Tribolet, Morgan Hill, all of Calif.

[73] Assignee: International Business Machines Corporation, Armonk, N.Y.

[21] Appl. No.: 378,311

[22] Filed: Jan. 25, 1995

Related U.S. Application Data

[63] Continuation of Ser. No. 916,329, Jul. 16, 1992, abandoned.
[51] Int. Cl.⁶ ....................................................... G06F 7/00
[52] U.S. Cl. ............................................................. 707/203
[58] Field of Search ................................... 395/600, 650, 395/700, 712; 364/943.5, 940, 962, 962.1, 962.3; 707/203, 1–10, 100–104

[56] References Cited

U.S. PATENT DOCUMENTS

| | | | |
|---|---|---|---|
| 4,951,192 | 8/1990 | Chase, Jr. et al. | 395/706 |
| 5,339,435 | 8/1994 | Lubkin et al. | 395/712 |
| 5,357,631 | 10/1994 | Howell et al. | 707/203 |
| 5,363,505 | 11/1994 | Maslak et al. | 395/670 |
| 5,535,386 | 7/1996 | Wang | 395/600 |

OTHER PUBLICATIONS

"IBM Configuration Management Version Control Concepts", International Business Machines Corporation (Jun., 1993), pp. iii–86.

*Database System Concepts*, H.F. Korth, et al., 1986, Chapter 2, pp. 21–44.

"ISPF/PDF Software Configuration and Library Manager (SCLM) Guide and Reference," Version 3 Release 4 for MVS, IBM Publication SC34–4254–02.

Feiler, "Configuration Management Models in Commercial Environments," Technical Report CMU/SEI–01–TR–7, ESD–91–TR–7, Mar. 1991, Software Engineering Institute, Carnegie Mellon University, Pittsburgh, PA 15213.

"Using Integrated IBM AIX CMVC Client/6000 On IBM AIX SDE WorkBench/6000", SC09–1434–00, First Edition (May 1992), International Business Machine Corporation, Armonk, New York.

(List continued on next page.)

*Primary Examiner*—Alvin E. Oberley
*Assistant Examiner*—St. John Courtenay, III
*Attorney, Agent, or Firm*—Baker Maxham Jester & Meador

[57] ABSTRACT

A versioned-data management system (VDMSMS) is provided with a method for determining candidates for promotion in association with a user task. The VDMS maintains a list of parts changed as a result of a user task, referred to as a promote group. Before performing any changes the user informs the VDMS which user task is to be associated with the changes. All parts subsequently changed are automatically placed by the VDMS in the promote group associated with the given user task. When the parts associated with a user task for a given variant level are promoted, an iterative process is performed to determine the complete set of parts that must be promoted in support of the requested promote. Initially the set includes those parts in the promote group at the given variant level. Then all the other promote groups are searched to determine whether they contain any of the parts at the given variant level that are already in this set. For any that do, the parts in those promote groups for the given variant level are added to the set of parts to be promoted.

10 Claims, 11 Drawing Sheets

OTHER PUBLICATIONS

"IBM AIX Configuration Management Version Control/6000 Commands Reference", SC09–1446–00, First Edition (May 1992), International Business Machines Corporation, Armonk, New York.

"IBM Configuration Management Version Control Administration and Installation", SC09–1431–01, (1992), International Business Machines Corporation, Armonk, New York.

"Introducing IBM Configuration Management Version Control Products", GC09–1435–02, (1992), International Business Machines Corporation, Armonk, New York.

"Using IBM Configuration Management Version Control Clients for Sun and HP", SC09–1518–01, Second Edition (Dec. 1992), International Business Machines Corporation, Armonk, New York.

BLOCK DIAGRAM OF TYPICAL COMPUTER SYSTEM

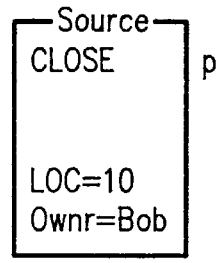
REPRESENTATION OF A PART IN AN INSTANCE DIAGRAM
*FIG. 2*
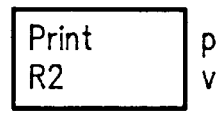
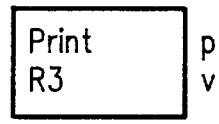
REPRESENTATION OF VARIANTS IN AN INSTANCE DIAGRAM
*FIG. 3*
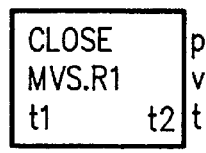
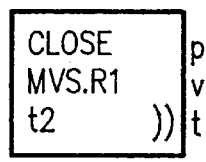
REPRESENTATION OF EFFECTIVE TIME VARIANTS IN AN INSTANCE DIAGRAM
*FIG. 4*

REPRESENTATION OF REVISIONS IN AN INSTANCE DIAGRAM

EXAMPLE OF A DERIVATION GRAPH

COMPONENTS OF AN ENTITY INSTANCE KEY

COMPONENTS OF A RELATIONSHIP INSTANCE KEY

EXAMPLE OF SEARCH PATHS

A VARIANT HIERARCHY FOR A VARIANT DOMAIN

VARIANT HIERARCHIES FOR THE PAY, COM, AND INV VARIANT DOMAINS

| Map1 | (U,P) | Com.00.Pro | Inv.R1.Pro |
| Map2 | (U,U) | Com.00.Pro | Inv.R1.&u |
| Map3 | (U,P) | Com.00.Pro | |
| Map4 | (U,P) | Com.00.Adm | |

TWO VARIANT HIERARCHIES WITH VARIANT MAPS

```
Map1   (U,P)  Pay.R1.Pro   Com.00.Pro
Map2   (U,P)  Pay.R1.Fix   Com.00.Pro
Map3   (U,P)  Pay.R1.Tst   Com.00.Pro
Map4   (U,U)  Pay.R1.&u    Com.00.Pro
Map5   (U,P)  Pay.R2.Pro   Com.00.Pro
Map6   (U,P)  Pay.R2.Tst   Com.00.Pro
Map7   (U,U)  Pay.R2.&u    Com.00.Pro
Map8   (U,P)  Inv.R1.Pro   Com.00.Pro
Map9   (U,P)  Inv.R1.Tst   Com.00.Pro
Map10  (U,U)  Inv.R1.&u    Com.00.Pro
Map11  (U,P)  Com.00.Pro
Map12  (U,P)  Com.00.Tst
Map13  (U,P)  Com.00.Adm
Map14  (R,U)  Com.00.Tst   Pay.R1.Pro  Inv.R1.Pro
Map15  (R,U)  Com.00.Adm   Pay.R1.Pro  Inv.R1.Pro
```

VARIANT MAP EXAMPLE

*FIG. 13*

```
Map1  (U,P)  Pay.R1.Pro   Com.00.Pro   Inv.R1.Pro
Map2  (U,P)  Pay.R1.Fix   Com.00.Pro   Inv.R1.Pro
Map3  (U,P)  Pay.R1.Tst   Com.00.Tst   Inv.R1.Tst
Map4  (U,U)  Pay.R1.&u    Com.00.Adm   Inv.R1.&u
Map5  (U,P)  Pay.R2.Pro   Com.00.Pro   Inv.R1.Pro
Map6  (U,P)  Pay.R2.Tst   Com.00.Tst   Inv.R1.Tst
Map7  (U,U)  Pay.R2.&u    Com.00.Adm   Inv.R1.&u
Map8  (R,U)  Pay.R1.Pro   Com.00.Tst   Inv.R1.Pro
Map9  (R,U)  Pay.R1.Pro   Com.00.Adm   Inv.R1.Pro
```

ANOTHER WAY TO DEFINE VARIANT MAPS

*FIG. 14*

PROCEDURE FOR GROUPING UPDATES

PROCEDURE FOR GROUPING UPDATES

VDMS CHANGE SUBPROCESS

VDMS PROMOTE SUBPROCESS

VERSIONED-DATABASE MANAGEMENT SYSTEM IN WHICH TASKS ARE ASSOCIATED WITH PROMOTE GROUPS WHICH COMPRISE A SET OF PARTS WHOSE CHANGES ARE TO BE PROMOTED

This application is a continuation of application Ser. No. 07/916,329, filed Jul. 16, 1992 in the name of the present inventors, now abandoned.

FIELD OF THE INVENTION

This invention relates in general to computer database management systems, and in particular to a database management system which manages multiple versions of data.

BACKGROUND OF THE INVENTION

Modern computer installations generate, manipulate, and store enormous quantities of data. Data base management systems have emerged as an indispensible component of such installations, serving the purpose of promoting efficient data storage and program design, enhancing file maintenance and modification, and eliminating data redundancy. The typical data base management system (DBMS) includes programs which interface with designers and users, accept and understand models or tables for subsequent use in organizing data, organize data according to the models or tables, store and retrieve the data in the actual data base contained in a computer storage subsystem. perform queries on the data, and generate reports based on the stored data.

A DBMS may be designed to store data according to any of a variety of data models, where the data model is the basic organizational concept for the underlying data base. These models, or schemes, for data base organization can be divided into several different classes, including hierarchical, network, relational, and entity-relationship. A detailed discussion of these types of data-bases may be found in "The Database Book," by Mary E. S. Loomis, Macmillan Publishing Company New York, N.Y. 10022 (1987). The present invention is applicable to all of the above data-base schemas. The preferred embodiment is described with particular reference to the entity-relationship modelling methodology provided by the Repository Manager/MVS product, which uses the DB2 relational DBMS as a back end to manage the storage and retrieval of data on the computer hardware. Entity-relationship databases are discussed in "The Entity-Relationship Model—Towards a Unified View of Data," by Peter Chen, ACM Trans. on Data Base Systems, Vol. 1 (1976). Relational data-bases and DB2 in particular is discussed in "IBM Database 2: General Information," IBM Publication GC26-4373 (1990). The Repository Manager/ MVS product is discussed in "Repository Manager: Concepts and Facilities," IBM Publication SR21-3608 (1990).

A significant problem in maintaining any data base whose data entries represent objects, events, people, or relationships in the real world, is that although those things may change over time, the typical DBMS maintains only a single version of any given entry, making it impossible to concurrently represent a thing in its past, present, and future states. A second significant problem, which arises in maintaining a data base which is shared among a plurality of users, involves the toleration of concurrent but independent work on the same data entries by different users without sacrificing the semantic consistency of the data. Yet a third problem in maintaining a data base involves maintaining a record of the state of the data base itself as it existed at given times in the past. Such information is often needed for error recovery and for audit-trail purposes. Typical solutions to this problem involve taking "snapshots" of the data base and logging change activity, so that if necessary the data base can be "reconstructed" as it existed at some point in the past. This reconstruction is usually a time-consuming batch procedure, and a system so constructed cannot allow the past and current data bases to be accessed concurrently.

A solution to all of these problems is to maintain versions of the data entries. These versions may correspond to the different states of the real-world things represented, or to work in progress by different users. Such an approach is called versioning, and in general requires that the DBMS control the creating of the versions and all access to them, both to assure the semantic consistency of the data in all its versions, and to free users from the need to deal with the additional complexity that such a versioning scheme requires. Users of non-versioned data base systems sometimes simulate versioning by giving qualified names to the data base entries. However, this approach is undesirable, because it conceals from the DBMS the true identity of the things represented, and makes it impossible for the DBMS to verify the semantic consistency of the data base.

The generally preferred approach to implementing versioning is to provide direct versioning of entries in the DBMS, with the versioning managed by the DBMS to preserve the semantic validity of the data in the system. Such a system provides both parallel and serial versioning, with the capability for the user to define a hierarchy of versions, and to direct the DBMS to move versions of data from one hierarchy level to another. It also provides historical versioning of the database, allowing the user to view the data as it existed at any arbitrarily-selected time in the past. It provides a simplified programming interface that allows a user tool to interact with the data as though it were not versioned, the specification of which version is seen being made outside the program.

In a versioned-data management system (VDMS) environment, all the changes associated with a given user task are tightly coupled in the sense that subsequent access applies either to all of the changes or none of them. A consequence of this tight coupling is that all the changes associated with a given user task must be promoted at the same time. However, these changes typically involve more than one part in the VDMS and may have been performed by more than one tool. Since multiple tools may have been involved, having each tool maintain a list of what parts were changed would not be sufficient. The user would be forced to remember all the tools involved and then combine the lists. In addition, each tool may use a different means to maintain its list, thus complicating the job of combining the lists. To complicate matters further, a change to one part may cause the VDMS to trigger a change to other parts. Such a situation can occur in an entity-relationship VDMS, where the delete of an entity results in all relationships that pointed to the entity also being deleted. In this case, expecting the tool to maintain a change list is untenable, because the tool cannot be aware that other parts were also changed and hence would fail to include them on its list of changed parts. Yet another complication arises where a user makes changes to parts, promotes them, and then makes a subsequent change. The affected parts will show up more than once in the promote group, once at the higher variant level as the result of the promote of the part to the higher variant level, and once more at the leaf variant level as a result of the subsequent change at the leaf variant level. A tool maintaining the list of changed parts would have to be aware that multiple versions of a part exist at the same time. Tools known in the art are not aware that multiple versions exist. Providing the needed changes to these tools to be aware of multiple versions is costly and not desirable.

Heretofore, the known method for solving the above problems has been to design tools that are aware not only of the parts themselves, but also of the different versions of those parts. However, this solution is itself undesirable because of the complex design requirements it places on every tool provided for the VDMS.

SUMMARY OF THE INVENTION

In accordance with the present invention, a versioned-data management system is provided with a method for determining candidates for promotion in association with a user task. The VMDS maintains the list of parts changed as a result of a user task. This list is referred to as a promote group, because it contains a list of parts that are to be promoted together. For each user task there is an associated promote group.

Before performing any changes the user informs the VDMS which user task is to be associated with the changes. All parts subsequently changed are automatically placed by the VDMS in the promote group associated with the given user task. This may include parts explicitly changed by the various tools as well as any triggered changes performed by the VDMS. The specification of the part in the promote group includes its variant level. Hence, a part may appear multiple times in the promote group, each with a different variant level.

When a promote is performed, the VDMS updates the promote group to indicate the new variant level for the part. When the parts associated with a user task—a single promote group—for a given variant level are promoted, an iterative process is performed to determine the complete set of parts that must be promoted in support of the requested promote. Initially the set includes those parts in the promote group at the given variant level. Then all the other promote groups are searched to determine whether they contain any of the parts at the given variant level that are already in this set. For any that do, the parts in those promote groups for the given variant level are added to the set of parts to be promoted. This determination is continued for any additional parts added to the set until there are no parts in the set that exist at the given variant level in any promote group that was not included in the set. The set of promote candidates now being complete, the promotion of the entire set may occur.

BRIEF DESCRIPTION OF THE DRAWINGS

FIG. 2 is a block diagram representation of a part in an instance diagram.

FIG. 3 is a block diagram representation of variants in an instance diagram.

FIG. 4 is a block diagram representation of effective time variants in an instance diagram.

FIG. 13 is a diagrammatic representation of a variant map example.

FIG. 14 is a diagrammatic representation of another way to define variant maps.

DETAILED DESCRIPTION OF THE INVENTION

1.0 GLOSSARY OF TERMS

Figure 1:
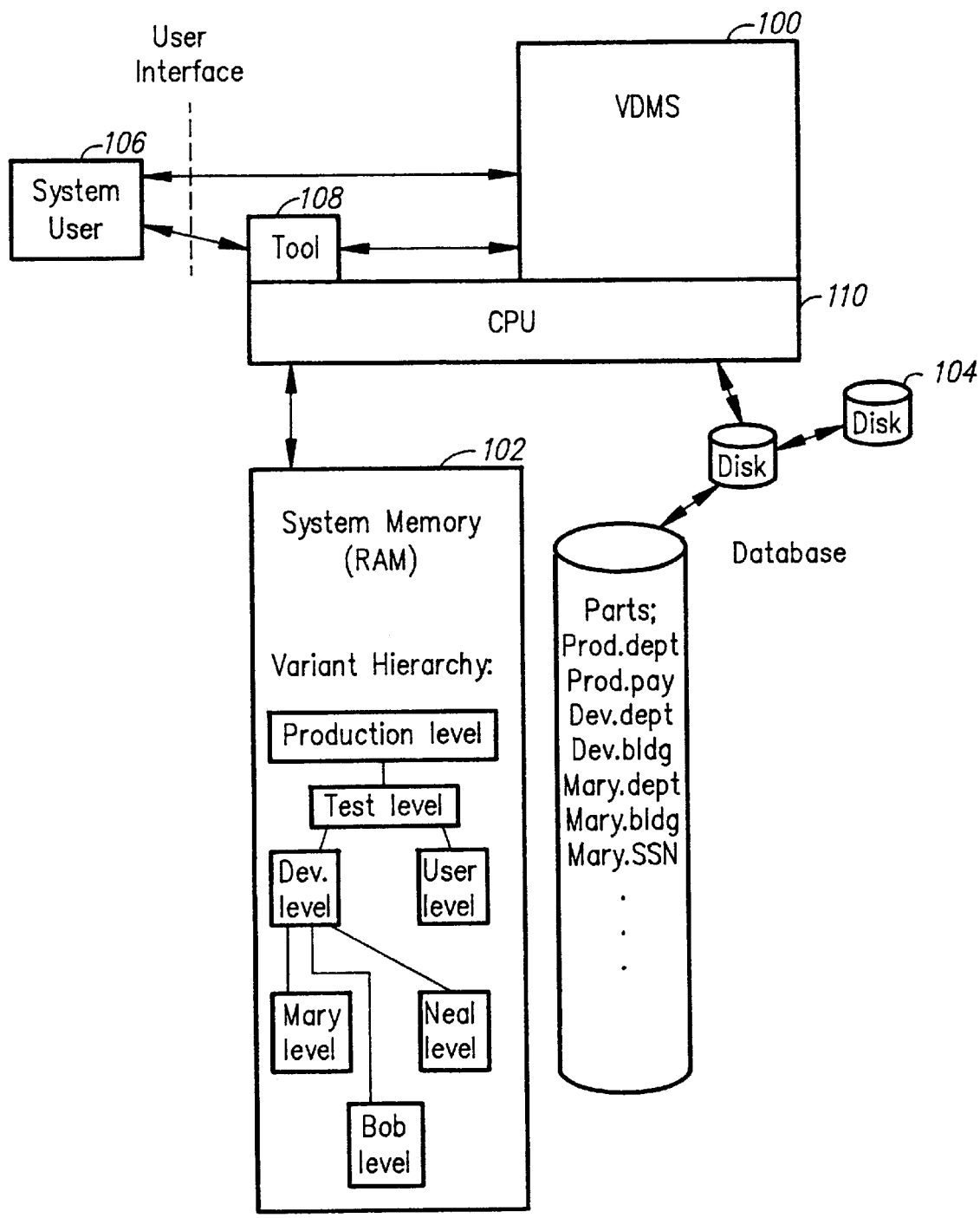
FIG. 1 is a block diagram illustrating the components of a computer system for use in conjunction with the present invention.

To facilitate understanding the present invention and the versioning architecture in which it is implemented, the following glossary of terms is provided. It is to be noted that terms used in the specification but not included in this glossary are considered as defined according the normal usage of the computer science art, or alternatively according to normal dictionary usage.

active revision. A revision which is still allowed to undergo changes. Changes to the revision are made in place, i.e. without causing a new revision to be created. All revisions are either active or frozen.

active version. A version which is still allowed to undergo changes. Changes to the version are made in place, i.e. without causing a new version to be created. All versions are either active or frozen.

add. A request to a VDMS to create a new part. The part must not have been visible from the view of data of the requestor.

alternate search path. Any search path that is based on an alternate variant hierarchy and hence can be used only for retrievals of data in the repository, not for changes to that data.

alternate variant hierarchy. Any variant hierarchy for a variant domain other than its primary variant hierarchy. Search paths based on an alternate hierarchy can be used to retrieve repository data, but not to perform changes to it.

attribute. A value associated with an entity. Each entity type has associated one or more attributes. Some E/R systems also permit relationship types to have attributes. An attribute is analogous to a field in a record or a column in a relational table.

branch. The subset of a variant hierarchy that is obtained by starting at a leaf node and traversing the hierarchy from the leaf node to its parent, then to its parent's parent, and so forth, up to and including the root node of the hierarchy.

cardinality. A constraint that determines for a given relationship type how many connections may be made between sources and targets.

There are the following four cardinalities:

1 to 1 (1-1)-using the relationship type a given source may be connected to only a single target and that single target may have no other sources.

1 to many (1-m)-using the relationship type a given source may be connected to one or more targets where each of the targets may have no other sources.

many to 1 (m-1)-using the relationship type one or more sources may be connected to a single target and where no other the sources may be connected to any other target.

many to many (m-m)-using the relationship type one or more sources may be connected to one or more targets. With many to many there are no restrictions as to how parts are connected.

change. The alteration of existing data or the creation of new data. The alteration is the result of an add, update, or delete request. Other requests may be provided by the data management system that result in a change.

A change can be the result of an explicit request or it may be a triggered change that was performed automatically by the data management system as the result of another change.

commit. Actually applying to the repository a set of changes. Changes are not visible to other users until they have been committed. After requesting a set of changes the user can request to either have changes committed or to have the changes undone (called a restore).

commit scope. The commit scope is the time between the first alteration to repository data following a prior commit or restore (or the start of the repository session if there were no prior commits or restores) and the subsequent commit or restore.

context. A context is a permanently stored named collection of values for environmental variables that govern the processing of the VDMS. At any given time each session is using one particular context, with that context being called the current context. For those values that are not specified on add, update, or delete request the value in context is used, i.e. the context value serves as a "default" value.

controlling relationship. A relationship which if deleted causes, based on the definition of the relationship type, its source, target, or both to also be deleted. This is an example of a triggered change.

current revision. A revision whose revision end time is logically infinity. A current revision may be either active or frozen. All revisions that are not current must be frozen.

current version. A version whose contents represent the current time, i.e. a version that is not an historical record of the past. A current version may be either active or frozen. All versions that are not current must be frozen.

data integrity. The syntactic and semantic integrity provided by a VDMS. For an E/R VDMS this might include referential integrity, relationship semantics (cardinality, mandatory, and controlling), and constraint checking.

default variant domain. The current context contains a default variant domain for each variant default group. When a new part is added without explicit indication into which variant domain to place the part, the part is placed in the default variant domain for the variant default group that contains the part type.

delete. A request to a VDMS to remove an existing part. The part must have been visible from the view of data of the requestor.

delete propagation. A set of triggered changes (all deletes) that occurs as the result of a delete request due to referential integrity enforcement or controlling relationships.

derivation graph. A directed acyclic graph which indicates what version or versions a given version is derived from. Any version can be derived from 0 or more versions and can have 0 or more versions derived from it. No version can be derived either directly or indirectly from itself.

dependent entity. An entity that is the target of an owning relationship.

directed acyclic graph. An arrangement of nodes and connecting branches which may fork in the direction of travel, but may never loop back on itself. There is not necessarily a common ancestor. There may be more than one path between two nodes.

See also "hierarchy" and "network." All hierarchies are also directed acyclic graphs, but not all directed acyclic graphs are hierarchies. All directed acyclic graphs are also networks, but not all networks are directed acyclic graphs.

Following is an example of a directed acyclic graph:

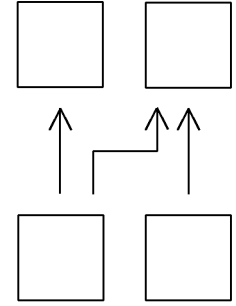

drawdown. The creation of a version at the working variant level, when one did not already exist at that level, that is a copy (except for values that identify which version) of the first version that physically exists higher in the search path.

A drawdown may be done either explicitly or implicitly. A drawdown is done implicitly in logical mode when there is a request to add, update, or delete a part. In this case a drawdown is first done implicitly and then the requested change is made to the version that was just drawn down to the working variant level.

drawdown-from identifier. The last-change identifier of the version which was the source of the drawdown. The drawdown-from identifier is set in the resultant version at the time of the drawdown.

effective time versioning. An implementation of the basic versioning mechanisms in which variants represent states of a part effective at different periods in time.

Each variant has an attribute for storing the point in time at which the variant becomes effective, and an attribute for storing the point in time at which it ceases to be effective. The effective time is also known as the variant time.

entity. A part that represents a thing, such as an enterprise model process or a source program. In an E/R versioned-data management system parts are either entities or relationships.

frozen revision. A revision which is no longer allowed to be changed. Changes to the revision will cause a new active revision to be created. All revisions are either active or frozen.

frozen version. A version which is no longer allowed to be changed. Changes to the version will cause a new active version to be created. All versions are either active or frozen.

hierarchy. An arrangement of nodes and connecting branches which never forks in the direction of travel, though two paths going in the same direction may merge together. Eventually all paths come together at a common (root) node. There is exactly one path between any two nodes.

Also known as a tree.

See also "directed acyclic graph" and "network." All hierarchies are also directed acyclic graphs, but not all directed acyclic graphs are hierarchies. All hierarchies are also networks, but not all networks are hierarchies.

Following is an example of a hierarchy:

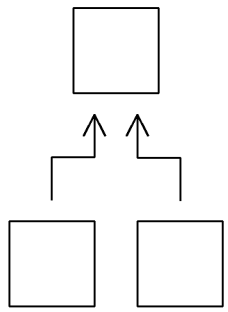

higher. That portion of a hierarchy (or branch) from, but not including, a given node through and including the root node.

independent change. In a versioned-data management system when two users, without knowledge of the other change, change the same part so that the two changes are applied to different versions of the part. An attempt to promote the two changes to a common version requires a reconciliation of the two changes, to prevent the second promote from unintentionally overlaying the change associated with the first promote.

instance. This is the same as "version."

instance key. The full key that identifies a particular instance (version) of a part.

inverse relationship. A relationship that connects the same source and target as another relationship but goes in the opposite direction. The source of the inverse relationship is the target of the other relationship and the target of the inverse relationship is the source of the other relationship.

last-change identifier. An identifier, which could be implemented as a timestamp, of the last change to a variant of a part. The identifier is set to a value that has not yet been used for changes to the part. The identifier is set as a result of an add, update, or delete. It is not set as a result of a variant being promoted.

lifetime ID. An identifier associated with a part whose value has not been previously used for any other current version of the part. A lifetime ID is assigned to a part when the part is created as a result of an add request. The lifetime ID remains unaltered when a part if changed as a result of an update or delete request. The lifetime ID is stored in the versions of a part.

logical delete. An indication, via a flag in a version of the part, that the part is to be considered to have been deleted. A delete request causes a logical delete. A Logical delete is required to prevent other versions of the part, such as those higher in the search path, from being accessed.

logical relationship. These are the normal relationship types. They logically connect one source part to one target part. Updating a source or target part, even if it causes the creation of a new version, does not change which logical relationships point to that source or target. A new part created via an add is born with no logical relationships pointing to it. Logical relationships have their own versioning, which need not be the same as the versioning of the source or target.

lower. That portion of a hierarchy (or branch) from, but not including, a given node through and including the leaf node.

mandatory relationship. A constraint where if a part has an associated mandatory relationship then the part cannot exist without the relationship also existing. Since the relationship cannot be added until after the part is added this constraint is not enforced immediately, but is instead enforced when the data is committed.

network. An arrangement of nodes and connecting branches which may loop back on itself. There may be more than one path between nodes.

See also "directed acyclic graph" and "hierarchy." All directed acyclic graphs are also networks, but not all networks are directed acyclic graphs. All hierarchies are also networks, but not all networks are hierarchies.

Following is an example of a network:

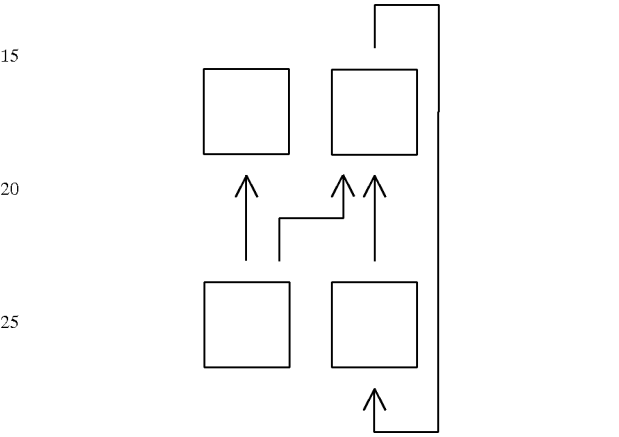

old tool. A tool that was written against a data management system that does not support versions of the data. These tools assume that the repository contains only a single version for each part.

ordered relationship. A relationship where the order in which the relationship parts are accessed is user determined. For a relationship that is not ordered the order is system determined, usually by a collating sequence on the relationship part key.

owning relationship. A relationship that is both mandatory and controlling on its target and where the part key of the target contains as a prefix the part key of its parent. The target must be an entity and is called a dependent entity.

overlap. When used in reference to the variant or revision time cursors, an instance is said to overlap the variant/revision time cursor if the following is true:

(instance start time less than cursor end time OR
instance start time less than or equal cursor start time)
    AND
instance end time greater than cursor start time parallel versioning. Use of a version or set of versions of a part to maintain more than one active state of the same part at one time. Each active state may be operated on independently by actions such as Update and Delete.

A parallel version or set of versions may be created to represent differences in the target environment, differences from model to model, differences from release to release, differences from one period of time to another, differences from user to user, etc.

Parallel versions may be ordered or unordered with respect to each other.

Parallel versioning is represented by variants.

part. An entity or a relationship.

A part may have many versions which represent different states of the part.

part key. That which identifies a particular part among all the parts of the same part type.

physical relationship. These are special relationship types used for purposes such as maintaining derivation history. They connect one source version to one target version. They are not versioned.

primary variant hierarchy. The one variant hierarchy for a given VDMS installation whose search paths can be used to perform changes to the data in the repository.

promote. Changing the variant ID of a version of a part to the variant ID that is one element higher in the variant hierarchy. If a variant already existed at the higher level it is replaced. A previous request to change a variant that was at a level other than the working variant level caused the changes to be applied to a new variant at the working variant level. By using promote the change can be moved up the variant hierarchy until it applies to the variant against which the original change was requested.

A promote can be either a PROMOTE_NORMAL or a PROMOTE_FORCE.

PROMOTE_FORCE. A form of promote where the requester has acknowledged that reconciliation has been performed as a result of a previous independent change. The promote will fail if a subsequent promoted independent change occurred.

promote group. A named group of instances related to some user task, such as a fix to a given programming error. The purpose of the promote group is to make it easier to promote all such related instances together. At any given time there is a current promote group per session. All operations that cause an instance to be altered cause the instance to be added to the current promote group if it is not already in the group.

PROMOTE_NORMAL. The initial promote that is attempted when doing a promote. The promote will fail if a promoted independent change occurred since the time of the initial draw down.

referential integrity. Referential integrity refers to the enforcement by an E/R VDMS of the restriction that a relationship instance can only exist if both its source and target instances exist. If the source or target of a relationship is deleted then the relationship is also deleted. This is an example of a triggered change.

relationship. A part that represents a connect between two other parts, where the other parts could be an entity or another relationship. Each relationship is directional where the starting part being connected is called the source and the terminating part being connected is called the target. In an E/R versioned-data management system, parts are either entities or relationships.

repository. This refers to either the place where a data management system stores its data or to the data itself.

restore. Undoing a set of changes. After requesting a set of changes the user can request to either have the changes applied (commit) or have the changes undone.

resultant version. In a versioned-data management system an add, update, or delete request can cause the change to be applied either directly to the original version or cause a drawdown of the original version to a new version at the working variant with the change applied to the new version. The version that actually gets the change applied is the resultant version.

retrieval. A request to a VDMS to read the contents of an existing part. The part must be visible from the view of data of the requestor.

revision. A version which is organized serially with respect to other revisions in a set. (The set is called a variant.) Revisions are sequentially ordered in time such that there is exactly one "current" revision in any set. They represent historical states of a part. Because they represent an online historical record, no revision can ever be changed once work on it has been completed. A user request to update versioned data for a frozen revision of a part will result in the automatic creation of a new "current" revision.

revision key. That which identifies a particular revision among all the revisions of a variant.

revision time. The time range, stored as a start and end timestamp, when a revision was active in the repository. The start time is the time when the revision was created and the end time is the time the revision was superseded by a more current revision.

revision time cursor. The revision time cursor represents either a range of times between the revision cursor start time and the revision cursor end time, not including the end time itself, or a single point in time in which case the end time is set equal to the start time. Each of the two times takes the form of a timestamp. The revision time cursor restricts the view of data for any request to instances whose revision time range overlaps with the revision time cursor.

search path. An ordered list of variant IDs starting with a given variant ID and progressing higher in the variant hierarchy up to and including the root variant ID.

The domain for all data service actions is limited to those versions whose variant ID values match those of one of the elements in the search path. In addition the variants within the domain are ordered based on the ordering in the search path.

For any given node in any variant hierarchy there is a corresponding search path which starts with the variant ID value at that node.

serial versioning. Use of versions of a part which are serially ordered in time, such that each version supersedes its predecessor in a linear fashion.

Such a set of versions represents the evolution of a part over time. The latest version represents its current state. Serial versioning is represented by revisions.

source. The part that is at the starting end of a relationship.

target. The part that is at the terminating end of a relationship.

target variant level. The variant level to which a version of a part is being promoted.

time cursors. See revision time cursor and variant time cursor.

tool. Any program that uses the VDMS interface for accessing or altering the data managed by the VDMS.

tree. See hierarchy triggered change. A change that was made automatically by the data management system beyond the change originally requested. For example, in an E/R data management system, the request to delete an entity will cause triggered changes that delete all the relationships that are connected to the entity.

update. A request to a VDMS to change the contents of an existing part. The part must have been visible from the view of data of the requester.

update search path. Any search path that is based on the primary variant hierarchy and hence can be used for updates to the data in the repository. Other search paths, those based on alternate variant hierarchies, are limited to read only operations.

UTC. Universal Coordinated Time (the acronym comes from the French translation). It is a common global time system which, like Greenwich Mean Time (GMT), is independent of local time zones. A time value in UTC is almost (within a millisecond) the same as its counterpart time value in GMT. All timestamps associated with the versioning architecture are set according to UTC.

variant. An ordered set of one or more revisions, which exists in parallel with other ordered sets of revisions of the same part.

Variants can be created to represent differences between environments, models, releases, effective times, or users. New variants are either created upon request or in logical mode are created automatically at the working variant level in response to a data service request that attempts to alter data that is not at the working variant level. This automatic creation is known as drawdown.

variant default group. A set of entity and relationship types that share the following as determined by the current context:

Default variant domain for adds
Default variant start time for adds
Default variant end time for adds Typically entity and relationship types that are used for a related purpose, such as enterprise modelling, are placed in the same variant default group.

variant domain. The set of all allowed variant IDs that share the same VARIANT_DOMAIN attribute value. Associated with each variant domain is one primary variant hierarchy and optionally multiple alternate variant hierarchies. For any given revision time all the current versions of a part are in the same variant domain.

The purpose of multiple variant domains is to allow different parts to be versioned using different sets of variant IDs. For example parts for the payroll application could have a four level versioning scheme that had production, integration, test, and user levels, while the parts for the inventory application could have a versioning scheme that used only production and user levels.

variant hierarchy. This is a hierarchy among the variant IDs associated with a given variant domain, where a given variant ID appears once in the hierarchy. The position of the variant IDs within the hierarchy determines the content and ordering of search paths, each one starting at a node in the hierarchy.

An example of a variant hierarchy for the variant IDs: PAY.R1.PROD, PAY.R1.FIX, PAY.R2.PROD, PAY.R2.TEST, and PAY.R2.USER might be:

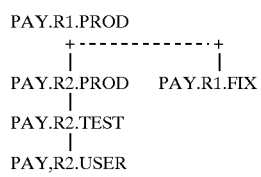

Many variant hierarchies can be defined, but only those search paths based on the one hierarchy defined as the primary hierarchy can be used to perform changes to the data in the repository.

variant ID. The identification of a variant less the variant time. Different variants with the same variant ID represent the same thing with different variant times and/or different revision times.

variant key. That which identifies a particular variant among all the versions of a part. All the revisions of a variant share the same variant key.

variant level. The variant level refers to either all of the versions that share the same variant ID or to the view of data using a variant map that specifies the given variant ID.

variant map. A set of variant IDs and their associated variant hierarchy, where each variant ID is from a different variant domain (and hence also from a different variant hierarchy). A given map need not have a variant ID for all existing variant domains. Each variant ID specifies the starting variant (and also the working variant) for the search path associated with the corresponding variant domain. Updates can be performed only when the current context specifies a variant map all of whose variant IDs were from primary variant hierarchies. Promotes are done from the current variant map to the corresponding map that is its parent (see variant map path).

variant map path. The set of variant maps that can be used for updates and which share the same set of variant domains ordered based on the ordering of the variant IDs in the associated variant hierarchies. The direct parent of a given variant map (unless it is the top map) is the variant map that shares the same variant domains, and all of whose variant IDs are either the same as in the original map or its immediate parent using the associated variant hierarchy and where at least one of the variant IDs is not the same as in the original map (a map cannot be its own parent).

variant time. The time range, stored as a start and end timestamp, when a variant is considered to be effective, as for example the 1991 variant for the FICA deduction part would have an effective time from Jan. 1, 1991 through Dec. 31, 1991. The start time is the time when the variant is effective for the user installation and the end time is the time when the variant ceases to be effective.

The variant time is also known as the effective time.

variant time cursor. The variant time cursor represents either a range of times between the variant cursor start time and the variant cursor end time, not including the end time itself, or a single point in time in which case the end time is set equal to the start time. Each of the two times takes the form of a timestamp. The revision time cursor restricts the view of data for any request to instances whose revision time range overlaps with the revision time cursor.

VDMS. See versioned-data management system.

version. A representation in the repository whose data describes a particular state of a part. There can be multiple versions of the same part each describing different states of it.

The term version is synonymous with the term "instance."

version key. That which identifies a particular version of a part.

versioned-data management system. A data management system that supports one or more versions of data.

view of data. Associated with each variant map there is a view of data. The view of data is that data which is seen when that variant map is the current variant map.

visible. An instance (version) that exists using the current view of data in conjunction with the current context.

working variant. The first variant within a search path. Whenever a request is made in logical mode to change a version that is not already at the working variant level a version is automatically created at the working variant level and the change is applied to it.

2.0 VERSIONED DATA MANAGEMENT SYSTEM

FIG. 1 shows in flock diagram form the typical components of a computer system for use with the present invention. Versioned data management system (VDMS) 100 will normally be loaded into system memory (RAM) from a disk storage unit, although portions of the VDMS may remain in disk storage when not in use, and execution directly from other storage media (eg. ROM, bubble, EPROM, WORM, DASD) is also feasible. The working data, identifier fields, and hierarchy information are normally stored in and read from memory 102 (RAM), but disk storage may also be used. In general, all needed data, including hierarchy information, variant maps, context, promote groups, and the versions themselves are stored in disk subsystem 104, and then loaded into memory 102 when accessed (retrieved or changed) by VDMS 100. However, any read/write permanent memory could be used in addition to or in substitution for disk subsystem 104. A system user 106, which may include a database meta designer, a database programmer, or a database user, interacts with VDMS 100 directly or through Tool 108, in either case using a standard user interface which may include a display, keyboard, mouse, or other input/output device. Central processing unit (CPU) 110 or other processor executes instructions from VDMS 100 and/or Tool 108 using data from memory 102 and disk subsystem 104.

3.0 OVERVIEW OF VERSIONING ARCHITECTURE

This section will provide a high-level description of a versioning architecture for use with the present invention. Later sections will describe most of the concepts in more detail, especially:

definition services (also referred to as data definition language, or DDL), data services (also referred to as data manipulation language, or DML), relationship semantics.

It should be noted that this architecture addresses the versioning of entity instances and relationship instances, not entity type and relationship type definitions. However, the basic mechanisms apply to versioning of both instances and types.

3.1 Parts

Both entities and relationships can be versioned. For ease of reference, the term part will be used generically to refer to both entities and relationships.

A version is a representation in the repository of a particular state of a part. There can be multiple versions of the same part, each representing different states of it. Each version is stored as a single record in a file or a single row in a relational table. For some parts, such as library parts, additional data for a version may be stored outside the repository. Such additional data is outside of the versioning architecture, and hence it is the responsibility of a tool maintaining such additional data to keep that data in sync with the data in the repository.

The term instance takes on a specialized meaning. "Instance" refers to the repository data stored as a single record in a file or row in a relational table. For unversioned data, this means a single part. For versioned data, however, an instance is a single version of the part. A single entity or relationship may be represented by a whole set of instances, or versions.

An instance which represents a version of a part has a multi-part key. A key attribute is defined for each entity type. This is referred to as its part key. This is supplemented by one or more key attributes referred to as its version key. Instances which represent different versions of the same part have the same part key and different version keys.

In an instance diagram, a part is represented by a box, with the part key (CLOSE in the example below) identified by a p beside the box, as shown in FIG. 2. The part type (Source), if needed for clarity, appears on the top line of the box. Additional lines may be used for the version key. Any necessary non-key attributes appear last in the box. FIG. 2 on page 143 shows a part key and two non-key attribute values.

3.2 Variants

Different versions of a part simultaneously existing in the repository are called variants.

The version key of a variant includes a variant key, which distinguishes one variant from another. New variants can be created to represent differences between environments, models, releases, statuses, effective times, etc.

Some variants have no order relative to each other. Unordered variants provide what is called parallel versioning.

Variants which, for example, represent successive releases of a program, each of which is based on the previous version, are ordered relative to each other. This is one form of serial versioning. An important characteristic of this form of serial variants is that although one variant can be considered the most current, all of the variants are active. The release 1 variant can still be retrieved and even changed after the release 2 variant has been created. (Revisions provide another sort of serial versioning. See 3.3, Revisions.)

Both parallel and serial versioning may be employed at the same time.

One part of a variant key is the variant ID, made up of the values of the variant ID attributes. (See 3.6, Versioning Attributes for a description of variant ID attributes.) In an instance diagram, a variant is shown as a box with the part key followed by the variant ID, identified by a v beside the box, as shown in FIG. 3, which illustrates variants representing successive releases R1, R2, and R3 of the Print program.

In FIG. 3, variants of the Print program were distinguished from each other based on only one factor, the release of a product. It is perfectly possible, and probably more common, to distinguish variants from each other based on combinations of such factors: environment and release and status, for example. Therefore, the variant ID is actually composed of three attributes, as described in 3.6.1. Variant and Revision Keys.

3.2.1 Variant Time Versions

One of the many factors which may distinguish variants from each other is time. Variant effective time might be thought of as "enterprise time." It is the time period during which a variant is in effect in the enterprise. This is what is typically referred to as effective time versioning.

For example, two of the variants of an entity called "Processor" may be

CPU1.91/01/01-92/01/01

CPU1.92/01/01-93/01/01

The former describes a version of a particular processor as it will be configured in 1991 and the latter describes the same processor as it will be configured in 1992.

Note that the end time of the first variant is the same as the start time of the second variant. The recorded start time is interpreted as the first time at which the variant is effective, while the recorded end time is interpreted as the first time at which the variant is not effective.

If variants are to be distinguished from each other based on time, their variant key includes a pair of time stamp attributes used to record the start and end times when the variant was effective.

As is the case for all variants, although the effective times of variants define an ordering of the variants, all variants are active. The 1991 variant can still be updated after the 1992 variant has been created.

In an instance diagram, a variant which has a variant effective time is shown as a box with the the variant time stamps identified by a t beside the box, as shown in FIG. 4. The maximum time value, or infinity, is represented as )).

The term Variant ID is used to refer to the variant key attributes exclusive of the variant start and end times, although all of these attributes constitute the variant key.

3.3 Revisions

To record successive states in the derivation of a particular variant, a series of versions of each variant is maintained. These are called revisions.

Unlike variants, not all revisions are "active" at the same time. Only the most recent revision—the current revision—of a given variant may be altered through VDMS data services (such as UPDATE and DELETE). Earlier revisions, which are no longer active, provide a history of past states of the variant.

Revisions provide a second flavor of serial versioning. An important characteristic is that only the most recent revision of a variant is active. A given revision cannot be changed by normal means after its successor has been created.

The version key of a revision includes a pair of time stamp attributes used to record the start and end times when the revision was active. This pair of time stamps constitutes the revision key.

The time represented by revision time stamps may be thought of as "repository time." It is the time period when a particular version was the most current revision of its variant in the repository. That version may be preceded by earlier revisions and followed by later revisions of the same variant.

When a revision is initially created, its revision start time is set to the current time, and its revision end time is set to infinity, or the highest time stamp that can be recorded.

A revision whose end time is set to infinity is known as a current revision. For a given variant there can be a maximum of one current revision. When it is superseded by another revision, a revision's end time is changed to the time it was superseded, and the new revision becomes current.

Figures 5, 6:
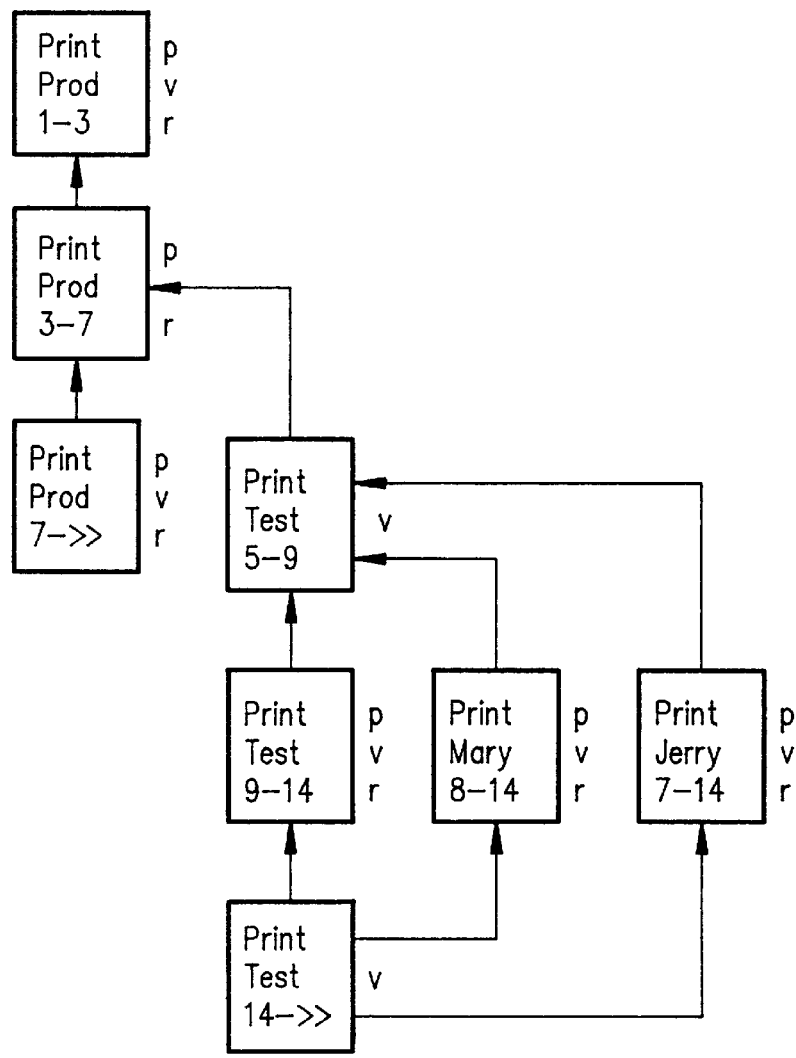
FIG. 5 is a block diagram representation of revisions in an instance diagram.
FIG. 6 is a block diagram of a derivation graph.

In an instance diagram, a revision is represented as a box with the revision time stamps identified by an r beside the box, as shown in FIG. 5. The maximum revision time value is represented as >>. The current (latest) revision of a variant always has this value as its revision-end time. (Note that the value is the same as the maximum variant time value.)

It is not necessary, and normally not desirable, to create a revision representing every change made to a variant. Whenever a new revision is created, it remains active, that is, it may be changed freely, until the next COMMIT action is performed, which renders the revision unchangeable via normal UPDATE and DELETE requests, and forces the automatic creation of a new current revision of the variant when a subsequent UPDATE or DELETE request is processed. Only a current revision may be active.

3.3.1 Example Illustrating Variants and Revisions.

Below is a sequence of shorthand representations of variants with effective time versioning as well as revisions. The instances pictured are of an entity type called "Processor" which represents computers.

At time t1, Mary adds an instance defining CPU1, with 10 meg of real storage, to be online starting 7/90.

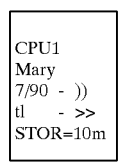

time t2 Mary changes the variant ID to the Production version, creating a new revision, the first revision of the Prod variant.

Note: The change is accomplished using the PROMOTE action, which will be introduced in 3.9. New Data Actions and Processes.

The Mary revision still exists but is no longer current.

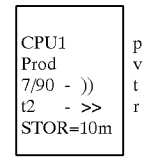

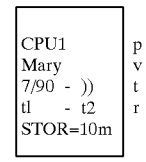

CPU1 is scheduled for an upgrade to 16 meg of real storage 7/91. At time t3 Mary updates the variant end time of the Prod variant to 7/91. This creates a new Mary variant.

At time t4 Mary adds another variant to be effective starting 7/91.

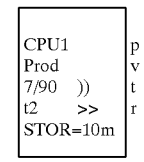

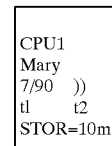 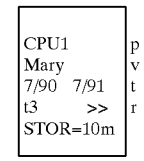 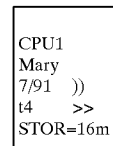

time t5 Mary changes the variant IDs of both variants to Production. There are now two current revisions, one for each variant.

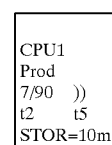 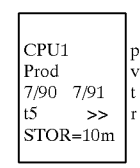 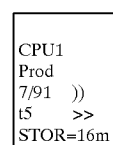

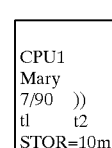 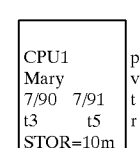 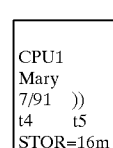

3.4 Using Time Cursors

Variant time allows the representation in the repository of changes, over time, in the state of real-world entities and relationships. Future time, anticipating changes in state, can be recorded.

Revision time (or "repository time") records the changes, over time, to the state of the repository data itself. It is historical; at any given moment no changes are anticipated; only present and past states are recorded.

The repository data that can be viewed at any given time is normally limited to those instances whose variant time spans overlap the variant time cursor and whose revision time spans overlap the revision time cursor. (See 5.2.2, Time Cursors). This point of view shows the data that exists at present, about real-world entities and relationships as they exist at the present time.

It is possible to view the data about real-world entities and relationships as they exist at any point in the past or future, by resetting the variant time cursor. It is also possible to view the repository date as it existed at any point in the past, by resetting the revision time cursor.

Given the example above, different variants of the CPU1 part are seen with different values of the variant time cursor. (Revision time is presumed to be t6, or the present.

Variant time: 9/90
Revision time: t6 (present)

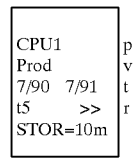

Variant time: 9/91 (present)
Revision time: t6 (present)

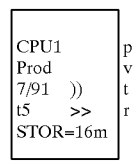

It is possible to set the revision time cursor to a time in the past, in order to view the repository as it existed then.
Variant time: 9/90
Revision time: t4

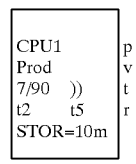

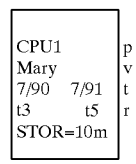

Variant time: 9/91 (present)
Revision time: t4

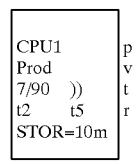

-continued

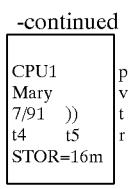

3.5 Derivation Graph

For any new version, the versioned-data management system (VDMS) records which existing versions its data content was derived from. This record is called a derivation graph. Any version can be derived from 0 or more versions and can have 0 or more versions derived from it. However, no version can be derived either directly or indirectly from itself. Thus a derivation graph is a directed acyclic graph. The version(s) from which a given version is derived may be in the same variant, in a different variant of the same part, or in a different part of the same type. A version may not be derived from an instance of a part of a different type.

FIG. 6 shows a set of versions of the Print program. There are four variants of the part. With variant IDs Prod, Test, Mary, and Jerry. The Prod and Test variants each have three revisions, while the Mary and Jerry variants each have one revision. The arrows indicate how each revision was derived. Print.Prod.1-3 was the original revision, not derived from any other. Print.Prod.3-7 was used to derive both the next revision of the Prod variant and the first revision of the Test variant: Print.Test.5-9. Print.Test.5-9 was used to derive both the next revision of the Test variant and the first revisions of the Mary and Jerry variants: Print.Mary.8-14 and Print.Jerry.7-14. Revisions from three different variants were merged to derive the last revision of the Test variant: Print.Test.14->>.

Although the VDMS records a default derivation graph for the versions of a part based on the actions used to create them, it does not determine the data contents of a new version based on this information. The specification of the data for any version is entirely under user control. The derivation graph is actually a user's assertion about what the source(s) of data was for each version. In the example of FIG. 6, although the VDMS records the fact that Print.Test.14->> is derived from Print.Test.9-14, Print.Mary.8-14, and Print.Jerry.7-14, it was up to the user to determine how the data was to be merged and to assert that it was merged.

The VDMS records a derivation graph as instances of physical relationship types. (See 3.12, Logical and Physical Relationship Types.) For each entity type or logical relationship type, a derivation relationship type is automatically defined with the subject type as both its source and its target. The existence of a derivation relationship instance signifies that the source version was derived from the target version. Each instance of a part can be the source and/or target of many of these derivation relationship instances. Constraints will be provided to prevent a derivation relationship from connecting an instance to itself, either directly or indirectly.

The VDMS adds a derivation relationship instance when it automatically creates a new version based on an existing version. If an instance is derived from many others, there may be one derivation relationship instance connecting each of those instances to the new one. the VDMS does not automatically add them.

3.6 Versioning Attributes

In addition to the attributes which are included in the definition of entity types, special attributes are required to manage the versioning data. These additional attributes are not specifically defined for every entity type and logical relationship type; they are automatically included in every entity and logical relationship type definition.

3.6.1 Variant and Revision Keys

These key attributes supplement the key attribute(s) of an entity type or relationship type.

Variant Keys

Multiple variants of an entity or a relationship all have the same part key values. Therefore, a variant key is defined to distinguish them. The variant key consists of three variant ID attributes and and two variant time range attributes.

The names of the three variant ID attributes are:

VARIANT_DOMAIN

VARIANT_NAME

VARIANT_STATUS

The variant time range attributes are a pair of time stamp attributes with VDMS-defined names, representing the variant effective start and end times.

Revision Keys

Multiple revisions of a variant have the same part key and variant key values. Therefore, a revision key is defined to distinguish them. It consists of a pair of time stamp attributes with VDMS-assigned names, representing the revision start and end times.

The variant and revision keys together are called the version key.

3.6.2 Versioned Entity and Relationship Keys

Figure 7:
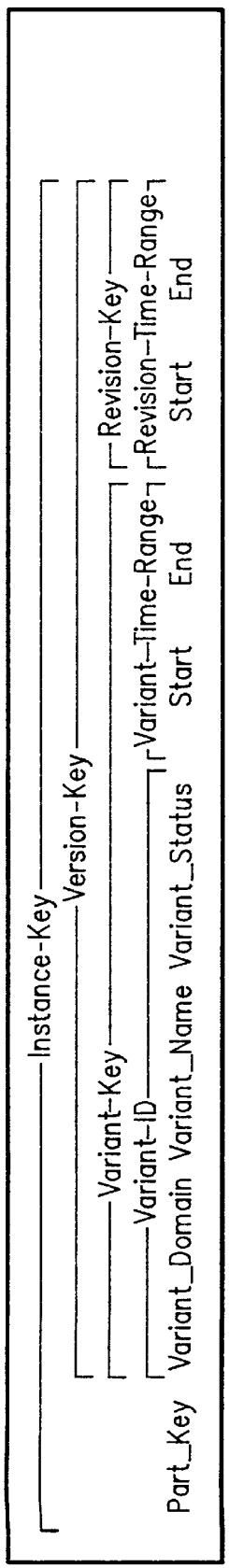
FIG. 7 is a diagrammatic representation of the components of an entity instance key.

FIG. 7 graphically shows the component parts of an entity instance key.

Figure 8:
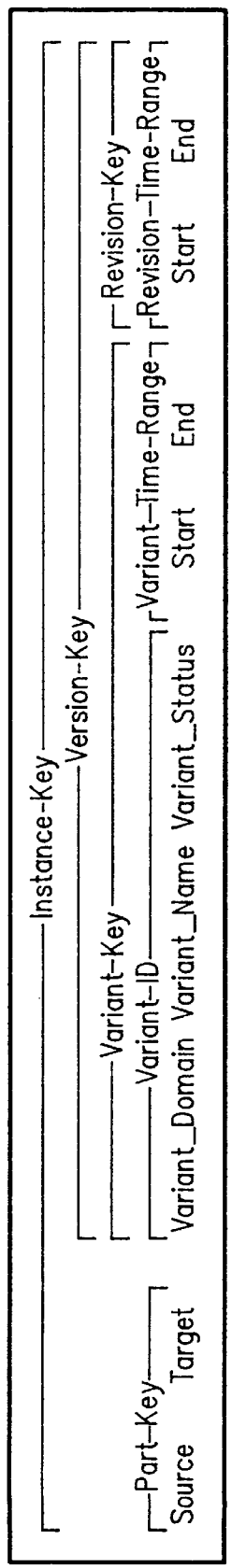
FIG. 8 is a diagrammatic representation of the components of a relationship instance key.

FIG. 8 graphically shows the component parts of a logical relationship instance key.

In the examples to follow variant keys and variant IDs will generally be written with periods connecting their component parts.

3.6.3 VDMS-Defined Non-Key Versioning Attributes

In addition to the variant and revision key attributes, there is certain data that is required by the VDMS in order to deal with versioned data. This information is stored as non-key attributes of all instances.

Every entity and every logical relationship automatically has the following attributes:

delete marker (CHARACTER (1)) A value of 1 indicates that the version has been logically deleted. A value of 0 indicates that the version has not been logically deleted. No other values are allowed. (See 3.10, Logical Delete.)

force-required flag (CHARACTER (1)) A value of 1 indicates that the instance can only be promoted using the promote-force tool because an earlier promote attempt failed due to a time stamp mismatch. 0 indicates that the instance can be promoted by the normal means. (See 6.0, PROMOTE.)

create time stamp (DATETIME) This attribute records the time when a part was created by the ADD or COPY actions. It is not changed by any other action.

The create time stamp is used to determine whether two versions with the same part name are in fact versions of the same part. For a description of how this time stamp is used, see 8.2.3, Tolerance of Dangling Relationships.

last-change time stamp (DATETIME) This attribute is set by the VDMS when an action that changes the instance data is performed (like UPDATE or DELETE, but not COMMIT).

This attribute is used by the VDMS when doing promotes to determine whether the version at the promote-to level has changed since the instance being promoted was created. For an explanation of promotes, see 3.9, New Data Actions and Processes.

drawdown-from time stamp (DATETIME) This attribute records the last-change time stamp of the source instance when the present instance was created by an explicit or implicit drawdown action.

This attribute is also used by the VDMS when doing promotes to determine whether the version at the promote-to level has changed since the instance being promoted was created.

The following two attributes are included only in relationship definitions.

source create time stamp (DATETIME) This attribute contains the create time stamp of the relationship's source.

target create time stamp (DATETIME) This attribute contains the create time stamp of the relationship's target.

The above two attributes enable the VDMS to distinguish between relationship sources or targets having the same part key but different create time stamps; they are considered to be different parts, only one of which can be the source or target of a particular relationship instance. For a description of how these time stamps are used, see 8.2.3, Tolerance of Dangling Relationships.

None of the VDMS-defined versioning attributes can be changed or removed from a definition.

Except in literal mode (see 3.11, Three Modes of Working: Logical, Physical, Literal). VDMS-defined versioning attribute values cannot be set or changed directly by a tool or user. Their values are set by the VDMS as a result of data actions.

3.6.4 Attribute Name Conflicts

The VDMS ensures the uniqueness of attribute names within an entity type, or a relationship type.

If a new entity attribute name would conflict with one of its version attribute names, the VDMS will not allow the new attribute to be added. To minimize conflicts, all versioning attribute names are chosen to begin with the characters "DWK_."

3.6.5 New Data Types

The following new data type is provided:

Datetime

A time stamp is provided.

The use of this data type is not restricted to versioning attributes.

3.6.6 Policies on Versionig Attributes

The versioning attributes of an entity or relationship type can be referenced from conceptual view policies defined for that type.

Integrity policies can be defined for the versioning key attributes. Derivation policies cannot be defined for any of the versioning attributes.

3.7 Extensions to Entity Type and Relationship Type Definition

Entity and relationship types must be assigned to a variant default group when they are defined. (See 5.1, Variant Default Groups.)

3.7.1 Versioning Entity Types

All instances of an entity type have the versioning attributes described above in addition to the attributes of the entity type. When the attributes of an entity type definition are queried, the versioning attributes are also returned. These may not be deleted or changed in any way via the entity type definitional dialogs and/or functions.

3.7.2 Versioning Relationship Types

A relationship type can be defined as logical or physical. (See 3.12, Logical and Physical Relationship Types.) Only logical relationships are versioned.

Since a relationship type has no attributes other than the versioning attributes, there is no query facility for relationship attributes.

3.8 New Definitional Constructs
3.8.1 Search Paths

It will normally be the case that a user wishes to see one version of each part—the most current version. However, one purpose of variants is to allow concurrent work on more than one version of a part, so that there is a current revision of many different variants. Therefore, there must be a mechanism by which the VDMS can determine which variant to return a revision of when a query is submitted, and which variant to update when an update is submitted. The search path serves as this mechanism.

Suppose that a user is working on the second release of an application that has 300 parts. On possibility is that when work began on R2, a copy of each of the 300 parts was made, identical to the R1 parts. Some of these parts will eventually be changed for R2, but many will remain forever identical to their R1 versions. But, whenever the user asks for a part at the R2 level, it can be found. The second possibility, which avoids the replication just described, is that an R2 version of a part is not created unless a change from the R1 version is necessary. Therefore, there will not necessarily be an R2 version of each part, even though R2 of the application exists. If the user has specified "R2, R1" as his search path, and there is no R2 version of the part, the VDMS automatically looks for the R1 version.

Figure 9:
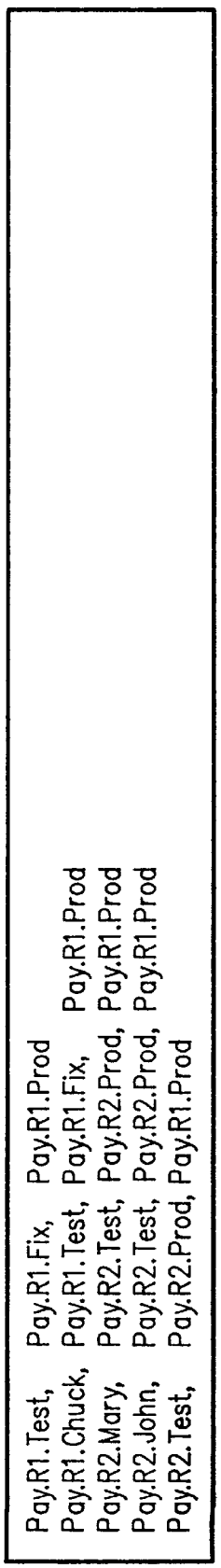
FIG. 9 is a diagrammatic representation of search paths.

It is up to the user (most likely an administrative user) to specify to the VDMS what search paths can be used. FIG. 9 shows examples of search paths that an administrator might define.

Each search path is a linear sequence of variant IDs, each of which consists of one possible value for each of the three variant ID attributes, Domain, Name, and Status with the restriction that for a given search path all of the variant IDs must have the same Domain value.

On retrievals, only versions with variant ID's in the search path are returned. The VDMS returns a "not found" condition when no versions exist with a variant ID in the search path. Therefore, in addition to defining an ordering, the search path also functions as a filter.

The first variant ID on a search path is called the working variant. In the example above the working variants are shown in bold-face type. All updates, deletes, and adds are performed at the level of the working variant. If the variant retrieved was not the working variant, but some variant beyond it in the search path, the VDMS automatically creates a version at the level of the working variant in order to do an update or delete. All adds occur at the working variant level.

3.8.2 Variant Hierarchies

Rather than defining the search paths individually, the administrator defines a variant hierarchy, which consists of one or more search paths collected into a single hierarchy. A variant hierarchy is a named construct, each of whose nodes is a variant ID.

When executing a retrieval, the VDMS uses a linear search path corresponding to a branch in such a hierarchy. A particular search path can be identified by the name of a hierarchy plus the value of one of its nodes. Note that a search path does not necessary begin with a leaf node.

In addition to the search path specification, the variant hierarchy definition also indicates between which pairs the PROMOTE process is permitted. For an explanation of this process see 3.9, New Data Actions and Processes.

3.8.3 Variant Domains

The first variant ID attribute has a special meaning; it identifies the variant domain to which versions of a part belong. All nodes in a variant hierarchy belong to the same variant domain. A variant domain may have one or more variant hierarchies, which determine the possible search paths for the variant domain.

Figure 10:
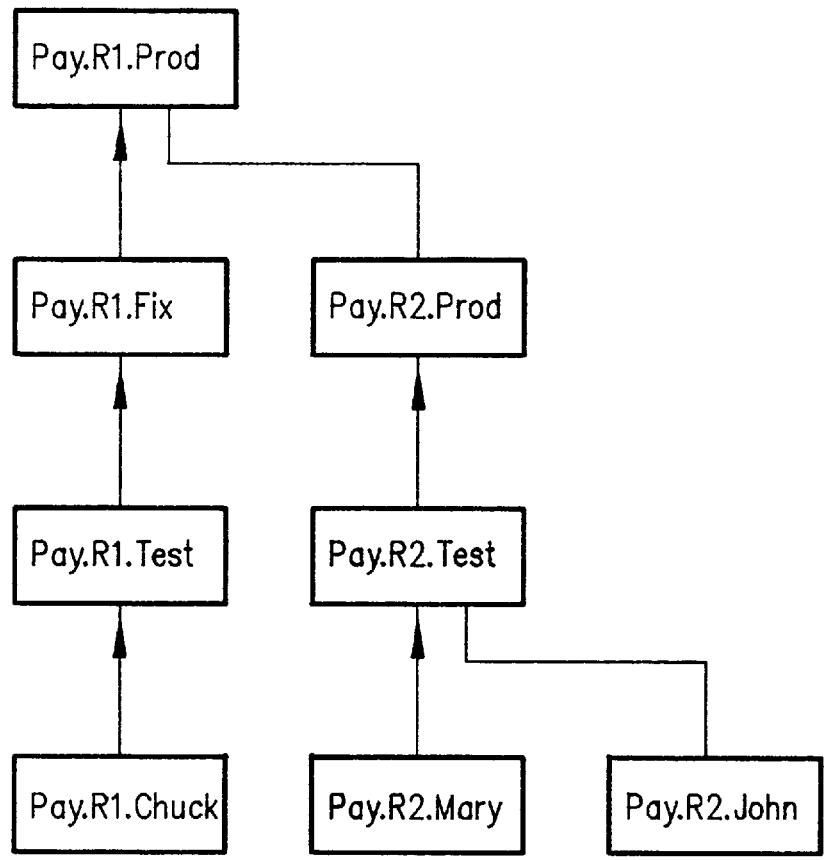
FIG. 10 is a block diagram illustrating a variant hierarchy for a variant domain.

FIG. 10 shows a variant hierarchy for the Pay variant domain which consists of the search paths shown in FIG. 9. Each node has the same value—Pay—which is its variant domain identifier.

A variant hierarchy has these properties:
It may contain one or more search paths
Each of its nodes has the same variant-domain ID
Different instances of the same entity or relationship type may be in different variant domains, subject to the following restrictions:

Entities: For any point in revision time, a given part may have instances in only one variant domain.
Relationships: For any point in revision time, the restrictions depend on the semantic constraints defined for the relationship type:
  Mandatory: A relationship must be in the same variant domain as the source and/or target for which it is mandatory.
  M-1 (many-to-one): All instances having the same source key must be in the same variant domain. (But not necessarily in the same variant domain as its source or target.)
  1-M (one-to-many): All instances having the same target key must be in the same variant domain.
  1-1 (one-to-one): All instances having the same source key must be in the same variant domain, and all instances having the same target key must be in the same variant domain.
  M-M (many-to-many): There are no variant-domain restrictions for M-M relationships.

For each variant domain an administrator may define multiple variant hierarchies, but only one may be designated as the primary one; this is the only one that can be used to perform updates. This is because it is not possible to preserve data integrity with respect to the conflicting points of view reflected in different hierarchies. Other hierarchies can only be used to do retrievals. It should be expected that the instances visible using alternate hierarchies for retrievals may not conform to constraint rules, relationship cardinality, and relationship mandatory and controlling semantics.

3.8.4 Variant Maps

Tools may work with parts in only one variant domain, or in different variant domains simultaneously. Variant maps determine which variant domains are visible at a given time.

A variant map is a named construct which defines one or more working variants or search paths from variant hierarchies for different variant domains. A given variant domain has at most one working variant or search path per map. The working variants or search paths are in effect simultaneously.

VDMS provides interfaces by which a user or tool can define a variant map and determine which variant map is in effect. VDMS preserves the current variant map setting from one session to the next.

See 4.0, Search Paths, Variant Hierarchies, and Variant Maps for more detailed information on variant hierarchies and variant maps.

3.9 New Data Actions and Processes
3.9.1 New Data Actions

A number of new data actions are included as part of the versioning architecture of the present invention.

DRAWDOWN

DRAWDOWN is used to make a copy with the working variant as its variant ID of the first instance in the search path. As indicated in 3.8, New Definitional Constructs, VDMS automatically performs this action when an UPDATE or DELETE follows a retrieval which returned an instance whose variant ID is not the working variant.

CANCEL

This action effectively deletes a variant that was created either by an ADD action or by an implicit or explicit drawdown, either by changing the revision time stamp so that it is no longer current, or by physically deleting the variant, depending on whether revisions are being kept.

RENAME

This action functions like UPDATE, except that it may be used to change an entity's key attribute, with the change automatically propagated to all associated relationships.

COPY

This action copies an entity or relationship instance, preserving all associated relationship instances of the original instance. "Associated relationship instances" means all instances which contain the part key of the instance to be copied as part of their key.

3.9.2 New Processes

These versioning processes are provided through VDMS-supplied tools rather than through template actions.

Promote

This process is used to change the variant ID of an all instances in a promote group or groups which are at the working variant level to that of the next higher variant ID on the search path. For more information, see 6.0, PROMOTE.

Version-Attribute Update

A tool is provided to change the versioning attribute values of an instance or a group of instances.

3.10 Logical Delete

As indicated in 3.8, New Definitional Constructs, it is possible on a retrieval to search for the "lowest" variant in a user-defined search path. It is also possible to search for the most recent revision of a variant. In either case, if one physically deletes the repository instance representing the most current version, the next one in the search path will be returned on the next retrieval. This would produce the undesirable result that, having performed a delete of a part, a tool could then perform a successful retrieval of the deleted part, with an older version of it being returned.

A logical delete action leaves a version in the repository, but sets a logical delete marker in it. This delete marker prevents the search from proceeding to the next most current version and causes a "not found" condition.

Logical deletion of a committed revision results in the automatic creation of a new revision, which is logically deleted.

Two factors determine whether a DELETE action results in a logical or a physical deletion.

For a physical relationship, a delete is always physical.

For a versioned part, if the value of the Action Mode field in the template TCA is logical, the delete is logical. If it is literal, the delete is physical. For more information on the Action Mode, see 3.11, Three Modes of Working: Logical, Physical, Literal.

3.11 Three Modes of Working: Logical, Physical, Literal

The Action Mode for any template action is governed by a field in the template control area (TCA) of templates used to perform data service actions.

There are three action modes:

Logical Retrieves a single version of each part. This mode supports all template actions.

Physical Can retrieve multiple versions of each part. This mode supports retrieval actions, but no update actions except the adding and deleting of physical relationship instances.

Literal Retrieves all versions of each part, and supports all template actions.

Tools normally use logical mode. Physical mode retrieval is used primarily by maintenance utilities. Literal mode is used exclusively by VDMS tools and utilities.

Some actions function identically regardless of the action mode set in the template. These actions are:

COMMIT
RESTORE
CANCEL

The other template actions function differently depending on the action mode.

3.11.1 Logical Mode

Using logical mode, VDMS data requests operate as though there were a single, unversioned instance of each part. The instance returned from a retrieval is that revision of the first variant found in the search path whose variant time span overlaps the variant time cursor, whose revision time span overlaps the revision time cursor. (Note that in logical mode the variant and revision cursors each represent a single point in time. See 5.2.2, Time Cursors for a description of the time cursors.) Successive retrievals return one version of each successive part, rather than successive versions of the same part. If the first version of a part encountered by the VDMS, using the search path and time cursors, has been logically deleted, no version of the part is returned. When a delete action is performed, the delete is logical rather than physical.

On actions which change the repository, such as ADD, UPDATE, and DELETE, the VDMS determines the variant ID values and the variant and revision times using the current variant map and time cursors.

New versions of a part may be created automatically by the VDMS in response to actions which change the repository; for example, UPDATE or DELETE actions issued in logical mode against a revision that is committed will result in the automatic creation of a new revision.

3.11.2 Physical Mode

In physical mode, VDMS data requests operate on all existing variants of a part or parts within the scope of the current search path and the variant and revision time cursors. KEYED actions may select the variant ID values to retrieve within that scope. Successive retrievals may return successive variants of the same part, rather than one version each of successive parts. Even if a version of a part has been logically deleted, it is returned; its deleted status is indicated by the value of the template's Delete Marker field.

UPDATE, ADD, DELETE, COPY, and RENAME are not supported in Physical mode for entity instances or logical relationship instances. ADD, DELETE, COPY, and RENAME are supported for physical relationship instances (See 3.12, Logical and Physical Relationship Types).

3.11.3 Literal Mode

In literal mode, VDMS data requests operate on all revisions of all variants. The search path and time cursors are ignored. KEYED actions may select the exact revision to retrieve.

For the ADD action all version attributes, including the variant and revision time stamps, and all the non-key attributes, may be supplied in the template.

For the UPDATE or RENAME actions all attributes except the create time stamp may be supplied. Thus literal mode can be used to update or delete a revision that is not active. Any add or update of a revision time span which causes conflict with those of other repository instances will fail.

DELETE actions in literal mode result in the physical deletion of instances.

3.12 Logical and Physical Relationship Types

The interface for defining a relationship type allows it to be specified as either a LOGICAL or a PHYSICAL relationship type.

3.12.1 Logical Relationship Types

All existing relationships in the Information Model are of this type.

An instance of a LOGICAL relationship type connects a source part and a target part. The relationship instance is insensitive to the version keys of the source and the target. For any particular retrieval performed in logical mode via the relationship, the current search path will determine which version of its target is retrieved.

Logical relationships are versioned in exactly the same way as entities. For a logical retrieval, the current search path will determine which version of a relationship is used to reach the target.

The versioning of a non-owning relationship is completely independent of the versioning of its source and target. The versions of an owning relationship are synchronized by the VDMS with the versions of the dependent entity.

The part key of a logical relationship is the part key of its source plus the part key of its target. Just as for entities, the version key of a logical relationship consists of:

variant ID
variant time range
revision time range

All of the normal relationship semantics apply at the part level, not the instance level. This includes:

Mandatory Semantic
Controlling Semantic
Relationship Cardinality as described in 8.0, Data Integrity.

A logical relationship is accessible using any action mode.

For more details on logical relationship types, see 7.1.1, Logical Relationship Types.

3.12.2 Physical Relationship Types

An instance of a PHYSICAL relationship type connects one source instance and one target instance. It records information about instances (versions), not about parts. The relationship instance is therefore sensitive to the version keys of the source and the target. A retrieval performed via the relationship returns precisely the target instance. The current context has no effect on the retrieval.

Physical relationships are not versioned.

The instance key of a physical relationship is the instance key of its source plus the instance key of its target. (If either the source or the target is another relationship, then its key has more than one component.)

All of the normal relationship semantics apply at the instance level. This includes:

Mandatory Semantic
Controlling Semantic
Relationship Cardinality as described in 8.0, Data Integrity.

A physical relationship is only accessible using physical or literal mode.

The only physical relationships are those used to maintain derivation history. An instance records that one version was derived from another version. For further information on these relationships, see 3.5, Derivation Graph.

3.13 Creation and Retrieval of Versions in Logical Mode

As was described in 3.11, Three Modes of Working: Logical, Physical, Literal, the normal mode in which tools will operate is LOGICAL mode. Therefore, this section focuses on how versions are created and retrieved in logical mode.

3.13.1 Creation of Versions

New versions can be created either explicitly via the ADD, COPY, RENAME, and DRAWDOWN actions, or automatically via the UPDATE, DELETE, PROMOTE, and PROMOTE_FORCE actions.

In order for the ADD action to succeed, the part must not exist in any other variant domain with a revision time span that would overlap that of the new instance. In addition, a logical retrieval using the part key provided in the template, plus the current search path, must not find and return an existing version of the part. This condition will be met either if there physically is no such instance, or if the first version found by the VDMS was logically deleted, and therefore not returned.

Most new versions are created automatically via the UPDATE and DELETE actions. These actions can be thought of as having both an "input instance" and an "output instance," which may be different instances. If the action is UNQUALIFIED, the input instance is the previously retrieved instance. If the action is KEYED, the input instance is the instance that would be returned by a keyed retrieval using the current search path and template part-key fields.

If the variant ID of the input instance is not the working variant, the VDMS automatically creates a new version at the working variant level. This is referred to as a drawdown. If the variant ID of the input instance is the working variant, and revisions are being kept, the VDMS automatically creates a new revision of the same variant unless the input instance was created within the same commit scope as the action being performed.

When a new version is automatically created in order to perform a DELETE, it is a logically deleted version.

3.13.2 Retrieval of Versions

In both logical and physical modes, the domain of any template includes only instances whose variant time range and revision time range (if any) overlap the values of the variant time cursor ano revision time cursor, and whose variant ID is on the search path. Furthermore, in logical mode the template domain includes just one version of each part. The version of each part to be included is the first one encountered on the search path. If the first version of a part has been logically deleted, the domain will not include any version of that part.

The domain of a subordinate template is further restricted to include only instances connected to the instance at the cursor position of the parent template via a relationship. This relationship may be versioned. The domain of the subordinate template includes only target instances for relationship instances whose variant time range and revision time range (if any) overlap the values of the variant time cursor and revision time cursor, and whose target variant ID is on the search path and is not logically deleted. Furthermore, in logical mode the template domain includes a target instance for just one version of each relationship. The version of each relationship whose target is included is the first one encountered on the search path. If the first version of a relationship has been logically deleted, the domain will not include its target. The version of the target entity is also the first one encountered on the search path, if that version has been logically deleted, it will not appear in the domain.

Once the domain has been established, FIRST returns the first instance in the domain, NEXT returns the next instance, etc.

In literal mode, the domain may include instances whose variant time range and revision time range do not overlap those of the variant time cursor and revision time cursor.

(The time cursors are not used.) In both literal and physical modes, the domain may include more than one version of each part, and may include logically deleted instances.

3.14 Role of Create Time Stamp as an Identifier

In the prior art it was possible to have an entity with a given key, delete it, and then add another instance with the same key. Although the "before" and "after" instances would share the same key value, they really would be considered different entities. Their non-key attributes and their relationships would not be assumed to have anything in common. In fact, any relationships of which the original entity was the source or target, would have been deleted when the entity was deleted, arid therefore would not apply to the new entity.

In a VDMS according to the present invention, however, instances representing both the original entity and the new entity with the same key can coexist. It is useful to have a means of differentiating between them. The create time stamp attribute of an entity or a relationship serves this purpose.

The value of the create time stamp is set when the first version of a part is created via an ADD or COPY action. When additional versions are created via the UPDATE, DELETE or DRAWDOWN actions, they have the same create time stamp value as the first version. Even a new instance created by a RENAME action has the same create time stamp value.

Once a part has been logically deleted, if a new instance with the same part key is later added, that instance will have a different create time stamp value.

Thus, the create time stamp serves as an identifier which can both:

differentiate between different "incarnations" of a part even though the part key is the same; and identify instances with different part keys as the same "incarnation" of something, which has had its part key changed.

The create time stamp of an instance cannot be changed even using literal mode.

As previously described, a logical mode retrieval returns one version of each part. It is the part key, not the create time stamp, that determines whether two instances represent the same part or a different part. Thus, if there are two instances on a search path, representing different "incarnations" of the same part, only one of them will be returned via a logical retrieval.

In addition to having its own create time stamp, a relationship also records the create time stamps of its source and target. This aids in recognizing what "incarnation" of a part a relationship was created for. This is discussed in greater detail in 7.3, Create Timestamps of Relationship Sources and Targets.

4.0 SEARCH PATHS, VARIANT HIERARCHIES, AND VARIANT MAPS 4.1 Search Paths

The sequence in which the variant IDs are searched is called the search path.

In the serial versioning implied by a variant hierarchy there is a logical progression among the different variant IDs. For example, in the "Release 2" version of an application, any parts that have not changed since Release 1 are represented by their Release 1 variants, and are not duplicated at the Release 2 level. Those that have changed for Release 2 are represented by Release 2 variants which effectively "mask" their Release 1 counterparts.

When performing a retrieval using the search path R2, R1, the VDMS in effect employs the following method:

If an R2 instance of a part exists, select it.

Else if an R1 instance exists, select it.

Else return CSI_NOTFOUND.

If the selected instance is logically deleted, return CSI_NOTFOUND.

Else return the selected instance.

An instance that is returned from such a retrieval, if any, is said to be visible. Using the search path in the example above, if both an R1 instance and an R2 instance of a part existed, the R2 instance would be visible, but the R1 instance would not. If the R2 instance were logically deleted, no instance would be visible.

Typically, parallel and serial versioning are combined. Variants on the same search path are serial variants, while variants on different hierarchy branches are parallel. Each release of an application might have Production, Test, and multiple user levels specified. All changes are first tried out at a user level. When a change passes unit test, it is tried out at a functional test level along with other changes which have been unit tested. When all the changes pass functional test, they are moved to the production level. This methodology would be implemented with search paths like user1, test, prod and user2, test, prod, which the VDMS would process in a manner similar to that shown above.

The User-ID Variable

A special value, shown here as &USERID may be used as part of the VARIANT_STATUS variant ID value to represent multiple values; its execution-time value is the user ID of the current VDMS session.

&USERID may be used alone as a node value, or may be concatenated before other character strings, e.g. &USERID-SANDBOX.

4.1.1 The Working Variant

The first variant ID on a search path is called the working variant.

For logical mode actions, all alterations to the repository are made to the working variant. If the variant ID of an instance to which an alteration is requested is not the working variant, a working-variant copy of the part is automatically created and the alteration applied to it. This process is called drawdown. A drawdown may skip levels in the hierarchy. For example, a part at the PRODUCTION level can be drawndown to the &USERID level, skipping a TEST level in between.

A corresponding process, called promote, is used to change the variant ID of the part in the working variant to that of the next higher node in the search path.

4.2 Variant Hierarchy

To support these logical searches and to control the use of the DRAWDOWN and PROMOTE actions, for each variant domain the user must define one or more variant hierarchies.

Search paths having the same variant domain can be combined to form a hierarchical structure known as a variant hierarchy. Each node in a variant hierarchy implicitly defines a search path. The search path is the list of variant IDs, starting at the given node, which includes all of its parent nodes in bottom-to-top order.

Any node can appear only once in a variant hierarchy, but may appear in more than one hierarchy. Therefore, many search paths can begin with the same variant ID, one for each variant hierarchy in which the variant ID participates.

Changes to the repository are permitted only for search paths based on the primary variant hierarchy for the variant domain. These are called update search paths.

In a given VDMS installation, exactly one variant hierarchy per variant domain is defined as the primary variant hierarchy. It contains all update search paths.

Other variant hierarchies, known as alternate variant hierarchies, are optional. Search paths based on alternate variant hierarchies are limited to read-only access to the repository and are called alternate search paths.

4.2.1 Defining a Variant Hierarchy

For each variant hierarchy, the user specifies a name, and specifies whether it is the primary hierarchy for the variant domain.

Defining the Nodes in the Hierarchy

For each node in the variant hierarchy the user specifies:

Its identity, consisting of a value for each variant ID attribute.

If &USERID is used in the name of a non-leaf node of the hierarchy, all nodes below it must also contain &USERID The identity of its parent node, if any. The parent node must be in the same variant domain.

The following may only be specified for the nodes in the primary variant hierarchy.

Whether promotes are permitted to the node directly above it.

Variant Hierarchy Example

Figure 11:
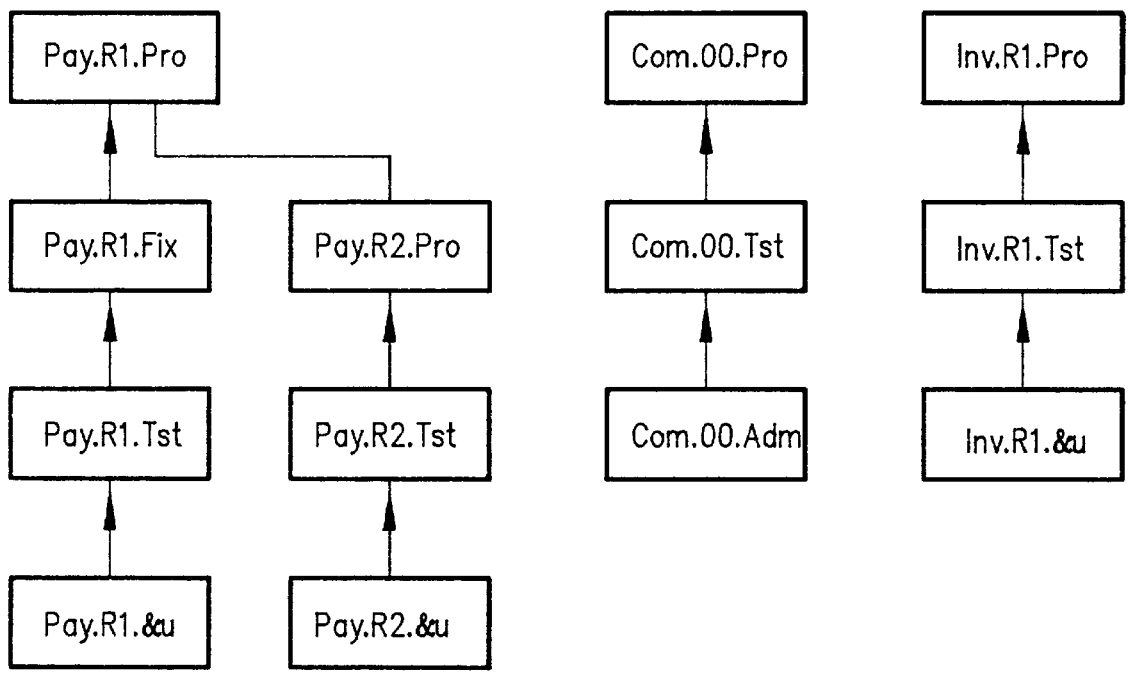
FIG. 11. is a block diagram illustrating variant hierarchies for the Pay, Com, and Inv variant domains.

FIG. 11 illustrates three primary variant hierarchies that have the following features:

One hierarchy is for the Payroll project variant domain named Pay, one for the Inventory project variant domain named Inv, and one named Com for parts that are common to all projects.

Upward arrows show the paths over which promotes can occur. Note that promotes cannot be done to the Pay.R1.Pro node.

The variant hierarchies for the Pay and Inv variant domains have &USERID values (abbreviated here to &u.) as their lowest nodes, each of which may result in multiple actual variant-ID values, while the variant hierarchy for the Com variant domain terminates in a single, specified, node identifier.

4.3 Defining Variant Maps

Typical processing requires that parts in different variant domains be accessed by the same tool. In the example in FIG. 11, while working on parts in the Payroll project it may be necessary to have the common parts—in the Com variant domain—available as well. Parts in more than one variant domain which are modified as part of the same unit of work will need to be promoted together. This requires a means to state how the nodes of the variant hierarchies for the different domains relate to each other. This is done by variant maps. A variant map links nodes in one or more different variant domains, thus indicating that the search paths starting at those nodes can be used simultaneously.

For each variant map, the user specifies:

A name

Whether the variant map is read-only, or is an update map, usable for actions which change repository data, including PROMOTE and CANCEL.

Only a variant map all of whose nodes were associated with primary variant hierarchies may be used for updates.

Whether the repository data which can be retrieved using this map is protected; that is, whether data integrity is enforced for this map when data changes are requested by users using other maps.

Only variant maps that may be used for updates can be protected. Read-only maps may not be protected.

See 8.0, Data Integrity for an explanation of protected points of view.

A list consisting of a variant hierarchy node (variant ID), and its associated variant hierarchy, for each variant domain which is to be included in the map. These IDs define the search paths. A variant domain may not appear more than once in any map.

A node which contains the &USERID variable as part of its VARIANT_STATUS value may not be included in a protected map.

Variant Map Example

Figure 12:
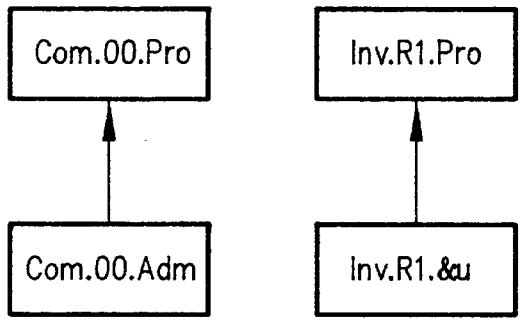
FIG. 12 is a block diagram illustrating two variant hierarchies with variant maps.

FIG. 12 illustrates two simplified variant hierarchies with a valid set of variant maps defined.

Note: For simplicity, all the examples of variant maps in this section show variant IDs without their associated variant hierarchy names. For any ID whose hierarchy name is omitted, the primary variant hierarchy name for that variant domain is assumed as a default.

Note: In all the variant-map examples, the first letter within parentheses indicates whether the mapping is for update (U) or read-only (R). The second letter indicates whether the mapping is protected (P) or unprotected (U).

Variant-Pair Mappings

Any pair of variant domains (FIG. 12 shows a single pair: Com-Inv) which appears in more than one update map constitutes a variant-pair mapping. A variant-pair mapping can be viewed as a kind of vertical section of a set of variant maps. The variant-pair mapping which is implied by the variant maps in FIG. 12 can be pictured graphically as follows:

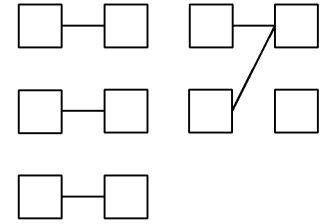

Only certain configurations are valid in variant-pair mappings for update maps. These are valid configurations:

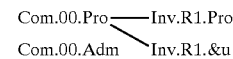

These configurations are not valid:

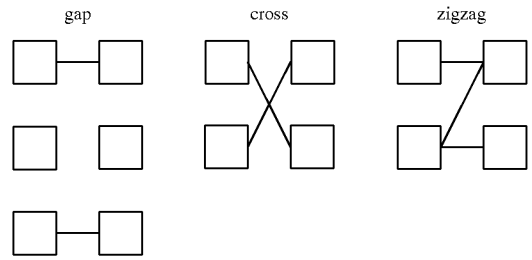

In order to avoid these illegal configurations, a variant-pair mapping for update maps must follow certain rules:

To avoid the gap, for any two nodes on the same branch of a variant hierarchy, there must not be an intervening node which does not appear in the same variant-pair mapping.

To avoid the cross, there must not exist any other update map containing a higher level from one variant hierarchy and a lower level of the other (cross)

To avoid the zigzag, a node which appears more than once in the variant-pair mapping, may not be connected to another which also appears more than once.

Given the variant map definitions in FIG. 12, the following additional map definitions are not valid according to these rules. Map5 would result in a cross, and Map6 would result in a zigzag.

| Map5 | (U,P) | Com.00.Adm | Inv.R1.Pro |
| Map6 | (U,P) | Com.00.Adm | Inv.R1.&u |

Single-Domain Maps

Two of the maps shown in FIG. 12 contain only a single variant domain. Groups of such singular maps having the same variant domain must follow only one rule, to avoid gaps:

for any two nodes on the same branch of a variant hierarchy, there must not be an intervening node which does not appear in the same group.

A complete and valid set of variant maps for the hierarchy of FIG. 11 is shown in FIG. 13.

Note that in this set of maps the lower levels of variant hierarchy for the Com variant domain do not appear in update maps with the other variants; all levels of the variant hierarchies for the Pay and Inv variant domains appear only with the Com.00.Pro level.

This would produce a set of variant-pair mappings as follows:

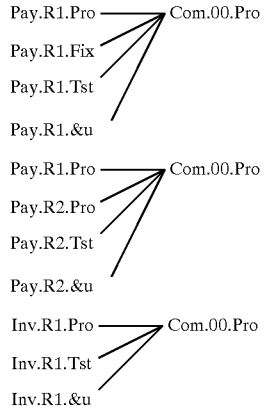

The same set of variant hierarchies could be mapped as shown in FIG. 14.

In this mapping, each update map contains three variants; corresponding levels of all three variants appear in the same maps. There are three variant-domain pairs:
the Pay-Com pair:

| Map1 | (U,P) | Pay.R1.Pro | Com.00.Pro | Inv.R1.Pro |
| Map2 | (U,P) | Pay.R1.Fix | Com.00.Pro | Inv.R1.Pro |
| Map3 | (U,P) | Pay.R1.Tst | Com.00.Tst | Inv.R1.Tst |
| Map4 | (U,U) | Pay.R1.&u | Com.00.Adm | Inv.R1.&u |
| Map5 | (U,P) | Pay.R2.Pro | Com.00.Pro | Inv.R1.Pro |
| Map6 | (U,P) | Pay.R2.Tst | Com.00.Tst | Inv.R1.Tst |
| Map7 | (U,U) | Pay.R2.&u | Com.00.Adm | Inv.R1.&u | the Inv-Com pair:

| Map1 | (U,P) | Pay.R1.Pro | Com.00.Pro | Inv.R1.Pro |
| Map2 | (U,P) | Pay.R1.Fix | Com.00.Pro | Inv.R1.Pro |
| Map3 | (U,P) | Pay.R1.Tst | Com.00.Tst | Inv.R1.Tst |
| Map4 | (U,U) | Pay.R1.&u | Com.00.Adm | Inv.R1.&u |
| Map5 | (U,P) | Pay.R2.Pro | Com.00.Pro | Inv.R1.Pro |
| Map6 | (U,P) | Pay.R2.Tst | Com.00.Tst | Inv.R1.Tst |
| Map7 | (U,U) | Pay.R2.&u | Com.00.Adm | Inv.R1.&u | and the Pay-Inv pair:

| Map1 | (U,P) | Pay.R1.Pro | Com.00.Pro | Inv.R1.Pro |
| Map2 | (U,P) | Pay.R1.Fix | Com.00.Pro | Inv.R1.Pro |
| Map3 | (U,P) | Pay.R1.Tst | Com.00.Tst | Inv.R1.Tst |
| Map4 | (U,U) | Pay.R1.&u | Com.00.Adm | Inv.R1.&u |
| Map5 | (U,P) | Pay.R2.Pro | Com.00.Pro | Inv.R1.Pro |
| Map6 | (U,P) | Pay.R2.Tst | Com.00.Tst | Inv.R1.Tst |
| Map7 | (U,U) | Pay.R2.&u | Com.00.Adm | Inv.R1.&u |

These maps imply the following variant-pair mappings:

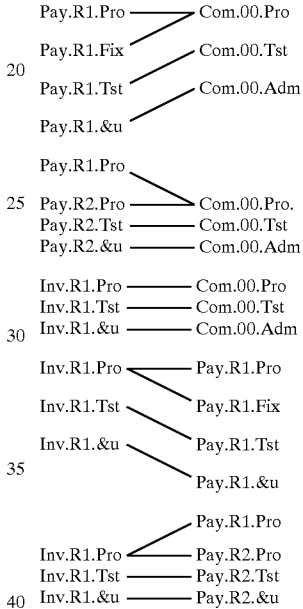

4.3.1 Ranking of Variant Maps

In their role of controlling the promote process, update variant maps have a hierarchical relationship to each other. The parent of an update variant map is that update map which contains nodes on all the same search paths (neither more nor less) and in which at least one of the nodes is at the next higher level in its search path. The mapping rules ensure that there is not more than one such map.

Some maps have no parent map.

Variant Map Paths

Groups of maps whose members are related in this way are known as variant map paths. The top map in each variant map path is one that has no parent, and each such group forms a single path; that is, not more than one subordinate of each map appears in the same group.

Two maps may have the same parent map. For this reason, some maps may participate in more than one variant map path.

For example, the seven update maps defined in FIG. 14 would form two variant map paths:

| Map1 | Map1 |
| Map2 | Map5 |

-continued

| Map3 | Map6 |
|------|------|
| Map4 | Map7 |

Note that Map1 appears in two variant map paths, because it is the parent of two variant maps.

4.3.2 How Variant Map Definitions Affect Data Integrity

Alterations to the repository always cause data integrity—the syntactic and semantic integrity provided by the VDMS via integrity policies, delete propagation, relationship semantics, and constraint checking—to be checked based on the search paths being used at the time of the operation, whether the current variant map is protected or not. Any violations cause the operation to fail. In addition, the VDMS also checks that data integrity has not been violated for any protected variant map.

When any alteration is made to an instance that could affect the point of view from a protected variant map, data integrity checking may be done either immediately or at commit time (depending on the type of integrity check). If data integrity is violated for any of the protected variant maps, then the action will fail.

Note that data read using an unprotected variant map may not conform to all data-integrity constraints.

Given that it is possible to cause a data integrity violation to an unprotected variant map, a VDMS-supplied tool is provided that can be invoked at any time to check a variant map for data integrity violations and issue messages for all violations found. For more detailed information about data integrity, see 8.0, Data Integrity.

5.0 CONTEXT: ENVIRONMENTAL VARIABLES

The term context is introduced to refer to a set of environmental variables which supply default information or otherwise affect the functioning of the VDMS. Each VDMS host session has its own context, or set of current values, whose identity, for a given user, is preserved from one session to the next.

All information needed to support versioning for logical-mode actions, such as the search path to use for retrievals, may be obtained by the VDMS from the current context rather than being supplied by the tool. This allows "old tools"—tools written to operate on unversioned data—to function in the same way, and without modification, on the versioned form of the same data. It also allows new tools, written to deal with versioned data, to avoid special logic to deal explicitly with the versioning mechanisms.

5.1 Variant Default Groups

For a tool which includes versioning fields in its templates, the version domain of the first instance of a new part can be specified in a template field. However, since "old tools" do not have template fields mapping to version attributes, there must be a mechanism for specifying a default variant domain.

Specifying one default variant domain for the entire repository is not acceptable, since some old tools may add parts in more than one submodel, each of which is likely to have a different versioning scheme and therefore different variant domains. The alternative of specifying one default per entity type is too granular.

To solve this problem, entity and relationship types are grouped into named variant default groups. Each type is in exactly one variant default group. The VDMS will supply variant default groups for all VDMS-supplied entity and relationship types. The user may change these assignments.

5.2 Versioning Context Variables

The new context variables to support versioning are:
current variant map name
variant time cursor
   start time
   end time
revision time cursor
   start time
   end time
promote group name
variant defaults (one set of values for each variant default group)
   default variant domain
   default variant time range
      start time
      end time These variables may affect all data service actions against templates mapping to versioned entities and relationships. The values of these variables may be queried.

An application interface is provided to assign values to these variables. Through this interface a group of variable values may be saved as a named set, and later made current again. Once saved, the named set of variables is available globally to all VDMS sessions on the same host. This interface will also support queries of the existing saved context names.

A default context name, for use when there is no saved context name—for example, in the case of a new user—is provided by the VDMS. The VDMS does not provide the actual context, however. The user administrator must define the context and all the constructs named by it, during the installation of the VDMS, before any user accesses data using the default context name.

5.2.1 Variant Map

The current variant map specification determines the search paths in effect for data service actions that use a search path. See the section titled 4.0. Search Paths, Variant Hierarchies, and Variant Maps for details on search paths.

Universal Search Path

A special value, representing the universal search path, may be specified as the variant map name. This setting allows retrieval of all variants from any and all variant domains, without requiring the user to define a variant map that includes them all. The universal search path can only be used for physical-mode retrievals.

New-user Default

There is no default for this variable. It must be explicitly set before actions requiring it can be executed.

5.2.2 Time Cursors

All times are represented as the UTC equivalent of the local time. Use of local time causes problems when switching from daylight time to standard time, causing the last hour of daylight time to be repeated. This could lead to a case where event 2 (such as when a revision is no longer current) which actually occurred after event 1 (such as when the revision was created) appears to have occurred before event 1.

All times are stored in a format having the following characteristics:
   The same value represents precisely the same date and time on any platform.
   The values collate in the same order as the dates and times they represent.
   The means used to generate these values never produces the same value more than once on any given system.

Any of the time cursors may be set to represent current clock time. When so set, the value of the cursor remains fixed for the duration of a single action. The current clock time value used for setting last-updated time stamps will likewise remain fixed for the duration of a single action.

Variant Time Cursor
Logical Mode

In logical mode, the variant time cursor represents a single point in time defined by the variant cursor start time. The variant time cursor restricts the domain for any data retrieval to instances whose variant time ranges overlap this cursor.

Physical Mode

In physical mode, both the variant start and end time cursors are used to represent a range of times. The variant time cursors restrict the domain for any data retrieval to instances whose variant time ranges overlap this range. This is equivalent to saying that the domain is restricted to instances where:

(InstanceVariantStartTime<VariantCursorEndTime)
A N D
(VariantCursorStartTime<InstanceVariantEndTime)

Specifying the earliest possible variant cursor start time and the latest possible variant cursor end time allows all versions of a part to appear in a domain regardless of their variant times.

Literal Mode

In literal mode, the variant time cursors are ignored.

New-user Default

For a new user, the variant cursor start time and variant cursor end time are both set to current time.

Revision Time Cursor
Logical Mode

In logical mode, the revision time cursor represents a single point in time defined by the revision cursor start time. The revision time cursor restricts the domain for any data retrieval to instances whose revision time range overlap this cursor. Note that the revision time cursor cannot be set to a time in the future.

Physical Mode

In physical mode, both the revision start and end time cursors are used to represent a range of times. The revision time cursors restrict the domain for any data retrieval to instances whose revision time range overlap this range. Note that the revision cursor start time cannot be set to a time in the future, and the end time must be greater than or equal to the start time. This is equivalent to saying that the domain is restricted to instances where:

(InstanceRevisionStartTime<RevisionCursorEndTime
or InstanceRevisionStartTime<=
RevisionCursorStartTime)
A N D
RevisionCursorStartTime<InstanceRevisionEndTime Specifying the earliest possible revision cursor start time and the latest possible revision cursor end time allows all versions of a part to appear in a domain regardless of their revision times.

Literal Mode

In literal mode, the revision time cursors are ignored.

New-user Default

For a new user, the revision cursor start time and revision cursor end time are both set to current time.

5.2.3 Promote Group Name

See 6.7, Promote Groups for an explanation of promote groups.

5.2.4 Variant Default Values

This variable consists of a list of values: each element of the list contains a variant default group name followed by values for each of the following:

Default Variant Domain

The default variant-domain attribute value is used for a logical-mode ADD action when there is no template field for the variant-domain attribute, or the field is null.

When needed for an ADD action, the default variant domain must be one of the variant domains in the current variant map. If it is not, or if there is no default value, the action fails.

Default Variant Effective Times

These values, each of which takes the form of a time stamp, are used for logical ADD actions when the template fields mapping to the variant start and end times either do not exist or are null. When the template fields exist and have a non-null value, then the values in the template are used.

New-user Default

These values default respectively to the earliest and latest possible times.

5.3 How to Set Context to See Everything

By using Physical mode and the Universal Search Path it is possible to retrieve instances with any and all variant IDs in every search path within all variant domains.

By setting the appropriate variant time cursor values it is possible to retrieve all variants that are effective within the variant time range set.

By setting the appropriate revision time cursor values it is possible to retrieve all revisions that existed within the time range set.

To retrieve absolutely everything, set the Universal Search Path, and set the variant and revision time cursors as follows:

Variant cursor start time: earliest possible
Variant cursor end time: latest possible
Revision cursor start time: earliest possible
Revision cursor end time: latest possible 6.0 PROMOTE When parts are promoted, the versions of those parts previously seen from the working variant level become the versions of those parts seen from the next higher level and, potentially, from other levels which have the higher level in their search path. When an instance at the Pay.R1.Fred level is promoted to the Pay.R1.Test level, it may then be seen from all of the other Pay.R1.&USERID levels. Parts are typically promoted when they reach a degree of readiness that warrants their being seen by a wider audience.

6.1 The Promote Tool

Because it will normally be the case that a group of parts must be promoted together, such as those parts which were changed to fix a given problem, no PROMOTE action operating on a single instance is externalized. Instead, a promote tool is provided to promote groups of parts.

The promote tool can be used either to promote all of the parts with versions at the working variant level or to promote those parts in one or more promote groups. The concept of a promote group is described in 6.7, Promote Groups.

The promote tool determines whether it can promote the parts in the specified promote groups without also promoting other promote groups, orders the parts so as to avoid data integrity errors and unnecessary delete propagation, promotes each part, identifies and reports which promoted parts, if any, caused the loss of a change made in parallel and previously seen from the level to which the promote was made, and recovers if any such parallel changes were lost. In order to facilitate this recovery, the promote tool cannot be invoked if there is any uncommitted data. (The recovery includes performing a RESTORE.)

The promote tool does not perform a COMMIT whether it successfully promotes all of the parts or not.

There are actually two promote tools, one of which will be referred to as the promote_force tool. Once an attempt to promote a part via either tool has been made, but has failed because its promote caused the loss of parallel changes, only the promote_force tool can be used to promote it. The only difference between the two tools is in their ability to promote such parts. The normal promote tool treats such parts like others which cause the loss of a parallel change—identifying and reporting them, and recovering after performing all the promotes by doing a RESTORE.

The promote tool is described in 10.1, Promote/Cancel Tool. This same tool can also be used to cancel parts.

6.2 The Internal PROMOTE Action

A PROMOTE is accomplished by clipping the revision end time of the instance at the working variant level, and copying it to an instance with the next higher variant ID. (The clipped instance is retained to record the state of the data before the promote.)

If there was already an instance with the next higher variant ID, it is replaced by the promoted instance. This has the same effect as updating the instance at the higher level. If that instance was frozen, a new revision of it is created, with the time of the promote as its revision start time. If there was not an instance with the next higher variant ID, one is created, with the time of the promote as its revision start time.

For example, suppose there is an entity type whose instances represent relational tables, and the following instances exist, representing the Empl table:

| Keys | | | |
|---|---|---|---|
| Part | Variant | Revision | FM |
| Empl | Pay.R1.Test | 10—>> | on |
| Empl | Pay.R1.Fred | 20—>> | off | where 'FM' stands for "freeze marker." (For the sake of simplicity, variant effective times will not be considered.) If the Pay.R1.Fred instance is promoted at time 30, it will replace the Pay.R1.Test instance as the current revision at that level, leaving the data in the following state:

| Keys | | | |
|---|---|---|---|
| Part | Variant | Revision | FM |
| Empl | Pay.R1.Test | 10–30 | on |
| Empl | Pay.R1.Test | 30—>> | off |
| Empl | Pay.R1.Fred | 20–30 | on |

None of the instance data changes other than attributes set by derivation policies defined to execute at promote time. The promoted instance still has all the logical and physical relationships that the input instance had.

For the internal PROMOTE action, any Action Mode value can be used. However, regardless of the Action Mode, the variant map in context is used to determine the promote-from and the promote-to levels, as described in 6.3, Promote-from and Promote-to Variants. In this sense, it always behaves like a logical mode action.

The only difference in the effect of the action for different Action Modes is that in logical and physical modes, the revision time range is determined by the VDMS based on the time of the action, while in literal mode, it is set to the values in the template fields.

The internal PROMOTE action determines whether any change has been made in parallel to the part being promoted, and is seen from the level to which it is being promoted, and reports this as a warning condition. It also checks whether such a condition was detected and flagged by a previous invocation of the promote tool, and reports this as a warning condition. (See 6.5, Timestamp Checking for Promote for a description of this checking.)

There is another internal action called PROMOTE_FORCE, which differs from the PROMOTE action only in that it does not check whether a previous invocation of the promote tool detected and flagged the fact that a parallel change was made to the part. The PROMOTE_FORCE action is used by the promote_force tool.

6.3 Promote-from and Promote-to Variants

An instance is promoted from the working variant in the variant map of the current context to the variant ID in the next variant map above it in the variant map path.

For example, suppose the following variant map path exists:

| Map 1: | Pay.R1.Prod | Com.R3.Prod |
|---|---|---|
| Map 2: | Pay.R1.Test | Com.R3.Test |
| Map 3: | Pay.R1.&USERID | Com.R3.&USERID |

If the context is set to Map 3, and the part A.Pay.R1.Fred is promoted, it will go to the Pay.R1.Test level. The part B.Com.R3.Fred would go to the Com.R3.Test level.

Because the promote-from and promote-to variants are identified by the variant map in context, it is possible to promote a group of parts which are in different variant domains without changing the context. (Such as parts A and B in the above example.)

When a group of parts is being promoted, it is possible that not all of the parts in the group have a version at the promote-from level. The VDMS will allow a tool to issue the PROMOTE action for all of the parts in such a group, and will treat the action as a no-op (rather than an error) for those parts which do not have a version at the promote-from level. This frees the tool from having to check the levels of all the parts ahead of time.

Another case where the VDMS treats the action as a no-op is when both the variant map in context and the variant map above it in the path include the variant ID of the instance being promoted. For example, suppose that instead of the variant map path shown above, the path was:

| Map 1: | Pay.R1.Prod | Com.R3.Prod |
|---|---|---|
| Map 2: | Pay.R1.Test | Com.R3.Test |
| Map 3: | Pay.R1.&USERID | Com.R3.Test |

And suppose that the following instances existed:
A.Pay.R1.Fred
B.Com.R3.Test

If the context was set to Map 3, and both A and B were promoted, the following instances would result:
A.Pay.R1.Test
B.Com.R3.Test Note that the action was a no-op for part B. It would not have made sense to promote B all the way to the Com.R3.Prod level, while only promoting A to the Pay.R1.Test level. If the context is now changed to Map 2, and both parts are again promoted, the following instances result:
A.Pay.R1.Prod
B.Com.R3.Prod 6.4 Data Integrity Checking at Promote Time For purposes of data integrity checking, both the variant map of the current context and the variant map above it in the variant map path are treated as "current." Even if one or both of these variant maps is defined as unprotected, the PROMOTE action will not be allowed to introduce a data integrity violation from the point of view of that variant map. (Since a promote never changes the data as viewed from the variant map in context, however, no checking need be done for that view of the data. Only the view of the data for the next higher variant map must be checked.)

It is a general principle that different data integrity checking is triggered by different actions. For example, checking for a mandatory relationship is triggered by the add of an entity or the delete of a relationship, but not by the update of an entity. When deciding what data integrity checking to perform for the variant map to which data was promoted, the logical effect of the promote at that level is used. The logical effect of a promote to a given variant map level is:

ADD if, from the promote-to level, the promoted instance is visible after the promote, but either no instance was visible before the promote, or the instance that was visible had a different create timestamp. (The latter would occur if a part was deleted and re-added at the promote-from level.)

UPDATE if, from the promote-to level, the promoted instance is visible after the promote, and an instance with the same create timestamp was visible before the promote.

DELETE if, from the promote-to level, the promoted instance is not visible after the promote, but an instance was visible before the promote.

No-operation if, from the promote-to level, the promoted instance is not visible after the promote, and no instance was visible before the promote.

6.5 Timestamp Checking for Promote

When a part is promoted, the VDMS checks to see if there was already a version of the part on the search path starting at the promote-to variant, and that version has changed since the instance being promoted was drawn down. If this is the case for any part in the group being promoted, the promote tool will fail with a Promote Sync error. Before returning, however, the tool will promote all of the parts in the group in order to detect and record all of the Promote Sync violations. It will then do a RESTORE, followed by a RESET for each part that had a Promote Sync error.

The check performed is a comparison of the drawdown-from timestamp of the input instance with the last-change timestamp of the first instance above it in the search path (even if that instance is logically deleted). If the timestamps are not equal, the Promote Sync error results.

If the input instance was added at its current level or a lower level in the variant hierarchy, rather than being drawn down from a higher level, its drawdown-from timestamp will be null. In this case, the lack of an instance above it in the search path constitutes a "match." If there is an instance above it, the Promote Sync error results.

For the search path User-→Test-→Prod, the promote of A from User to Test can get the Promote Sync error even if there is no version of A at the Test level. In this case, if the data at the Prod level has changed since A was drawn down to the User level, the promote tool will fail.

Using the example of an entity type whose instances represent relational tables, suppose that there was a version of the Empty table at the Pay.R1.Prod level, which was last changed at time 10. At time 20, it was drawn down to the Pay.R1.Fred level, and updated. The state of repository datad would be:

| | Keys | | | | |
|---|---|---|---|---|---|
| Part | Variant | Revision | CR | LC | DF |
| Empl | Pay.R1.Prod | 10—>> | 10 | 10 | — |
| Empl | Pay.R1.Fred | 20—>> | 10 | 20 | 10 | where 'CR' stands for "create timestamp," 'LC' stands for "last-change timestamp," and 'DF' stands for "drawdown-from timestamp." A subsequent promote would succeed, because the last-change timestamp of the Pay.R1.Prod version matches the drawdown-from timestamp of the Pay.R1.Fred version.

However, if another update was made to the Pay.R1.Prod version before the promote (at time 30), the state of repository data would be:

| | Keys | | | | |
|---|---|---|---|---|---|
| Part | Variant | Revision | CR | LC | DF |
| Empl | Pay.R1.Prod | 10–30 | 10 | 10 | — |
| Empl | Pay.R1.Prod | 30—>> | 10 | 30 | — |
| Empl | Pay.R1.Fred | 20—>> | 10 | 20 | 10 |

A subsequent promote would fail, because the last-change timestamp of the current Pay.R1.Prod version does not match the drawdown-from timestamp of the Pay.R1.Fred version.

6.5.1 Recovery from Promote Sync Errors

As the promote tool runs, it maintains a list of all the parts which have Promote Sync errors or whose force-required flags are set. When all the parts have been promoted, if this list has any entries, the promote tool

- does a RESTORE to undo the promotes,
- does a RESET for each part in the list, and
- reports these parts and their reasons for being on the list to its invoker.

The effect of the RESET is to set the force-required flag of an instance so that it can only be successfully promoted via the PROMOTE_FORCE action, and to adjust its drawdown-from timestamp so that no Promote Sync violation will be detected on the next PROMOTE or PROMOTE_FORCE. unless further changes have been made from the point of view of the next higher variant map. When the action is applied to a part whose force-required flag has already been set, it still adjusts its drawdown-from timestamp.

Given the previous example in which a promote would fail, the data after the RESET had been used would be:

| | Keys | | | | | |
|---|---|---|---|---|---|---|
| Part | Variant | Revision | CR | LC | DF | FR |
| Empl | Pay.R1.Prod | 10–30 | 10 | 10 | — | N |
| Empl | Pay.R1.Prod | 30—>> | 10 | 30 | — | N |
| Empl | Pay.R1.Fred | 20—>> | 10 | 20 | 30 | Y | where 'FR' stands for "force-required."

The RESET action is not externalized.

In addition to the normal promote tool, a promote_force tool is also provided, which can be used to promote instances regardless of whether their force-required flag has been set. This tool should only be used after having reconciled the version being promoted with the version it will logically (and perhaps physically) replace, for each part in the list of Promote Sync errors.

6.5.2 Delete Propagation During Promote

When a logically-deleted instance is promoted, delete propagation is performed, if necessary, at the promote-to level, for all associated relationships visible from that level. Similarly, if the logically deleted instance being promoted is a controlling relationship, the controlled part is also logically deleted (if this has not already occurred). Every part deleted as a result of this process is drawn down to the promote-to level if necessary before being marked deleted. This maintains referential ential integrity at the promote-to level.

During this process, the timestamp check described above is performed against each instance to be deleted as a result of propagation, with the corresponding part at the promote-from level as the "input instance." If the check fails, or if there is no instance at the promote-from level, the Promote Sync error results. This check is necessary to prevent the promote from inadvertently destroying a change made at a higher level since the time the part originally promoted was drawn down.

Suppose, for the above example, that there was also an entity type whose instances represent relational columns, and a relationship type whose instances relate relational tables to the columns they contain. Assume that at the Pay.R1.Prod level, there is a version of an entity representing the Ser column, and a relationship between it and the Empl table. Two changes have been made at the Pay.R1.Fred level. At time 15, the Empl.Ser relationship was deleted, and at time 20, the Empl entity was deleted. This resulted in the following:

| | | Keys | | | | |
|---|---|---|---|---|---|---|
| Part | Variant | Revision | CR | LC | DF | DM |
| Empl | Pay.R1.Prod | 10—>> | 10 | 10 | — | off |
| Empl | Pay.R1.Fred | 20—>> | 10 | 20 | 10 | on |
| Empl.Ser | Pay.R1.Prod | 12—>> | 12 | 12 | — | off |
| Empl.Ser | Pay.R1.Fred | 15—>> | 12 | 15 | 12 | on | where 'DM' stands for "delete marker." If only the deleted entity were later promoted, delete propagation to the relationship at the Pay.R1.Test level would also occur. At this time, the last-change timestamp of Empl.Ser at the Pay.R1.Prod level would be compared with its drawdown-from timestamp at the Pay.R1.Fred level to determine whether the action could be completed. For this example, the action could be completed, since the timestamps match.

If the timestamps match for the instance to which delete propagation applies, the drawdown-from timestamp of the instance at the promote-from level is reset to the last-change timestamp of the promote-to level instance after it has been changed to reflect the delete. This avoids conflict when the part is later promoted. For this example, the result would be:

| | | Keys | | | | |
|---|---|---|---|---|---|---|
| Part | Variant | Revision | CR | LC | DF | DM |
| Empl | Pay.R1.Prod | 10—>> | 10 | 10 | — | off |
| Empl | Pay.R1.Test | 30—>> | 10 | 20 | 10 | on |
| Empl | Pay.R1.Fred | 20–30 | 10 | 20 | 10 | on |
| Empl.Ser | Pay.R1.Prod | 12—>> | 12 | 12 | — | off |
| Empl.Ser | Pay.R1.Test | 30—>> | 12 | 30 | 12 | on |
| Empl.Ser | Pay.R1.Fred | 15—>> | 12 | 15 | 30 | on |

A subsequent promote of the relationship at the Pay.R1.Fred level will also succeed because its drawdown-from timestamp matches the last-change timestamp of the instance at the Pay.R1.Test level.

If the Pay.R1.Prod version of the Empl.Ser relationship had been changed between the time it was drawn down to the Pay.R1.Fred level and the time the Empl entity was promoted, its last-change timestamp would have changed so as not to match the drawdown-from timestamp of the Pay.R1.Fred version of the relationship. This would have caused the promote of the deleted Empl entity to fail. The Empl.Ser relationship would have been added to the report of parts with Promote Sync errors, and the RESET would have been applied to it by the promote tool.

A promote of the Empl entity would also have failed if there were originally no Empl.Ser relationship at either the Pay.R1.Prod or the Pay.R1.Fred levels, and one was added at the Pay.R1.Prod level after having deleted the Empl entity from the Pay.R1.Fred level. In this case, the data before the promote would be:

| | | Keys | | | | |
|---|---|---|---|---|---|---|
| Part | Variant | Revision | CR | LC | DF | DM |
| Empl | Pay.R1.Prod | 10—>> | 10 | 10 | — | off |
| Empl | Pay.R1.Fred | 20—>> | 10 | 20 | 10 | on |
| Empl.Ser | Pay.R1.Prod | 22—>> | 22 | 22 | — | off |

If the relationship had existed when the logical delete occurred, it would also have been drawn down. Because there is no instance of the relationship at the Pay.R1.Fred level, the VDMS can deduce that the relationship at the Pay.R1.Prod level was added later, and the promote fails. The Empl.Ser relationship is added to the report of parts with Promote Sync errors, and the RESET is applied to it by the promote tool.

Note, however, that in this case, there is initially no relationship instance at the Pay.R1.Fred level in which the force-required bit can be set by the RESET action. The action will draw the relationship down to the Pay.R1.Fred level in order to do so. Although the relationship is not logically deleted, it is not visible because its source is logically deleted. The resulting data is:

| | | Keys | | | | | |
|---|---|---|---|---|---|---|---|
| Part | Variant | Revision | CR | LC | DF | DM | FR |
| Empl | Pay.R1.Prod | 10—>> | 10 | 10 | — | off | N |
| Empl | Pay.R1.Fred | 20—>> | 10 | 20 | 10 | on | N |
| Empl.Ser | Pay.R1.Prod | 22—>> | 22 | 22 | — | off | N |
| Empl.Ser | Pay.R1.Fred | 30—>> | 22 | 22 | 22 | off | Y |

If a part has been drawn down, deleted, and re-added (determined by its create timestamp), then when it is promoted to a level where the original part is still visible (not logically deleted), delete propagation is performed for all associated relationships of the original part visible at that level, in the same manner as described above.

As a variation on the first example above, suppose that after being deleted at time 20 at the Pay.R1.Fred level, the Empl entity was re-added. The state of repository data would be:

| | Keys | | | | | |
|---|---|---|---|---|---|---|
| Part | Variant | Revision | CR | LC | DF | DM |
| Empl | Pay.R1.Prod | 10—>> | 10 | 10 | — | off |
| Empl | Pay.R1.Fred | 20–30 | 10 | 20 | 10 | on |
| Empl | Pay.R1.Fred | 30—>> | 30 | 30 | 10 | off |
| Empl.Ser | Pay.R1.Prod | 12—>> | 12 | 12 | — | off |
| Empl.Ser | Pay.R1.Fred | 15—>> | 12 | 15 | 12 | on |

If only the Empl entity is subsequently promoted (at time 40), the VDMS knows, because of the differing create timestamps at the to- and from-levels, that the entity was deleted and re-added. Therefore, it performs delete propagation at the to-level, resulting in:

| | Keys | | | | | |
|---|---|---|---|---|---|---|
| Part | Variant | Revision | CR | LC | DF | DM |
| Empl | Pay.R1.Prod | 10—>> | 10 | 10 | — | off |
| Empl | Pay.R1.Test | 40—>> | 30 | 30 | 10 | off |
| Empl | Pay.R1.Fred | 20–30 | 10 | 20 | 10 | on |
| Empl | Pay.R1.Fred | 30–40 | 30 | 30 | 10 | off |
| Empl.Ser | Pay.R1.Prod | 12—>> | 12 | 12 | — | off |
| Empl.Ser | Pay.R1.Test | 40—>> | 12 | 40 | 12 | on |
| Empl.Ser | Pay.R1.Fred | 15—>> | 12 | 15 | 40 | on |

6.6 Resetting of Drawdown-from Timestamp and Force-required Flag by Promote

When a promote succeeds, and there was previously no instance of the part at the promote-to level:

The drawdown-from timestamp of the promoted instance is not changed.

If the force-required flag of the promoted instance was on, it is turned off.

Having reconciled any parallel changes to an instance being promoted and to the next instance above it in the variant map path, PROMOTE_FORCE need only be used once, not on every promote between the two levels.

When a promote succeeds, and there was already an instance of the part at the promote-to level, it s replaced by the instance at the promote-from level:

The drawdown-from timestamp of the resulting instance at the promote-to level is set to the same value as the drawdown-from timestamp of the instance it replaced. This allows an instance at the Pay.R1.Test level, for example, to be repeatedly drawn down and promoted back, and still eventually be promoted to the Pay.R1.Prod level.

For example, suppose that the following instances of the Empl entity exist:

| | Keys | | | | |
|---|---|---|---|---|---|
| Part | Variant | Revision | CR | LC | DF |
| Empl | Pay.R1.Prod | 10—>> | 10 | 10 | — |
| Empl | Pay.R1.Test | 25—>> | 10 | 20 | 10 |
| Empl | Pay.R1.Fred | 20–25 | 10 | 20 | 10 |
| Empl | Pay.R1.Fred | 30—>> | 10 | 30 | 20 | showing that the Empl table was drawn down to the Pay.R1.Fred level, promoted to the Pay.R1.Test level, and then drawn down to the Pay.R1.Fred level again.

Since the ultimate source of the current Pay.R1.Fred instance was the Pay.R1.Prod instance, which has not changed, it should be possible to promote it all the way back to the Pay.R1.Prod level. Timestamp checking will allow it to be promoted to the Pay.R1.Test level. However, if no change were made to the drawdown-from timestamp of the promoted instance, timestamp checking would fail when a promote to Pay.R1.Prod was attempted. Instead, the promoted instance picks up the drawdown-from timestamp of the instance it replaces, as shown below.

| | Keys | | | | |
|---|---|---|---|---|---|
| Part | Variant | Revision | CR | LC | DF |
| Empl | Pay.R1.Prod | 10—>> | 10 | 10 | — |
| Empl | Pay.R1.Test | 25–35 | 10 | 20 | 10 |
| Empl | Pay.R1.Test | 35—>> | 10 | 30 | 10 |
| Empl | Pay.R1.Fred | 20–25 | 10 | 20 | 10 |
| Empl | Pay.R1.Fred | 30–35 | 10 | 30 | 20 |

The force-required flag of the resulting instance at the to-level is set to the same value as the force-required flag of the instance it replaced. This insures that if force was originally required to promote to the next higher level, it is still required.

Consider the following extension of the above example. In this case, before drawing the Empl entity down to the Pay.R1.Fred level for the second time (at time 30), an attempt was made to promote from Pay.R1.Test to Pay.R1.Prod. This attempt failed because the Empl entity had been changed at the Pay.R1.Prod level since it was drawn down. As a result, the promote tool did a RESET.

| | Keys | | | | |
|---|---|---|---|---|---|
| Part | Variant | Revision | CR | LC | DF | FR |
| Empl | Pay.R1.Prod | 10–15 | 10 | 10 | — | N |
| Empl | Pay.R1.Prod | 15—>> | 10 | 15 | — | N |
| Empl | Pay.R1.Test | 25—>> | 10 | 20 | 15 | Y |
| Empl | Pay.R1.Fred | 20–25 | 10 | 20 | 10 | N |
| Empl | Pay.R1.Fred | 30—>> | 10 | 30 | 20 | N |

Although a normal promote from Pay.R1.Fred to Pay.R1.Test is now allowed, given that the timestamps match, reconciliation is still required before promoting the rest of the way to Pay.R1.Prod. Therefore, when the first promote succeeds, the promoted instance picks up both the drawdown-from timestamp and the force-required flag of the instance it replaces:

| | Keys | | | | | |
|---|---|---|---|---|---|---|
| Part | Variant | Revision | CR | LC | DF | FR |
| Empl | Pay.R1.Prod | 10–15 | 10 | 10 | — | N |
| Empl | Pay.R1.Prod | 15—>> | 10 | 15 | — | N |
| Empl | Pay.R1.Test | 25–35 | 10 | 20 | 15 | Y |
| Empl | Pay.R1.Test | 35—>> | 10 | 30 | 15 | Y |
| Empl | Pay.R1.Fred | 20–25 | 10 | 20 | 10 | N |
| Empl | Pay.R1.Fred | 30–35 | 10 | 30 | 20 | N |

6.7 Promote Groups

Tools will frequently want to promote a group of parts together, such as those parts which were changed to fix a certain problem. The VDMS of the present invention provides for this in the form of Promote Groups.

Without some help, even new tools, aware of versioning, will not know everything that needs to be promoted. Suppose that relationship AB is controlling for B. If a versioning-smart tool deletes A, it knows to add A to the group of things it will promote later. However, the VDMS propagates this delete to B without the tool's knowledge. So the tool does not know to add B to the promote group.

But the VDMS cannot assume that when the tool promotes A it should automatically promote B as well. For instance, suppose that the following instances exist, where the relationship AB is controlling:
A.Pay.R1.Prod
AB.Pay.R1.Prod
B.Pay.R1.Prod
In fixing APAR 15, Fred deletes B, which results in:
A.Pay.R1.Prod
¬AB.Pay.R1.Prod
¬ B.Pay.R1.Prod
Before promoting, Fred works on APAR 20, deleting A, which results in:
¬ A.Pay.R1.Prod
¬AB.Pay.R1.Prod
¬ B.Pay.R1.Prod
If Fred then promotes A, the VDMS cannot automatically promote AB and B, because they were deleted in conjunction with APAR 15. APAR 15 may have affected other parts as well, and not be ready for promotion.

Instead, an environmental variable is provided to identify the current promote group. Every add, update, delete, or explicit drawdown of an entity or a relationship causes the output variant to be added to the current promote group. This is true whether or not the action resulted in a drawdown. If the tool deletes entity A, and this delete propagates to entity B, related to A by controlling relationship AB, the VDMS adds variants of A, AB, and B to the promote group.

A VDMS-supplied promote tool can be used to promote or cancel all of the parts in a given promote group which are accessible via the current variant map, as described in 10.1, Promote/Cancel Tool.

Promote groups work as follows for the scenario described above. If the current promote group was APAR 15 when B was deleted, and was APAR 20 when A was deleted, the VDMS would promote A and B independently when their groups were promoted.

A given variant of a part may be in more than one promote group. It is perfectly possible for two updates to be made to the same variant of a part in connection with two different fixes. In this case, the changes made for those two fixes are now entangled with each other. When there are overlapping promote groups, and the promote tool is called to promote some, but not all, of them, an error will result.

Beyond this feature of the promote tool, the VDMS requires no special support for making the changes in one promote group a pre-req or co-req for the changes in another promote group. Although a tool may examine the contents of promote groups and the derivation history relationships to identify pre-req and co-req promote groups, the VDMS need not do so itself.

When variants of a part in a group are promoted, they remain in the group. The specification of the group is updated to reflect the new variant ID after the promote. In this way, a group continues to have integrity as its members are promoted. The same group can be repeatedly promoted to move all of its parts to successively higher levels of the variant hierarchy. A variant of a part can be removed from the group when it reaches the top of its promote path (i.e. it cannot be promoted further). However, the VDMS will not automatically perform this removal.

If there was already a variant of the part at the promote-to level, and it was in a promote group, the variant of the part remains in that promote group. It is just embodied by a different instance after the promote. This situation could arise if the Pay.R1.Test variant of part A was associated with APAR20, then after it is drawn down, changed, and promoted as part of APAR25, the Pay.R1.Test variant of part A (although it is a different instance) is still part of APAR20, as well as APAR25.

It is also possible for two variants of part A, such as Pay.R1.Test and Pay.R1.Mary, to be in the same promote group. For example, if the Pay.R1.Test variant of A was associated with APAR20, and a problem was discovered with the fix. A further update to A might be made by Fred, causing A to be drawn down, and causing the Pay.R1.Fred variant to also be associated with APAR20. In this case, after the Pay.R1.Fred variant is promoted, only the Pay.R1.Test variant will be associated with APAR20.

Each promote group has a name. There is a definitional function provided to add, delete, update, and query promote groups. There is also an interface provided to add entries to and delete entries from a promote group. The query function includes the ability to query the entries in a particular promote group and to query which promote groups contain a given variant of a given part. A promote group must have been added before the environmental variable can name it as the current group.

Every variant of a part in the repository (except possibly those at the top of their variant hierarchies) belongs to at least one promote group. And every action which writes repository data will access the definition of the current group. This makes the implementation of promote groups significant for performance.

This implementation is a matter of choice that would be apparent to one skilled in the art. However, the following points are considered important regardless of implementation:

The members of a promote group are specific variants of parts. That is, the part key and variant key must be identified. It is not necessary for the revision key to be identified.

The specification of the members of a promote group must be committed in the same commit scope as repository data.

Following is a scenario to illustrate promote groups. The figures will show only activity against entities A and B. However, the promote groups will include entities X and Y, which have also had changes made to them. The relationship AB is controlling for B. The abbreviation "WV" means "working variant," and "PG" means "promote group." Dashed lines are used to represent logically deleted instances.

At the start of the scenario, there are instances of A and B at the P level. There is also an instance of B at the T level which is in promote group G1, along with X.T.

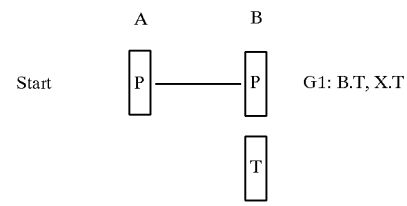

The first change is to delete A with the working variant set to U and the promote group set to G2. This causes A, B, and the relationship AB to be deleted at the U level, and to be put in promote group G2.

```
                    A         B
WV = U             P --------P          G1: B.T, X.T
PG = G2                                 G2: A.U, B.U, AB.U
Delete A

T

[ ]       [ ]
                    U ------- U
                   [ ]       [ ]
```

Next, the promote group is changed to G3 and B is re-added. B.U is put in promote group G3, along with Y.U, which was put there due to some other activity not illustrated here.

```
                    A         B
WV = U             P --------P          G1: B.T, X.T
PG = G3                                 G2: A.U, B.U, AB.U
Add B                                   G3: B.U, Y.U

T

[ ]
                    U ------- U
                   [ ]
```

Now the promote tool is invoked to promote the variants in group G2. This results in an error, because B.U is also in group G3, but G3 is not being promoted.

| WV = U | ERROR - B.U is also in G3 |
|---|---|
| Promote Tool (G2) | |

The promote tool is invoked again to promote both groups G2 and G3. This time the promotes succeed. The groups that used to contain variants at the U level now contain variants at the T level. Group G1, which already contained B.T still contains it, although this is a different instance after the promote.

```
                        A         B
WV = U                 P --------P       G1: B.T, X.T
Promote Tool (G2, G3)                    G2: A.T, B.T, AB.T
                                         G3: B.T, Y.T

[ ]
                        T ------- T
                       [ ]
```

Now the promote tool is invoked to promote the variants in groups G2 and G3 up another level. This results in an error, because B.T is also in group G1, but G1 is not being promoted.

| WV = T | ERROR - B.T is also in G1 |
|---|---|
| Promote Tool (G2,G3) | |

The promote tool is invoked again to promote groups G1, G2, and G3. This time the promotes succeed. All of the groups now contain variants at the P level.

```
                           A         B
                          [ ]
WV = T                     P --------P     G1: B.P, X.P
Promote Tool (G1, G2,     [ ]              G2: A.P, B.P, AB.P
              G3)                          G3: B.P, Y.P
```

If the parts in a promote group belong to more than one variant domain, the parts can all be promoted without changing context as long as the variant map in context specifies a working variant for each of the variant domains.

There may be cases in which there is no variant map which includes all of the variant domains of the parts in a promote group. In such cases, only those parts visible using the current context will be promoted. The context should then be switched to one from which the other parts are visible, and the promote tool called again.

For example, suppose that the following variant maps are defined:

| M1: | Pay.R1.Prod | Com.R3.Prod |
|---|---|---|
| M2: | Pay.R1.Test | Com.R3.Test |
| M3: | Pay.R1.&USERID | Com.R3.Test |
| M4: | Inv.V2.Prod | Com.R3.Prod |
| M5: | Inv.V2.Test | Com.R3.Prod |
| M6: | Inv.V2.&USERID | Com.R3.Test |

Promote group G1 has been created and contains variants of three parts:

P1.Pay.R1.Fred
P2.Inv.V2.Fred
P3.Com.R3.Test

Context is set to variant map M3. The promote tool is invoked to promote the variants in G1. Based on the variant map path, P1.Pay.R1.Fred is promoted to Pay.R1.Test. P3.Com.R3.Test is not promoted because its variant ID is in both variant maps M3 and M2. Part P3 is not visible and is not promoted. Thus, the group now contains:

P1.Pay.R1.Test
P2.Inv.V2.Fred
P3.Com.R3.Test

Context is next set to variant map M6. The promote tool is again invoked to promote the variants in G1. Based on the variant map path. P2.Inv.V2.Fred is promoted to Inv.V2.Test, and P3.Com.R3.Test is promoted to Com.R3.Prod Thus, the group now contains:

P1.Pay.R1.Test
P2.Inv.V2.Test
P3.Com.R3.Prod

All variants in the group have now been promoted. If the promotes had first been performed with context set to the M6 map, and then with context set to the M3 map, the result after the first promotes would have been:

P1.Pay.R1.Fred
P2.Inv.V2.Test
P3.Com.R3.Prod and the end result would have been:

P1.Pay.R1.Test
P2.Inv.V2.Test
P3.Com.R3.Prod

The two orders differ in the intermediate result.

6.8 Order of Promote of Multiple Parts

In order to avoid relationship cardinality errors and dangling relationship instances at the promote-from or the promote-to level, as well as to avoid unnecessary delete propagation activity at the promote-to level, the promote tool uses the following algorithm to order the parts being promoted. (By "dangling relationship" is meant a relationship instance whose source or target does not exist or is not visible.)

Promote the parts from the promote-from level in this order:

1. Deleted parts:
   a. Relationships which are not the source or target of any deleted relationship at the promote-from level.
      (Repeat until no deleted relationships remain at this level. An easy way to accomplish this is to promote relationship instances in descending order of the number of entity part keys their part keys contain.)
   b. Entities.
2. Not-deleted parts:
   a. Entities.
   b. Relationships whose source and/or target are not at the promote-from level
      (Repeat until no relationships remain at this level. An easy way to accomplish this is to promote relationship instances in ascending order of the number of entity part keys their part keys contain.)

The promote tool uses the opposite order when it is canceling parts.

If Cancel operations are to be performed on some parts in the group, they must be performed before invoking the promote tool to promote the other parts.

7.0 RELATIONSHIP SEMANTICS

7.1 Logical and Physical Relationship Types

The interface for defining a relationship type allows it to be specified as either a LOGICAL or a PHYSICAL relationship type.

7.1.1 Logical Relationship Types

An instance of a LOGICAL relationship type connects a source part and a target part. The relationship instance is insensitive to the version keys of the source and the target. For any particular retrieval performed in logical mode via the relationship, the current context will determine which version of its target is retrieved.

Logical relationships are versioned exactly as entities are versioned. For a logical retrieval, the current context will determine which version of a relationship is used to reach the target.

Without user-defined attributes on relationships, the main reason for having more than one version of a relationship is to indicate, for example, that a relationship exists at the R1 level, but does not exist at the R2 level. (Another reason is to change the ordering of ordered relationships.)

The versioning of a non-owning relationship is completely independent of the versioning of its source and target. For example, either of the following is permissible:
- multiple versions of the source and target and a single version of the relationship
- a single version of the source and target parts, and multiple versions of the relationship The versions of an owning relationship are synchronized by the VDMS with the versions of the dependent entity. When the VDMS creates a new version of a dependent entity, it also automatically creates a new version of the owning relationship.

The part key of a logical relationship is the part key of its source plus the part key of its target. (If either the source or the target is another relationship, then its key has more than one component.) Just as for entities, the version key of a logical relationship consists of:
- its variant ID
- its variant time range
- its revision time range (See FIG. 8 for a diagrammatic presentation of this.)

A logical relationship will only be added if there are versions of both its source and target which cover the full variant and revision time ranges of the relationship.

All of the normal relationship semantics apply at the part level, not the instance level. This includes:
- Mandatory Semantic
- Controlling Semantic
- Relationship Cardinality as described in 8.0, Data Integrity.

A logical relationship can be retrieved using any action mode. Physical mode cannot be used to write logical relationship instance data to the repository.

7.1.2 Physical Relationship Types

An instance of a PHYSICAL relationship type connects one source instance and one target instance. It records information about instances (versions), not about parts. The relationship instance is therefore sensitive to the version keys of the source and the target. A retrieval performed via the relationship returns precisely the target instance. The current context has no effect on the retrieval.

Physical relationships are not versioned.

The instance key of a physical relationship is the instance key of its source plus the instance key of its target. (If either the source or the target is another relationship, then its key has more than one component.)

All of the normal relationship semantics apply at the instance level. This includes:
- Mandatory Semantic
- Controlling Semantic
- Relationship Cardinality as described in 8.0, Data Integrity.

Only actions using physical or literal modes can operate on physical relationships.

The only relationship types currently envisaged as physical relationships are those used to maintain derivation history. An instance records that one version was derived from another version. For further information on these relationships, see 3.5, Derivation Graph.

7.1.3 Rules for Logical and Physical Relationships

The following rules apply to logical and physical relationship types.

- A physical relationship may not be owning.
- A physical relationship may not be ordered.
- A physical relationship may only be mandatory for a source or target which is another physical relationship.
- A physical relationship may only be controlling for a source or target which is another physical relationship.
- A physical relationship may not be the source or target of a logical relationship.

7.2 Illustration of Search Paths and Logical Relationship Types

The following example illustrates the use of search paths and logical relationships. It deals with three entities and two relationships which constitute a small application called Print. Entity type Table contains stances of one part, "Empl". Entity type Column contains instances of two parts: "Serial" and "Office". Relationship type Has connects Table to Column; it contains instances of two parts: "Empl.Office" and "Empl.Serial".

In—Fig 'PTP' unknown—, the relationships have been drawn as boxes, in order to show their versioning. Dotted lines have been used to indicate that the Pay.R1.Jerry variants of Office and the relationship to it are logically deleted. For the sake of simplicity, variant and revision effective times are not considered.

These instances will be accessed by a root template called Table, mapping to the Table entity type and a subordinate template called Column, mapping to the Column entity type. The variant hierarchy that will be used is:

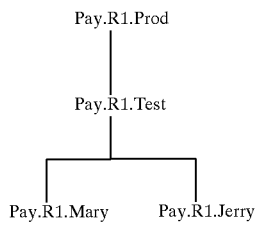

To begin, a FIRST KEYED action is performed on the Table template to retrieve a version of the Empl table, with the following parameter settings:

Action Mode: Logical
Variant Map: Pay.R1.Mary
The instance Empl.Pay.R1.Test is retrieved.

Then a FIRST UNQUALIFIED action is performed on the Column template. The domain of the Column template contains the first version of each related entity reached via the first version of the relationship. The determination of which version is first is based on the search path. Therefore, the domain consists of:

| Entity: | Reached Via: |
| --- | --- |
| Office.Pay.R1.Prod | Empl.Office.Pay.R1.Prod |
| Serial.Pay.R1.Mary | Empl.Serial.Pay.R1.Prod |

These two entity instances would be returned by the FIRST and a subsequent NEXT.

If, instead, the parameter settings were:
Action Mode: Logical
Variant Map: Pay.R1.Jerry
for the retrievals into the root and the subordinate templates, the domain of the Column template would contain the following:

| Entity: | Reached Via: |
| --- | --- |
| Serial.Pay.R1.Test | Empl.Serial.Pay.R1.Prod | since, from the "Jerry" point of view, this is the first instance of the Serial column, and the first instance of the Office column is logically deleted.

Next consider physical retrievals, with the parameter settings:
Action Mode: Physical
Variant Map: Pay.R1.Jerry
Now the domain of the Column template contains all of the entity versions on the search path reached by all of the relationship versions on the search path, including the logically deleted versions of each:

| Entity: | Reached Via: |
| --- | --- |
| ¬ Office.Pay.R1.Jerry | ¬ Empl.Office.Pay.R1.Jerry |
| Office.Pay.R1.Prod | ¬ Empl.Office.Pay.R1.Jerry |
| ¬ Office.Pay.R1.Jerry | Empl.Office.Pay.R1.Prod |
| Office.Pay.R1.Prod | Empl.Office.Pay.R1.Prod |
| Serial.Pay.R1.Test | Empl.Serial.Pay.R1.Prod |
| Serial.Pay.R1.Prod | Empl.Serial.Pay.R1.Prod |

Each of these entity instances would be returned in sequence, by a FIRST and subsequent NEXT actions. Note that each version of Office is returned twice, once via each version of the relationship. It is up to the tool using physical mode to make sense of the instances that are retrieved.

7.3 Create Timestamps of Relationship Sources and Targets

In the prior art, it was possible to have an entity with a given key, delete it, and then add another instance with the same key. Although the "before" and "after" instances would share the same key value, they really would be considered different entities. Their non-key attributes and their relationships would not be assumed to have anything in common. In fact, any relationships of which the original entity was the source or target, would have been deleted when the entity was deleted, and therefore would not apply to the new entity.

According to the VDMS of the present invention, however, instances representing both the original entity and the new entity with the same key can coexist. And if a relationship identifies its source and target only by their keys, a relationship created with the original entity as its source or target may mistakenly be treated as applicable to the new entity with the same key.

This is illustrated by an example that starts with the following data in the repository:
A.Prod B.Prod
where the variant hierarchy is:

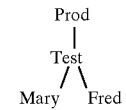

Suppose that, in parallel, Mary deletes A from her variant, and Fred adds a relationship from the existing A to B. The resulting repository data is:

| Source: | Rel: | Target: |
| --- | --- | --- |
| A.Prod | | B.Prod |
| ¬ A.Mary | | |
| | A.B.Fred | |

Next, Mary adds a new A, and Fred promotes his relationship to the Test level. The resulting repository data is:

| | | |
| --- | --- | --- |
| A.Prod | | B.Prod |
| | A.B.Test | |
| A.Mary | | |

Now the relationship that Fred added is visible to Mary, even though it was created with the old A as its source.

In order to recognize that the A Mary created is not the source of any relationships, the create timestamp of that instance is used. Each entity and relationship has a create timestamp that indicates when the part was added. If a part is logically deleted and then re-added, the resulting instance will have a different create timestamp. (For more information on create timestamps, see 3.14. Role of Create Time Stamp as an Identifier.)

In addition to its own create timestamp, each relationship instance also carries the create timestamps of its source and target. Thus, if a part which is the source or target of a relationship is deleted and re-added, as in the above example, there will be enough information in the relationship to determine that the new part is not its real source or target.

Consider the above example with timestamps added. Start with:

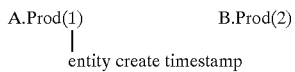
entity create timestamp

In parallel, Mary deletes A from her variant, and Fred adds a relationship from the existing A to B. The resulting repository data is:

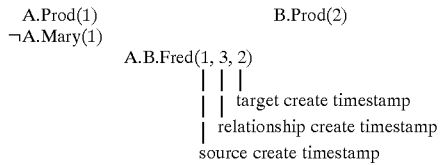

Next, Mary adds a new A, and Fred promotes his relationship to the Test level. The resulting repository data is:

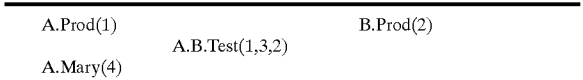

Because the VDMS recognizes that the relationship was created with a different A as its source, logical retrievals performed with Mary as the working variant will act as if that relationship were logically deleted. It will not be visible from the Mary point of view. Using physical or literal retrievals, however, that relationship will be visible.

Just as it is possible to add a relationship if there is a logically deleted version of it as the first version on the search path, it is also possible to add a relationship if the first version of it on the search path is not visible because the create timestamp of its source or target does not match the value stored in the relationship.

For example, continuing the above scenario, Mary could add relationship A.B at this point, resulting in:

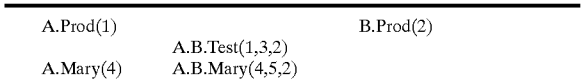

Note that if the target of a relationship is another relationship, even if the source and target create timestamps of the first relationship match those of its source and target, it will not be visible if the source and target create timestamps of the second relationship do not also match those of its source and target. For the general case of dealing with a series of connected relationships, to determine whether the "outermost" relationship is visible the create timestamps of all the entities and "inner" relationships must be taken into account.

7.4 Owning Relationships

Only logical relationship types may be defined as owning. An owning relationship causes the key of the target entity to be qualified by the key of the source. However, the key of the target is qualified only by the part key of the source, not its full (version) key. Thus, it is possible for there to be multiple versions of the source, and only one version of the target (or vice-versa).

Although the source and target of an owning relationship are separately versionable, the owning relationship and the dependent entity are still inseparable. The VDMS insures that all of the version key and non-key attributes of the owning relationship match those of the dependent entity. Whenever the VDMS does a drawdown or promote of the dependent entity, it also does a drawdown or promote of the owning relationship.

The examples to follow will deal with the following conceptual view.

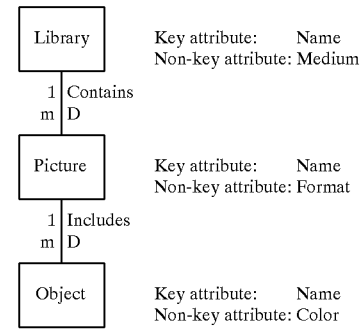

For the sake of simplicity, variant and revision effective times are not considered. The following instances are assumed to exist:

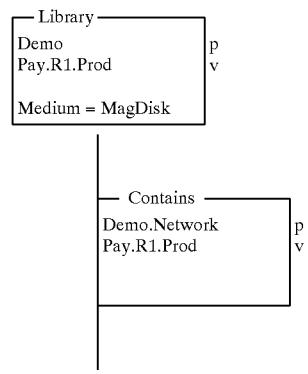

-continued

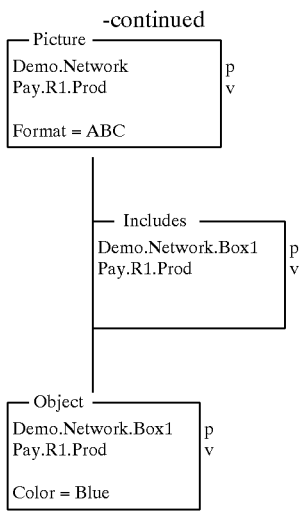

Note that boxes are used to represent relationship instances, in order to show their versions.

A logical mode update to entity Demo with the search path set to Pay.R1.Test would result in:

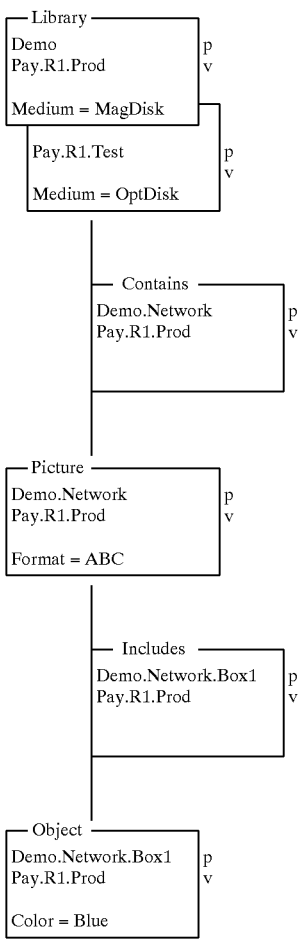

From the point of view of a search path starting at Pay.R1.Test, the user will see a blu Box1 in the ABC format Network picture in the Demo library on optical disk. From the point of view of a search path starting at Pay.R1.Prod, the user will see a blue Box1 in the ABC format Network picture in the Demo library on magnetic disk.

A logical mode update to entity Demo.Network with the same search path would then result in:

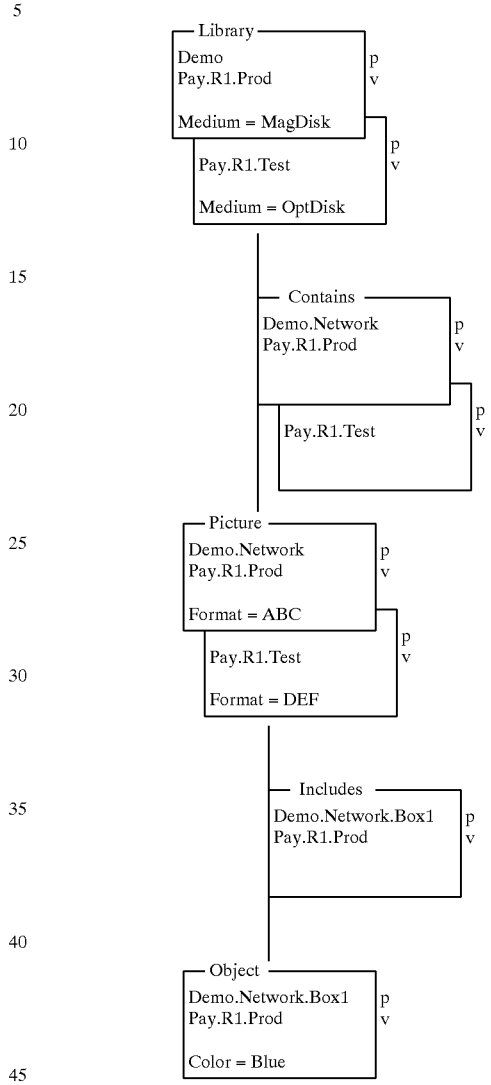

From the point of view of a search path starting at Pay.R1.Test, the user will see a blue Box1 in the DEF format Network picture in the Demo library on optical disk. From the point of view of a search path starting at Pay.R1.Prod, the user will see a blue Box1 in the ABC format Network picture in the Demo library on magnetic disk.

When a physical retrieval is performed into a subordinate template whose connecting relationship is not owning, the domain contains all pairings of the versions of the connecting relationship with the versions of its target. (See 7.2. Illustration of Search Paths and Logical Relationship Types) However, because an owning relationship and its target dependent entity are treated as one construct, with their versions completely synchronized, the domain of a subordinate template whose connecting relationship is owning contains only those pairings of versions of the connecting relationship with identical versions of the target.

For a physical mode retrieval using the example above, if Demo.Pay.R1.Test had been retrieved into a root template, the domain of a subordinate template mapping to the Picture entity type would include the following:

| Entity: | Reached Via: |
|---|---|
| Demo.Network.Pay.R1.Test | Demo.Network.Pay.R1.Test |
| Demo.Network.Pay.R1.Prod | Demo.Network.Pay.R1.Prod |

It would not include:

| Entity: | Reached Via: |
|---|---|
| Demo.Network.Pay.R1.Prod | Demo.Network.Pay.R1.Test |
| Demo.Network.Pay.R1.Test | Demo.Network.Pay.R1.Prod |

7.5 Ordered Logical Relationships

The position of an ordered logical relationship within the set of relationships having the same source or target is a property that can be changed from one version of a relationship to the next. (Without attributes on relationships, this is the only property that can be changed, other than the existence/non-existence of the relationship.)

Thus one might find the following instances of a relationship type which is ordered on the target end:

| Relationship | Position |
|---|---|
| A.B.Pay.R1.Prod | 1 |
| A.C.Pay.R1.Prod | 2 |
| A.D.Pay.R1.Prod | 3 |
| A.D.Pay.R1.Fred | 1 |
| A.C.Pay.R1.Fred | 2 |
| A.B.Pay.R1.Fred | 3 | where A is a source entity related to target entities B, C, and D. The relationships are ordered in opposite directions from the Prod and the Fred points of view.

However, ordering is really a property of a set of instances rather than a property of a particular instance. This is true regardless of the implementation chosen for determining the position of a relationship. It causes some differences between the way the VDMS handles ordered relationships and non-ordered relationships.

In the description to follow, the term "ordered relationship set" will refer to all relationship instances of a given type which have the same target key (if ordering is on the source end) or which have the same source key (if ordering is on the target end).

If instances which have the same source or target key do not have the same source or target create time, they are still considered to be in the same set. For purposes of applying the rules described below, dangling relationships instances in the set are treated like logically deleted instances in the set.

The basic difference between the handling of ordered relationships and non-ordered relationships is that all the members of an ordered relationship set are drawn down and promoted together. In fact, for a given level in the variant hierarchy, if there is a member of an ordered relationship set at that level, no member of the same set at a higher level is visible.

For example, given the following instances:

| Relationship | Position |
|---|---|
| A.D.Pay.R1.Prod | 1 |
| A.B.Pay.R1.Prod | 2 |

-continued

| Relationship | Position |
|---|---|
| A.C.Pay.R1.Prod | 3 |
| A.C.Pay.R1.Fred | 3 |
| A.B.Pay.R1.Fred | 4 | only A.C and A.B are visible from the Pay.R1.Fred point of view. This would have been produced by a scenario in which only A.B and A.C were originally at the Pay.R1.Prod level. A.B was repositioned to follow A.C at the Pay.R1.Fred level. Then A.D was added preceding A.B at the Pay.R1.Prod level.

If A.D were also visible at the Pay.R1.Fred level, there would be no basis for deciding whether it precedes or follows A.C. Although numbers are used here to show position, this is purely for reference purposes, and is not required. All the user must indicate to the VDMS is that A.D should precede A.B. But at the Pay.R1.Fred level, A.C also precedes A.B; this it is indeterminate which should come first?

As another example, if A.E were later added at the Pay.R1.Prod level following A.C, these instances would result:

| Relationship | Position |
|---|---|
| A.D.Pay.R1.Prod | 1 |
| A.B.Pay.R1.Prod | 2 |
| A.C.Pay.R1.Prod | 3 |
| A.E.Pay.R1.Prod | 4 |
| A.C.Pay.R1.Fred | 3 |
| A.B.Pay.R1.Fred | 4 |

Again, if A.E were visible from the Pay.R1.Fred level, it is indeterminate whether it should precede or follow A.B? Because this cannot be determined, and ordering is truly a property of a set, only instances at one level are visible.

The following principles apply to the handling of ordered relationships:

1. As stated above, for a given level in the variant hierarchy, if there is a member of an ordered relationship set at that level, no member of the same set at a higher level is visible.
2. To insure that all the members of an ordered relationship set are drawn down together, when the first member of an ordered relationship set is drawn down (either implicitly or explicitly), the VDMS automatically draws down all other members of the set. This includes members which are not visible (i.e., which are logically deleted or "dangling").
3. To insure that all the members of an ordered relationship set are promoted together, whenever the members of an ordered relationship set are spread across more than one promote group, all of those promote groups must be promoted together. This is an extension of the rule that if a part is in more than one promote group, all of those promote groups must be promoted together.
4. When the first member of an ordered relationship set is canceled, the VDMS automatically cancels all other members of the set.
5. A successful promote of the members of an ordered relationship set results in having exactly the same members visible from the promote-to level as were previously visible from the promote-from level. This is true even if new members have been added at the promote-to level and were visible there before the promote. In this case, force is required to accomplish the promote. If the members of an ordered relationship set are being promoted, and a new member of the same set has been added at the promote-to level (or is visible from there), a Promote Sync error results, and none of the members is promoted. This is analogous to what happens when a deleted entity is being promoted and a new relationship to it has been added at the promote-to level. (See 6.5, Timestamp Checking for Promote.) As a result, the Promote Tool causes a logically deleted instance of the new set member to be drawn down, with its force-required flag set. This deleted variant of the new set member is put in one of the promote groups containing other members of the set. If the Promote_Force tool is eventually invoked to again attempt a promote that includes the ordered relationship set, the logically deleted new member will also be promoted.

Continuing with the above example, assume the instances had the following attributes associated with them (where LC represents the last change timestamp, DD represents the drawdown-from timestamp, and FR represents the force required flag):

| Relationship | Position | LC | DD | FR |
|---|---|---|---|---|
| A.D.Pay.R1.Prod | 1 | 25 | — | N |
| A.B.Pay.R1.Prod | 2 | 10 | — | N |
| A.C.Pay.R1.Prod | 3 | 15 | — | N |
| A.E.Pay.R1.Prod | 4 | 30 | — | N |
| A.C.Pay.R1.Fred | 3 | 20 | 15 | N |
| A.B.Pay.R1.Fred | 4 | 20 | 10 | N |

If an attempt is made to promote A.C and A.B to Pay.R1.Test, the following state results (where ¬ represents a delete marker):

| Relationship | Position | LC | DD | FR |
|---|---|---|---|---|
| A.D.Pay.R1.Prod | 1 | 25 | — | N |
| A.B.Pay.R1.Prod | 2 | 10 | — | N |
| A.C.Pay.R1.Prod | 3 | 15 | — | N |
| A.E.Pay.R1.Prod | 4 | 30 | — | N |
| A.C.Pay.R1.Fred | 3 | 20 | 15 | N |
| A.B.Pay.R1.Fred | 4 | 20 | 10 | N |
| ¬ A.D.Pay.R1.Fred | — | 40 | 25 | Y |
| ¬ A.E.Pay.R1.Fred | — | 40 | 30 | Y |

When the Promote Force tool is later used to promote the members of the set to Pay.R1.Test, all of the members are promoted, including those that are logically deleted, resulting in the following:

| Relationship | Position | LC | DD | FR |
|---|---|---|---|---|
| A.D.Pay.R1.Prod | 1 | 25 | — | N |
| A.B.Pay.R1.Prod | 2 | 10 | — | N |
| A.C.Pay.R1.Prod | 3 | 15 | — | N |
| A.E.Pay.R1.Prod | 4 | 30 | — | N |
| A.C.Pay.R1.Test | 3 | 20 | 15 | N |
| A.B.Pay.R1.Test | 4 | 20 | 10 | N |
| ¬ A.D.Pay.R1.Test | — | 40 | 25 | N |
| ¬ A.E.Pay.R1.Test | — | 40 | 30 | N |

All of the members can now be promoted to the Pay.R1.Prod level using the Promote tool.

Another property of ordered relationships, not related to their "set" nature, is that when they are retrieved in physical or literal mode, the ordering is not reflected in the retrieval sequence. Instead, instances are returned in alphanumeric sequence. Relationship ordering is a logical property which can only be discovered when the instances are accessed in logical mode.

7.6 Other Relationship Semantics

The interpretation of other relationship semantics for logical relationships, such as mandatory, controlling, and cardinality, are all discussed in detail in 8.2, Basic Data Integrity Enforcement.

8.0 DATA INTEGRITY

The term "data integrity" is used herein to refer to a state of repository data in which conditions defined by all of the following mechanisms are met:

Mandatory Semantic
    A relationship type may be defined as mandatory for its source or target (or both). If a relationship type is mandatory for its source, a source part cannot be created without also creating a relationship during the same commit scope. Nor can a relationship be deleted without also deleting its source during the same commit scope. Similar conditions are enforced if a relationship type is mandatory for its target.

Controlling Semantic
    A relationship type may be defined as controlling for its source or target (or both). If a relationship type is controlling for its source, when the user deletes a relationship part, the VDMS automatically deletes its source as well. Similar action is taken if a relationship type is controlling for its target.

Referential Integrity (relationship add)
    A relationship instance of any type cannot exist unless its source and target both exist. (A relationship without a source or target is commonly referred to as a dangling relationship.)

Referential Integrity (source/target delete)
    A relationship instance of any type cannot exist unless its source and target both exist. To enforce this, when the source or target of a relationship is deleted, the VDMS automatically deletes the relationship. This is referred to as delete propagation.

Relationship Cardinality
    Cardinality is specified on each end of a relationship type. A cardinality of 1 on the target end means that there cannot be more than one relationship instance with the same source and different targets. The reverse is true for a cardinality of 1 on the source end. Relationship types can be m-m, m-1, 1-m, or 1-1.

Integrity Policies
    Integrity policies can be defined to perform a test at the time an instance is written to the repository. Completion of the write is conditional upon the policy test returning a value of 1. The test may be any REXX expression, including one which invokes a VDMS function that returns a 1 or 0.

Because integrity policies are enforced immediately, they are only used to check for conditions that are created or destroyed within a single user interaction with the repository. This means that their checking tends to be confined to the contents of a single entity or relationship.

IM Constraints
    Information Model (IM) constraints can be defined to perform some test at the end of a commit scope. Completion of the commit is conditional upon the constraint being met. Constraints are checked code supplied by the VDMS.

Because constraints are not enforced until commit time, they are used to check for conditions that are created or destroyed within the course of a series of user interactions with the repository. This means that their checking tends to span entities related via any number of intervening relationships.

8.1 Protected Points of View

It is considered that the enforcement of data integrity is a central function provided by the VDMS. However, data integrity is always enforced "logically" from a particular point of view. If there is a complex aggregation of instances in the repository, with multiple versions of the entities and relationships that comprise it, different instances will be visible using different search paths. Thus, there may be a data integrity violation when the aggregation is viewed from one point of view, but not from another.

There are as many points of view from which data integrity can be enforced as there are combinations of variant time ranges, revision time ranges, and variant maps. It is possible to enforce data integrity from all of these points of view (except those based on variant maps in alternate hierarchies). However, there are two reasons why this is impractical:

There is a tremendous performance penalty if data integrity must be enforced from a large number of points of view. For example, if there were 500 constraints and 100 points of view, 50,000 checks would have to be made just to do constraint checking.

This prevents a change which is valid from 99 points of view from being made if it is not valid from one point of view, even if that point of view was intended to model a "what if" situation, and was never intended to be promoted into production. This has been described as "one user holding 99 users hostage."

Therefore, mechanisms are provided by which the user can control which points of view are used to enforce data integrity. Those points of view will be called protected points of view. The others, which are not used to enforce data integrity, will be called unprotected. The user can specify:

which variant maps are protected which points in variant time are protected which points in revision time are protected Each combination of a protected variant map, a protected point in variant time, and a protected point in revision time defines a protected point of view. All other combinations represent unprotected points of view.

It should be emphasized that the user is required to specify what points of view are to be protected. In general, it is expected that variant maps involving the &USERID levels of the primary variant hierarchies will be unprotected, while the variant maps above them, particularly those involving production levels of the primary variant hierarchy, will be protected. (No variant map in an alternate hierarchy may be protected.)

8.2 Basic Data Integrity Enforcement

The timing of data integrity enforcement for logical mode UPDATE, ADD, and DELETE actions is substantially the same as that provided in the prior art. For these actions, as well as for RENAME, COPY, PROMOTE, and CANCEL, the following conditions are enforced immediately:

Controlling Semantic

Referential Integrity (relationship add)

Referential Integrity (source/target delete)

Relationship Cardinality

Integrity Policies while the following conditions are enforced at commit time:

Mandatory Semantic

IM Constraints (Note that for conditions enforced at commit time, the VDMS must remember what the current context was when the triggering action was performed.)

The VDMS of the present invention enforces data integrity from every protected point of view. In addition, for actions which use the variant map in the current context to perform a change, it enforces data integrity from the point of view of that variant map. This includes all logical mode actions, as well as PROMOTE and CANCEL in any mode. The PROMOTE action is special in that both the variant map in the current context and the variant map above it in the variant map path are treated as "current," and the VDMS enforces data integrity from both points of view. This enforcement is a no-operation for the point of view of the variant map in the current context, because the action does not change that point of view.

If an action would result in a violation of data integrity, the VDMS may take one of three courses of action:

Automatically perform additional actions that will preserve data integrity. This course of action is followed for Controlling Semantic and Referential Integrity (source/target delete), but only for the point of view defined by the current context. The VDMS will never perform an action automatically for a point of view other than that in context. For these other points of view, the controlling semantic is simply not enforced while referential integrity is enforced by the third course of action, as described below.

The reason the controlling semantic is not enforced from protected points of view other than that in context is the nature of the controlling semantic when used without the mandatory semantic. The mere existence of the controlled part without the relationship is not an integrity violation as long as the relationship is not also mandatory for the part. Treat this as an error condition. This course of action is followed for the data integrity conditions listed below for the point of view defined by the current context:

Referential Integrity (relationship add)

Relationship Cardinality

Integrity Policies

Mandatory Semantic

IM Constraints

The same course of action is followed for all protected points of view other than that defined by the current context for all of these conditions except referential integrity, which is enforced by the third course of action, as described below.

Some of these error conditions are detected immediately, while others are detected at commit time. For those detected immediately, control is returned to the invoker without performing the requested action, and without the violation. For those detected at commit time, control is returned to the invoker without performing the commit, but with the violation still present.

Perform the action without returning an error code. Present the resulting data to the user in such a way that data integrity is logically preserved. This course of action is followed for the data integrity conditions listed below for all points of view other than that defined by the current context:

Referential Integrity (source/target delete)

Referential Integrity (relationship add)

Both of these conditions result in "dangling relationships." The VDMS will treat relationship instances which physically exist, but are "dangling" from some point of view, as logically non-existent from those points of view. This is described in detail in 8.2.3, Tolerance of Dangling Relationships.

8.2.1 Special Consideration for Promote Action

All of the data enforcement described above for the point of view of the current context also applies to the promote-to level when a PROMOTE action is performed.

See 6.4, Data Integrity Checking at Promote Time for further considerations.

8.2.2 Alternate Search Paths

Since only variant maps used for update can be protected, and variant maps which have nodes associated with alternate variant hierarchies cannot be used for update, data integrity is never enforced based on alternate search paths.

8.2.3 Tolerance of Dangling Relationships

The VDMS will treat a relationship instance as not visible from a given point of view if either its source or its target (or both) is not visible from that point of view. Such a relationship instance behaves like a logically deleted instance. It is necessary in order to deal with cases where a single variant ID in one variant domain maps to more than one variant ID in another variant domain. Consider. the following example, using variant domains Pay and Com as shown below:

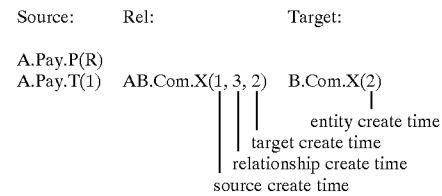

We start with two entities and a relationship, all at the Map1 level.

| Source: | Rel: | Target: |
|---|---|---|
| A.Pay.U | AB.Com.Y | B.Com.Y |

When the user promotes all of these instances to the Map2 level, the resulting data is:

A.Pay.T AB.Com.X B.Com.X

From the Map2 point of view, both entities and the relationship are all visible. However, from the Map3 point of view, the relationship source is not visible. The VDMS handles this situation by making the relationship invisible (as if it were logically deleted) if its source or target is not visible. Therefore, from the Map3 point of view, only entity B is visible.

The ability to tolerate dangling relationships, treating them as invisible, has not been provided for in the prior art because it has been deemed infeasible. Such a relationship could reappear later (inappropriately) when its source or target was added. A continuation of the above example will illustrate this. Assuming that a user makes Map3 the current variant map and adds an instance of A:

| Source: | Rel: | Target: |
|---|---|---|
| A.Pay.P<br>A.Pay.T | AB.Com.X | B.Com.X |

Before this action, there was neither an A nor any relationships involving A visible from the Map3 level. After adding A, not only is A visible, but it has a relationship to B, which is probably not desired, since this is a completely different A from the one at the Pay.T level.

The remedy for this problem is the source and target create timestamps on relationships. which were described in 7.3, Create Timestamps of Relationship Sources and Targets. As explained in that section, a relationship will not be visible even if instances of its source and target parts are visible, unless their create timestamps match those stored in the relationship. So if create timestamps are added to the above example, it will be seen that when A is added at the Map3 level, it is not born with a relationship, because its create timestamp will be different from the source create timestamp in the relationship.

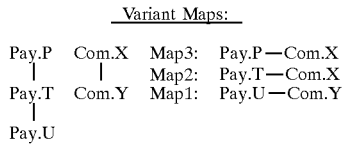

Once a dangling relationship has been introduced into the repository, the VDMS will tolerate it, making it invisible from points of view where it has no source or target. However, this is still considered to be an atypical situation. If the VDMS did not normally delete a relationship when its source or target was deleted, and if it normally allowed a relationship to be added when its source or target was missing, large numbers of useless dangling relationships would accumulate in the repository, degrading performance.

Therefore, at least for the variant map which is current when an action is performed, the VDMS will still delete a relationship when its source or target is deleted, and will still not allow a relationship to be added when its source or target is missing. But if an action performed using one variant map causes a dangling relationship from the point of view of another variant map, even a protected one, this will not be treated as a violation of data integrity.

Without templates mapping to relationships, a relationship whose source or target does not physically exist cannot be retrieved in logical, physical, or literal modes. One implication of this is that it cannot be deleted.

8.2.4 Special Considerations for Literal Mode Actions

The following special considerations apply to data integrity enforcement for literal mode actions.

Since data integrity is always enforced from a logical point of view for logical relationships, the data integrity implications of literal mode actions are sometimes surprising. For example, because literal mode DELETEs physically remove instances, they can have the same end effect as logical mode ADDs (by removing a logically deleted instance and exposing a "live" one), or they can have no effect on the data as viewed logically (by removing a "live" instance and exposing another "live" instance). And because literal mode ADDs and UPDATEs can turn the delete marker on, they can have the same end effect as logical mode DELETEs.

Literal mode actions affect instances whose variant IDs are explicitly specified. They do not use the variant map specified in context. Therefore, data integrity is only enforced for protected points of view, not for any non-protected point of view identified by the current context when a literal action was performed.

Even the data integrity enforcement performed for the protected points of view is more limited than that performed for logical mode actions. In cases where a logical mode delete would trigger another delete of an entity or a logical relationship, a literal mode action will not. The primary reason for this is that a triggered action may require a drawdown. While logical actions can automatically perform drawdowns, literal actions do not. They operate instead on instances with an explicitly specified variant ID.

The two cases where one logical mode action triggers another action are the deletion of the source or target of a logical relationship and the deletion of a controlling logical relationship. When the former occurs in literal mode, any relationship with the deleted source or target will no longer be visible from points of view for which the source or target is not visible. When the after occurs in literal mode, no special action will be taken.

The reason no special action is taken in this case lies in the nature of the controlling semantic when used without the mandatory semantic. As noted above, the mere existence of a controlled part without a controlling relationship is not an integrity violation as long as the relationship is not also mandatory for the part.

There is a basic assumption that a tool using literal mode knows exactly what instances it waits to end up with, and will perform the actions required to accomplish this. This is a reasonable assumption given that literal mode is restricted to use via tools supplied by VDMS and is primarily in support of exporting and importing data. If enough data is imported, data integrity requirements are satisfied without the VDMS having to take actions automatically. If insufficient data has been imported, an error will result.

8.3 Tool Operation Using Non-Protected Points of View

It is assumed that for most users, the leaf levels of the variant hierarchy will be unprotected. (It is a restriction that no level that uses the &USERID variable can be protected.) Therefore, in most cases, tools will be operating using an unprotected point of view. The question then arises regarding how a tool should cope with the fact that data integrity can be lost.

There are two ways that a loss of data integrity can impact a tool.
1. The tool may fail or make incorrect decisions because it is unable to handle data with integrity violations.
2. The tool will not be able to promote data with integrity violations from an unprotected level to a protected level.

Tools must be "defensively" coded so as to avoid the first impact. There are two levels of defense. A sophisticated tool will have code that understands and checks for any prohibited conditions, such as an entity with an "includes" relationship to itself. A less sophisticated tool will not need to understand the prohibited conditions, but will have code to check whether data it reads has changed since a time when it knows there was data integrity for its point of view. If such a change has occurred, there is a chance that data integrity has been lost.

Short of locking all the data it cares about, there is no way known for a tool to avoid the second impact. This impact is basically the same problem all tools that run on a work station face when they are ready to put data back into a host repository. There is a risk that the changes made on the work station are inconsistent with data on the host that is not being replaced. This is completely analogous to a situation in which changes made at an unprotected level in the repository are inconsistent with data visible at higher levels. In both cases (when data is put back on the host or when data is promoted), a commit at the target level in the repository will fail. The tool either needs to reconcile the two sets of data, or restart at a point where there was no inconsistency.

The following is a recommended protocol for a tool running directly against the repository.
1. The VDMS will provide a tool to check data integrity for a particular point of view. When the user tool is first invoked, it is expected to run this tool to insure that there is data integrity for the point of view that will be used.
2. If there is data integrity for the point of view that will be used, the user tool is expected to record the time returned to it by the data integrity tool as a "base time."
3. The user tool then reads any data that it needs in order to perform its task. If the timestamp of any entity retrieved shows that it has changed since the base time, the tool may either assume that integrity has been lost and start over, or re-run the integrity checking tool to confirm this.
4. If there is still data integrity for the point of view being used, the user tool performs its changes. If the user tool re-reads data before updating or deleting it, and finds that an instance at the working variant level has changed since the base time, the change must not proceed. Successful changes will result in some data being drawn down.

The user tool may additionally want to re-read data which it is not changing, but whose contents it used to determine the changes, and abort the changes if any of this data has changed since the base time.
5. When the user tool has finished its changes, it may or may not want to promote the changes to a protected level. If it does, the VDMS will insure that there is data integrity at the protected level at the time the promotes are committed.
6. If data has been left at the unprotected level, and the user tool has more work to do, it may continue using the original base time, or it may re-run the data integrity tool to move the base time forward. In either case, it will perform more reads and make more changes, and repeat step 5.

Any data that has been left (not promoted) at the unprotected level runs the risk of becoming inconsistent with data visible at higher levels. However, it is expected that user tools will commonly accept this risk for long periods of time.

It should be noted that data integrity for an unprotected point of view can only be lost when a change has been made at a higher level in the variant hierarchy to a part that was not drawn down to the unprotected level. Therefore, a user can minimize the frequency with which data integrity can be lost by minimizing either the direct updating of higher levels in the hierarchy or parallel development activity which results in promotes by one user into the search path of another.

8.4 Mandatory Semantic Examples

The mandatory semantic is violated if a relationship type is mandatory for its source or target, and retrievals would return an instance of the source or target part type, but no instance connected to it via the relationship type.

When a relationship type is mandatory for its source or target, the source or target cannot be added unless the relationship is also added during the same commit scope. Nor can the relationship be deleted unless the source or target is also deleted during the same commit scope. This semantic is always enforced from a logical point of view.

This is illustrated by the examples below. All of the data integrity examples will involve parts in variant domains Pay and Com shown below.

Varient Maps:

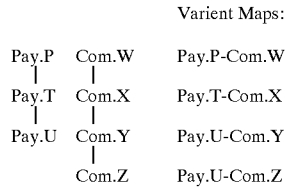

| Pay.P | Com.W | Pay.P-Com.W |
| Pay.T | Com.X | Pay.T-Com.X |
| Pay.U | Com.Y | Pay.U-Com.Y |
|       | Com.Z | Pay.U-Com.Z |

The first set of examples assumes that the following instances exist, where the relationship typo is logical and is mandatory or the target:

| Source: | Rel: | Target: |
|---|---|---|
| A.Pay.P | A.B.Pay.P | B.Pay.P |
|         | A.B.Pay.T | B.Pay.U |
|         | A.C.Com.W | C.Com.W |

If the action mode is logical, the variant map in context is Pay.T-Com.X, and the following actions are performed:
Delete A.B
Delete A.C
Add D in the Pay version domain
leaving the repository in the state:

| A.Pay.P | A.B.Pay.P | B.Pay.P |
|---|---|---|
|  | ¬ A.B.Pay.T | B.Pay.U |
|  | A.C.Com.W | C.Com.W |
|  | ¬ A.C.Com.X |  |
|  |  | D.Pay.T |

The mandatory semantic will cause the subsequent commit to fail unless the tool also does the following:
Delete B
Delete C
Add a relationship to D
This would leave the repository in the following state:

| A.Pay.P | A.B.Pay.P | B.Pay.P |
|---|---|---|
|  | ¬ A.B.Pay.T | ¬ B.Pay.T |
|  |  | B.Pay.U |
|  | A.C.Com.W | C.Com.W |
|  | ¬ A.C.Com.X | ¬ C.Com.X |
|  | A.D.Pay.T | D.Pay.T |

Even in this case, the subsequent commit would fail if the maps including Pay.U were protected, since from the Pay.U point of view, B is not the target of a relationship.

Now consider starting with the same instances, but using literal mode to delete A.B.Pay.T and A.C.Com.W, leaving the repository in the following state:
A.B.Pay.T and A.C.Com.W literally deleted

| A.Pay.P | A.B.Pay.P | B.Pay.P |
|---|---|---|
|  |  | B.Pay.U |
|  |  | C.Com.W |

The deletion of A.B.Pay.T had no effect on the logical state of the data, since whatever points of view used to see A.B.Pay.T now see A.B.Pay.P. But the deletion of A.C.Com.W does leave C visible, with no relationship, from all points of view. Thus, if any map is protected, the subsequent commit will fail unless the tool also deletes C.Com.W, leaving the repository in the following state:

| A.Pay.P | A.B.Pay.P | B.Pay.P |
|---|---|---|
|  |  | B.Pay.U |

(If no map were protected, the subsequent commit could have succeeded. In literal mode, the current context is not used, and the mandatory semantic would not be enforced even for the point of view of that context.)

Now consider again starting with the original instances and performing a literal update of A.B.Pay.T to turn on its delete marker, add a logically deleted A.C.Com.X, and add a "live" D.Pay.T. This results in exactly the same repository data as the corresponding actions in logical mode, as shown above. And because data integrity is enforced from a logical point of view, it has exactly the same effect if the points of view with violations are protected. That is, the mandatory semantic will cause the subsequent commit to fail unless the tool also does the following:

add a logically deleted B.Pay.T
add a logically deleted C.Com.X
add a "live" A.D.Pay.T The second set of examples involves a physical relationship. A physical relationship can only be mandatory for a source or target which is another physical relationship. Assume that the following instances exist, where both relationship types are physical and the first relationship is mandatory for the second one which is its target:

| Source: | Rel1: | Target (Rel2): |
|---|---|---|
| A.Pay.P | A.Pay.P.B.Pay.P.C.Pay.P | B.Pay.P.C.Pay.P |

A physical relationship cannot be deleted in logical mode. If the first relationship is deleted in physical or literal modes, the mandatory semantic will cause the subsequent commit to fail unless the tool also physically deletes B.Pay.P.C.Pay.P, leaving the repository in the following state:
A.Pay.P 8.5 Controlling Semantic Examples When a relationship which is controlling for its source or target is deleted, the VDMS automatically deletes the controlled part. The effect of this semantic depends on whether the deleted relationship is logical or physical, and on the action mode of the original delete.

If the relationship type is logical and the original delete was logical, the controlled part is logically deleted using the current variant map in context.

If the relationship type is logical and the original delete was physical (done in literal mode), the controlling instance is not deleted unless the relationship is owning and the controlled part is the dependent.

If the relationship type is physical, the controlled instance is physically deleted. This is true whether the original delete used physical or literal mode. (Note that a physical relationship can only be controlling for another physical relationship.)

This is illustrated by the examples below. The first set of examples assumes that the following instances exist, where the relationship type is logical and is controlling for the target:

| Source: | Rel: | Target: |
|---|---|---|
| A.Pay.P | A.B.Pay.P | B.Pay.P |
|  | A.B.Pay.T | B.Pay.U |
|  | A.C.Com.W | C.Com.W |

If the action mode is logical, the variant map in context is Pay.T-Com.X, and both A.B and A.C are deleted, the controlling semantic will cause B to be drawn down and logically deleted at the Pay.T level and C to be drawn down and logically deleted at the Com.X level:

A.B and A.C logically deleted
 with variant map 'Pay.T-Com.X'

| A.Pay.P | A.B.Pay.P | B.Pay.P |
|---|---|---|
|  | ¬ A.B.Pay.T | ¬ B.Pay.T |
|  |  | B.Pay.U |
|  | A.C.Com.W | C.Com.W |
|  | ¬ A.C.Com.X | ¬ C.Com.X |

Notice that from either variant map including Pay.U, B is visible, but the relationship A.B is not visible. (If the only way of finding B was via this relationship, it can no longer be found from the Pay.U point of view.) However, because the relationship is not mandatory, this is not considered to be an error, even if the variant maps including Pay.U are protected. The delete is successful.

Starting with the same instances but using literal mode to delete A.B.Pay.T has no effect on the logical state of the data, since whatever points of view used to see A.Pay.T now see A.Pay.P. 'A.B.Pay.T' literally deleted

| A.Pay.P | A.B.Pay.P | B.Pay.P |
|---|---|---|
|  |  | B.Pay.U |
|  | A.C.Com.W | C.Com.W |

However, using literal mode to delete A.C.Com.W. does have an effect on the logical state of the data. In any event, no delete is triggered by the controlling semantic, and the repository is left in the state:

| P.Pay.P | A.B.Pay.P | B.Pay.P |
|---|---|---|
|  |  | B.Pay.U |
|  |  | C.Com.W |

Because the relationship is not mandatory, this is not considered to be an error.

Starting again with the original instances and performing a literal update of A.B.Pay.T turns on its delete marker. No delete is triggered by the controlling semantic, and the repository is left in the state:

'A.B.Pay.T' literally updated

| A.Pay.P | A.B.Pay.P | B.Pay.P |
|---|---|---|
|  | ¬ A.B.Pay.T | B.Pay.U |
|  | A.C.Com.W | C.Com.W |

Although for any variant map including Pay.T, B is visible and A.B is not visible, this is not considered to be an error.

The second set of examples involves a physical relationship. A physical relationship can only be controlling for a source or target which is another physical relationship. Assume that the following instances exist, where both relationship types are physical and the first relationship is controlling for the second one, which is its target:

Source: Rel1: Target (Rel2):
A.Pay.P A.Pay.P.B.Pay.P.C.Pay.P B.Pay.P.C.Pay.P

A physical relationship cannot be deleted in logical mode. If it is deleted in physical or literal modes, the controlling semantic will cause B.Pay.P.C.Pay.P to be deleted as well, leaving the repository data in the following state:

'A.Pay.P.B.Pay.P.C.Pay.P' literally deleted
A.Pay.P 8.6 Referential Integrity (Relationship Add) Examples A relationship cannot be added unless its source and target both exist.

This is illustrated by the examples below. The first set of examples assumes that the following instances exist, where the relationship type is logical.

| Source: | Rel: | Target: |
|---|---|---|
| A.Pay.P |  | C.Pay.P |
| ¬ A.Pay.U |  |  |
| B.Com.W |  |  |
| ¬ B.Com.X |  |  |

If the action mode is logical and the variant map in context is Pay.T-Com.X, or if the action mode is literal, an attempt to add A.C (in the Pay variant domain) and B.C (in the Com variant domain) would result in the following instances:

A.C and B.C logically added
 with variant map 'Pay.T-Com.X'

| A.Pay.P | A.C.Pay.T | C.Pay.P |
|---|---|---|
| ¬ A.Pay.U |  |  |
| B.Com.W | B.C.Com.X |  |
| ¬ B.Com.X |  |  |

From the point of view of the current context, A.C has both a source and a target. But from any map which includes Pay.U, A.C has no source. As described in 8.2.3, Tolerance of Dangling Relationships, even if those maps are protected, this will be allowed. Via those maps, the A.C relationship is not visible.

From the point of view of the current context, B.C has no source. Therefore, using logical mode, whether the map in context is protected or not, the add of B.C will fail immediately. Using literal mode the current context has no special significance. The add of B.C.Com.X does not produce an error. The relationship is simply not visible if its source and target are not visible.

The second set of examples assumes that the following instance exists, where the relationship type is physical.

Source: Rel: Target:
 B.Pay.P

A physical relationship cannot be added in logical mode. If the relationship A.Pay.P.B.Pay.P is armed in either physical or literal mode, the action will fail. An instance of A.Pay.P must be added first.

8.7 Referential Integrity (Source/Target Delete) Examples

When an instance which is the source or target of a relationship is deleted, the VDMS automatically deletes the relationship. For purposes of this discussion, these will be called "affected relationships." The effect of delete propagation depends on whether the affected relationship is logical or physical, and on the action mode of the original delete.

If the affected relationship is logical and the original delete was logical, the affected relationship is logically deleted using the current search path in context.

If the affected relationship is logical and the original delete was physical (done in literal mode), the delete is not propagated unless the affected relationship was owning and the originally deleted instance was the dependent.

If the affected relationship is physical and the original delete was physical, the affected relationship is physically deleted.

If the affected relationship is physical and the original delete was logical, the delete is not propagated.

In all cases, even if the action would leave some other point of view (protected or unprotected) in a state where there is no source or target for the affected relationship, the action will be performed anyway. The affected relationship will not be visible from such a point of view.

This is illustrated by the examples below. The first set of examples assume that the following instances exist, where the relationship type is logical.

| Source: | Rel: | Target: |
|---|---|---|
| A.Pay.P | A.B.Pay.P | B.Pay.P |
| A.Pay.T | A.B.Pay.U | |
| | A.C.Com.W | C.Com.W |

If the action mode is logical, the variant map in context is Pay.T-Com.X, and A is deleted, delete propagation will cause AB to be drawn down and logically deleted at the Pay.T level and A.C to be drawn down and logically deleted at the Com.X level:

'A' logically deleted
   with variant map 'Pay.T-Com.X'

| A.Pay.P | A.B.Pay.P | B.Pay.P |
|---|---|---|
| ¬ A.Pay.T | ¬ A.B.Pay.T | |
| | A.B.Pay.U | |
| | A.C.Com.W | C.Com.W |
| | ¬ A.C.Com.X | |

Notice that from either variant map including Pay.U, relationship A.B has no source. No error will result, even if those variant maps are protected. The relationship will not be visible via those maps.

Starting with the same instances, but using literal mode to delete A.Pay.T, there is no effect on the logical state of the data, since whatever points of view used to see A.Pay.T now see A.Pay.P.

'A.Pay.T' literally deleted

| A.Pay.P | A.B.Pay.P | B.Pay.P |
|---|---|---|
| | A.B.Pay.U | |
| | A.C.Com.W | C.Com.W |

But if literal mode is then used to delete A.Pay.P. no delete propagation would occur and the repository would be left in the state:

'A.Pay.P' literally deleted

| A.B.Pay.P | B.Pay.P |
|---|---|
| A.B.Pay.U | |
| A.C.Com.W | C.Com.W |

None of the relationships has a source from any point of view. However, the VDMS tolerates this state. None of the relationships will be visible from any point of view.

Starting again with the original instances and performing a literal update of A.Pay.T turns on its delete marker. No delete propagation would occur, and the repository would be left in the state:

'A.Pay.T' literally updated

| A.Pay.P | A.B.Pay.P | B.Pay.P |
|---|---|---|
| ¬ A.Pay.T | A.B.Pay.U | |
| | A.C.Com.W | C.Com.W |

This leaves the relationships with no source for any variant maps including Pay.T or Pay.U. This is not treated as an error. The relationships are simply not visible from those points of view.

The second set of examples assume that the following instances exist, where the relationship type is physical.

| Source: | Rel: | Target: |
|---|---|---|
| A.Pay.P | A.Pay.P.B.Pay.P | B.Pay.P |

If the action mode is logical, the variant map in context is Pay.P-Com.W, and A is deleted, no delete propagation will occur:

'A' logically deleted
   with variant map 'Pay.P-Com.W'
   ¬A.Pay.P A.Pay.P.B.Pay.P B.Pay.P The physical relationship now relates a logically deleted instance to a "live" instance.

Starting the same instances, but using literal mode to delete A.Pay.T, delete propagation will cause the relationship to be deleted as well:

'A.Pay.P' literally deleted
   B.Pay.P 8.8 Relationship Cardinality Examples

If a relationship type has a cardinality of 1 on the target end, there cannot be more than one relationship instance with the same source and different targets. The reverse is true for a cardinality of 1 on the source end.

This is illustrated by the examples below. The first set of examples assumes that the following instances exist, where the relationship type is logical, and has a cardinality of 1 on the target end.

| Source: | Rel: | Target: |
|---|---|---|
| A.Pay.P | A.B.Pay.U | B.Pay.P |
| | | C.Com.W |

If the action mode is logical and the variant map in context is Pay.T-Com.X, or if the action mode is literal, an attempt to add A.C in the Pay variant domain would result in the following instances:

A.C logically added
   with variant map 'Pay.T-Com.X'

| A.Pay.P | A.B.Pay.U | B.Pay.P |
|---|---|---|
| | A.C.Pay.T | C.Com.W |

From the point of view of Pay.T, only the relationship A.C is visible, but from the Pay.U point of view, both A.B and A.C are visible, and cardinality is violated. Therefore, if the maps including Pay.U are protected, the action will fail immediately.

Starting with the following instances:

| A.Pay.P | A.B.Pay.U | B.Pay.P |
|---|---|---|
| | A.C.Pay.P | C.Com.W |
| | ¬ A.C.Pay.T | | and using a literal mode action to turn off the delete marker of A.C.Pay.T, as shown below:

| A.Pay.P | A.B.Pay.U | B.Pay.P |
|---|---|---|
| | A.C.Pay.P | C.Com.W |
| | A.C.Pay.T | | produces exactly the same violation as the preceding example, and has exactly the same effect.

The second set of examples assumes that the following instances exist, where the relationship type is physical and has a cardinality of 1 on the target end.

| Source: | Rel: | Target: |
|---|---|---|
| A.Pay.P | A.Pay.P.B.Pay.P | B.Pay.P |
| | | C.Com.W |

A physical relationship cannot be added in logical mode. If the relationship A.Pay.P.C.Com.W is added in physical or literal mode, the action will violate cardinality and fail immediately.

8.9 Integrity Policies

In general, integrity policies only test conditions within a single instance. In this case, versioning has no effect on the result (except that version attributes can be tested). The specification of variables to be used for accessing the version attributes in REXX expressions will be part of the design activity.

If an integrity policy tests related instances (by invoking a VDMS function), the success or failure of the test is determined entirely by the code in the function invoked. It may use any action mode and any context setting. It may check all points of view or only one. But it will only be invoked once, not once per point of view.

8.10 IM Constraints

In general, constraints test conditions that span multiple instances. In this case, versioning does have an effect on what versions of other parts are retrieved and tested. Constraints are stated as though there is one version of each part, and are enforced from logical points of view, like all other data integrity conditions.

As stated in 8.2, Basic Data Integrity Enforcement, constraints are enforced from every protected point of view. In addition, if the action which triggered the constraint uses the variant map in the current context to perform a change, data integrity is also enforced from the point of view of that map.

The implications of this for how the constraint checker behaves are described in 9.0, Constraint Checking.

9.0 CONSTRAINT CHECKING

The constraint checker will be galled for every physical alteration to an entity instance or relationship instance. This implies that if a user request results in many alterations, such as relationship propagations, then the constraint checker is called for each alteration. The full part, variant, and revision key of the instance involved is passed to the exit, as well as the mode in which the action was performed, and the variant map in the current context.

The constraint checker is called once at commit time to perform constraint checking. The constraint checker queries the primary variant hierarchy definition to determine for which search paths constraint checking must be performed, i.e. the ones for which data integrity is to be checked. To improve performance the constraint checker limits checking to only those search paths that include instances that were actually altered. For example, if only leaf user levels were altered then the constraint checker will not check search paths for higher nodes on the hierarchy such as the test or production nodes.

The constraint checking process will then consist of a loop, one iteration for each search path that needs to be checked. For each such search path the constraint checker will set up a temporary current context that has as its search path the particular search path to be checked. When finished checking all the needed search paths, the constraint checker will restore the original current context.

To reduce its own complexity the constraint checker may run in logical mode and ignore version information in the list of which instances were altered. This may require the constraint checker to perform additional testing that would not be required if it operated in physical mode and factored in the version information. If any of the search paths fails the constraint checking then the constraint checker will return an error indication back to the VDMS. The constraint checker will still check all the needed paths, even after a given search path fails, in order to produce messages for all constraint violations.

For a particular search path, the constraint checker must check all variant times for every time interval for which there was any alteration. It need be only as fine grained as to all the variant start and end times for instances that exist which overlap with these time intervals.

10.0 VERSIONING TOOLS 10.1 Promote/Cancel Tool

This tool operates on visible instances in the specified promote group(s) which are at the working variant level of the current variant map. It PROMOTEs them up one variant map at a time. Since multiple promote groups can be specified, multiple promote groups can be promoted within one commit scope.

This section describes this tool in terms of PROMOTE, however, the behavior applies to CANCEL also. By visualizing CANCEL as PROMOTE without writing the instances at the promote-to variant, the behavior as a CANCEL tool will be obvious.

This tool is passed the following information in its parameter template:
A list of one or more promote group names. This parameter is optional.
If this tool is passed the name of one or more promote groups, it promotes every visible member of the promote group(s) that is at the working variant level of the current variant map
If this tool is not passed the name of any promote group, it promotes every visible part that is at the working variant level of the current variant map, provided promotion is allowed upwards from the working variant.
If any instance to be promoted is in more than one promote group, all of those promote groups must be promoted at once. If this rule is violated, a list of the additional promote groups will be passed back to the caller.
This tool runs in physical mode and honors the time cursors in that mode. The time cursors may define a range of times. It is not sensitive to LOGICAL, PHYSICAL, and LITERAL mode. The CALL action does not support the specification of mode, nor is there any requirement to do so.

11.0 PROCESS FLOW FOR GROUPING UPDATES

Figure 15A:
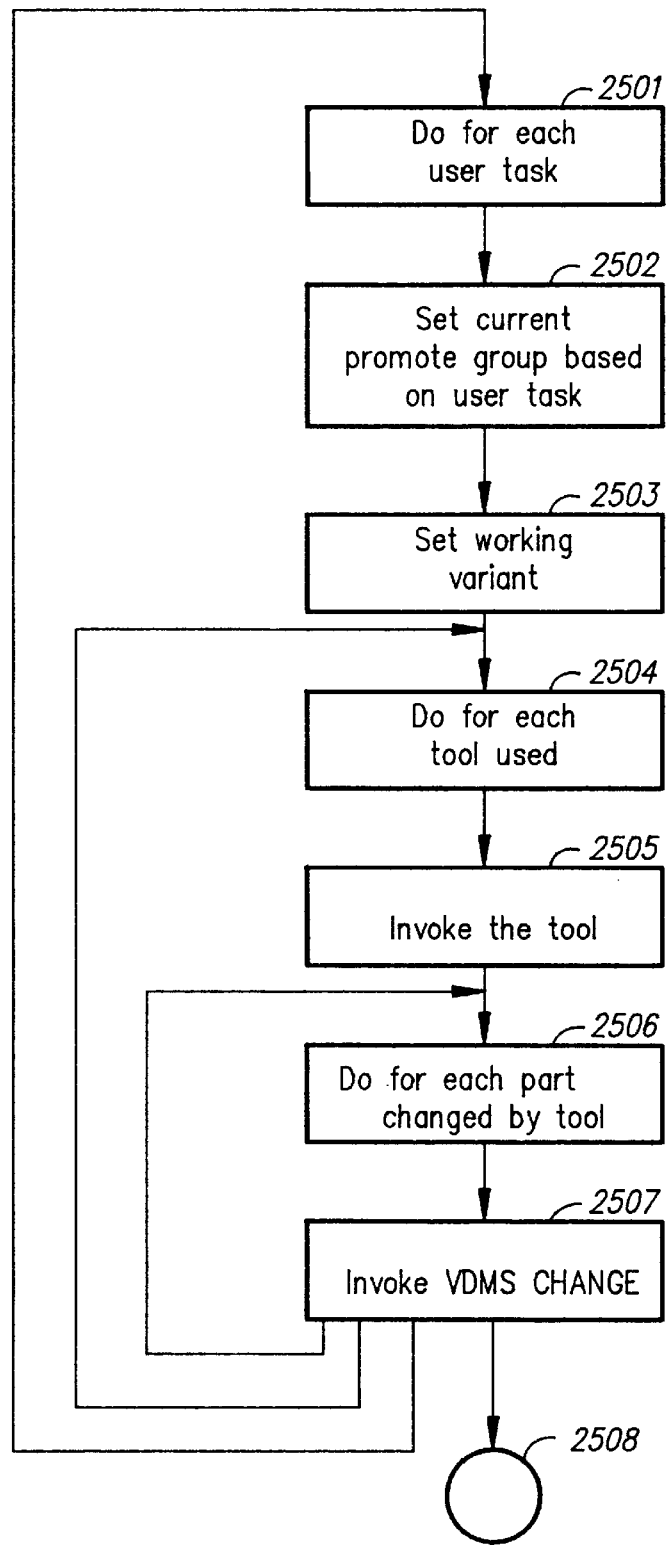
FIGS. 15a and 15b is a flowchart illustrating the main portion of the process flow for grouping updates associated with a task.
Figure 15B:
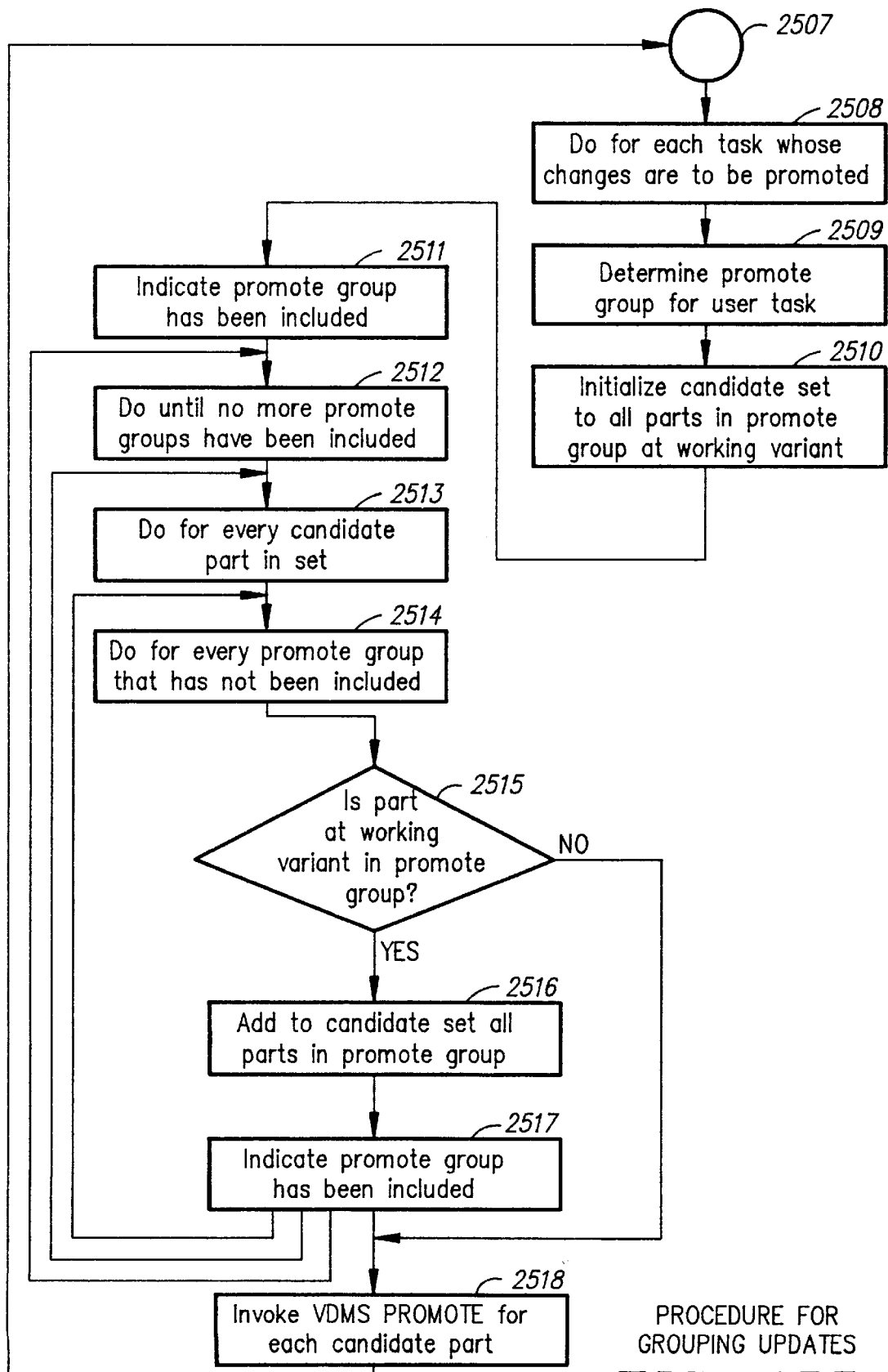

FIG. 15 shows in flowchart form the process for grouping updates associated with a task according to the present invention. The main portion of the process start at 2501 by performing steps 2501 to 2507 for each user task. At 2502, the current promote group is set to the promote group that is associated with the user task. At 2503, the working variant to which the changes are to be applied is set. At 2504, a loop is entered, encompassing 2505 to 2507, for each tool to be used to accomplish the user task. The tool is invoked at 2505. At 2506, step 2507 is iterated for each part that is changed by the tool. 2507 itself invokes the VDMS CHANGE subprocess to perform the change to the part. At 2508, a loop is entered, encompassing 2509 to 2518, for each user task whose changes are to be promoted. At 2509, the promote group associated with the user task is determined. At 2510, the candidate set of parts to be promoted is initialized to all the parts in the determined promote group that are at the working variant level. It is indicated at 2511 that the determined promote group has been included. At 2512, a loop in entered, encompassing 2513 to 2517, until no more promote groups have been included. At 2513, a loop in entered, encompassing 2514 to 2517, for each candidate part in the set. At 2514, a loop in entered, encompassing 2515 to 2517, for each promote group that has not been included. At 2515 it is determined whether the part at the working variant level is in the promote group that has not been included. If the part at the working variant level is in the promote group then at 2516 the candidate set of parts is increased by all the parts at the working variant level that are in the promote group that has not been included. If the part at the working variant level is in the promote group then it is indicated at 2517 that the promote group has been included. At 2518, the VDMS PROMOTE subprocess is invoked for each part in the candidate set.

Figure 16:
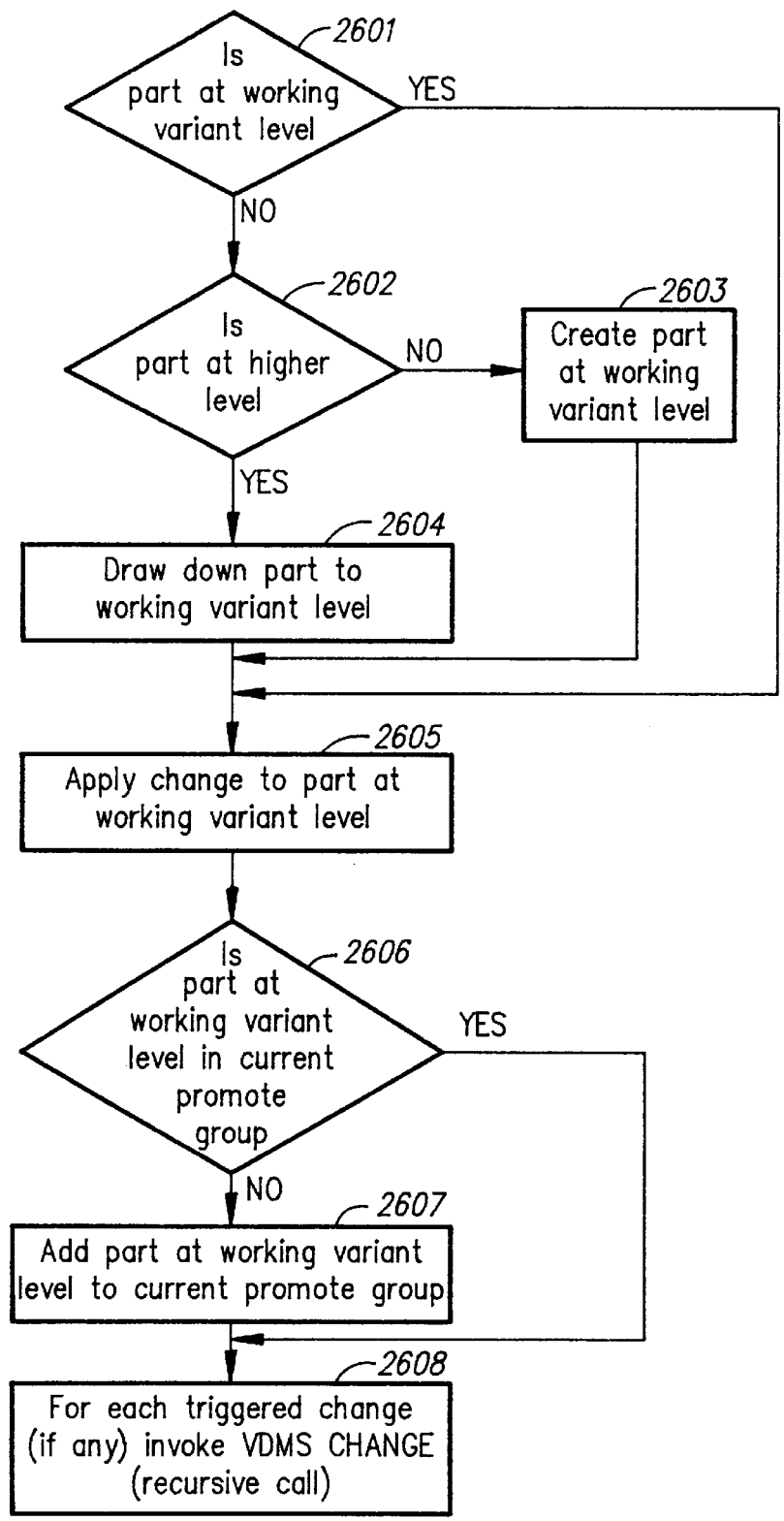
FIG. 16 is a flowchart illustrating the VDMS CHANGE subprocess of the process flow for grouping updates associated with a task.

FIG. 16 shows in flowchart form the details of the VDMS CHANGE subprocess. At 2601 a determination is made whether the part is at the working variant level. If the part is not at the working variant level then it is determined at 2602 whether the part has a version at a higher level. If the part does not have a version at a higher level then the part is created at the working variant level at 2603. If the part does have a version at a higher level then the part is drawn down to the working variant level at 2604. At 2605 the change is applied to the version at the working variant level. At 2606 it is determined whether the part at the working variant level is in the current promote group. If the part at the working variant level is not in the current promote group then the part is added at the working variant level to the current promote group at 2607. For each triggered change, if any, the VDMS CHANGE subprocess is called at 2608 to perform the triggered change to the other part. This is a recursive call.

Figure 17:
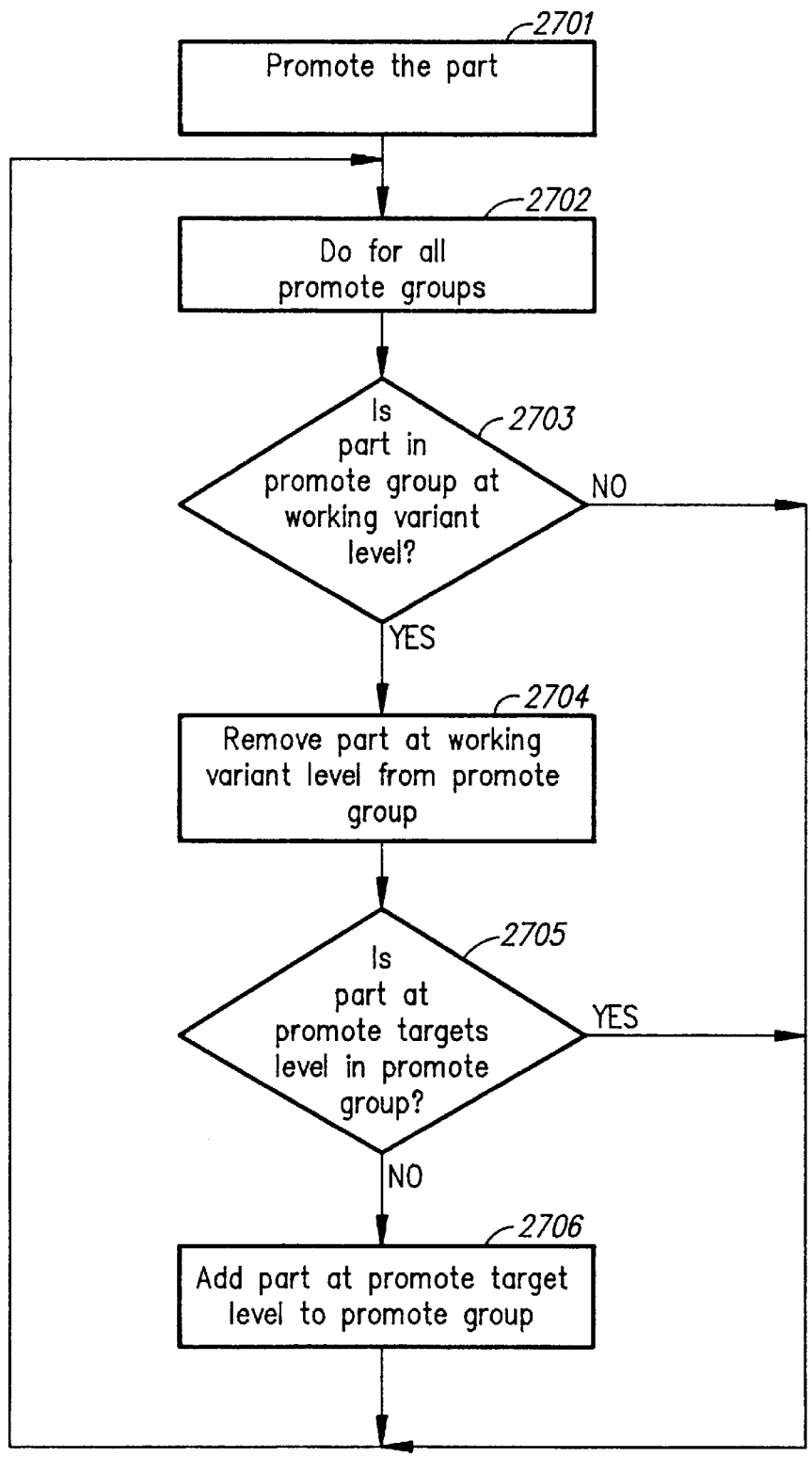
FIG. 17 is a flowchart illustrating the VDMS PROMOTE subprocess of the process flow for grouping updates associated with a task.

FIG. 17 shows in flowchart form the details of the VDMS PROMOTE subprocess. At 2701 the part is promoted. At 2702, a loop is entered, encompassing 2702 to 2706, for all promote groups. At 2703 it is determined whether the promote group contains the promoted part at the working variant level. If the promote group contains the promoted part at the working variant level then the part at the working variant level is removed from the promote group at 2704. If the promote group contains the promoted part at the working variant level then it is determined at 2705 whether the promote group contains the part at the promote target level (the next higher level). If the promote group does not contain the part at the promote target level then at 2706 the part is added at the promote target level to the promote group.

12.0 EXAMPLE OF GROUPING UPDATES

The following example is intended to illustrate by example the overall process for grouping updates associated with a task.

(1) The user sets the current promote group to TASK_ONE to indicate that she is working on task one. At this point the contents of the promote group TASK_ONE are empty. (2) The user sets the working variant to USER. (3) The user updates part PART1. In response to the user update the VDMS draws down PART1 to the USER level and the update is applied at the USER level. The part at the USER level is added to the promote group TASK_ONE. At this point the contents of the promote group TASK_ONE are:

PART1 at USER (4) The user deletes part PART2. In response to the user delete the VDMS draws down PART2 to the USER level and the delete is applied at the USER level. The delete of PART2 causes the VDMS to trigger a delete of PART3. In response to the triggered delete the VDMS draws down PART3 to the USER level and the delete is applied at the USER level. At this point the contents of the promote group TASK_ONE are:

PART1 at USER
PART2 at USER
PART3 at USER (5) The user sets the current promote group to TASK_TWO to indicate that she is working on task two. At this point the contents of the promote group TASK_TWO are empty, (6) The user sets the working variant to USER. (7) The user updates part PART1, meaning that PART1 was involved with both task one and task two. In response to the user update the VDMS updates PART1 at the USER level (it was already drawn down to the USER level in a previous step). The part at the USER level is added to the promote group TASK_ONE. At this point the contents of the promote group TASK_TWO are:

PART1 at USER (8) The user updates part PART4. In response to the user update the VDMS draws down PART4 to the USER level and the update is applied at the USER level. The part at the USER level is added to the promote group TASK_TWO. At this point the contents of the promote group TASK_TWO are:

PART1 at USER
PART4 at USER (9) The user sets the current promote group to TASK_THREE to indicate that she is working on task three. At this point the contents of the promote group TASK_THREE are empty. (10) The user sets the working variant to USER. (11) The user updates part PART5. In response to the user update the VDMS draws down PART5 to the USER level and the update is applied at the USER level. The part at the USER level is added to the promote group TASK_THREE. At this point the contents of the promote group TASK_THREE are:

PART5 at USER

(12) The user now desires to promote the changes associated with task two from the USER level to the TEST level. (13) The set of candidate parts to be promoted is initially set to the parts in promote group TASK_TWO that are at the USER level, namely:

PART1 at USER
PART4 at USER

For each candidate part it is identified which other promote groups that are not already included (if any) contain the part at the USER level. For PART1, promote group TASK_ONE also includes the part at the USER level. This means that in order to promote the changes associated with task two the user will also have to promote the changes associated with task one. All the parts in promote group TASK_ONE at the USER level are added to the set of candidate parts. The set of candidate parts is now:

PART1 at USER
PART2 at USER
PART3 at USER
PART4 at USER

For each candidate part it is identified which other promote groups that are not already included (if any) contain the part at the USER level. No other promote groups are identified, therefore the set of candidate parts is complete. Hence, the changes associated with task three will not have to be promoted. (14) The user promotes the set of candidate parts from the USER level to the TEST level meaning that parts PART1, PART2, PART3, and PART4 are promoted. (15) As a result of each promote, the VDMS updates all the promote groups that contain the part at the USER level to reflect that the part is now at the TEST level. At this point the contents of the promote group TASK_ONE are:

PART1 at TEST
PART2 at TEST
PART3 at TEST

At this point the contents of the promote group TASK_TWO are:

PART1 at TEST
PART4 at TEST

(16) The user discovers a problem with the change to PART1 associated with task one. (17) The user sets the current promote group to TASK_ONE to indicate that she is working on task one. (18) The user sets the working variant to USER. (19) The user updates part PART1. In response to the user update the VDMS draws down PART1 to the USER level and the update is applied at the USER level. The part at the USER level is added to the promote group TASK_ONE. At this point the contents of the promote group TASK_ONE are:

PART1 at USER
PART1 at TEST
PART2 at TEST
PART3 at TEST

Note that PART1 is in the promote group twice, once for the USER level and once for the TEST level. (20) The user desires to to promote the changes associated with task one from the USER level to the TEST level. (21) The set of candidate parts to be promoted is initially set to the parts in promote group TASK_ONE that are at the USER level, namely:

PART1 at USER

Note that PART2 and PART3 are in the promote group only at the TEST level and hence are not included in the set of candidate parts. For each candidate part it is identified which other promote groups that are not already included (if any) contain the part at the USER level. No other promote groups are identified, therefore the set of candidate parts is complete. (22) The user promotes the set of candidate parts from the USER level to the TEST level, meaning that part PART1 is promoted. (23) As a result of the promote, the VDMS updates all the promote groups that contain the part at the USER level to reflect that the part is now at the TEST level. Since promote group TASK_ONE already has PART1 at the TEST level, it does not have to be added to the promote group. At this point the contents of the promote group TASK_ONE are:

PART1 at TEST
PART2 at TEST
PART3 at TEST 13.0 CONCLUSION

Using the foregoing specification the invention may be implemented via standard programming and/or engineering techniques. The resulting program(s) may be stored on disk, diskettes. memory cards, ROM or any other memory device. For execution, the program(s) may be copied into the system memory (RAM) associated with the CPU. One skilled in the art of computer science will readily be able to combine the software created as described with appropriate general purpose or special purpose computer hardware to create a computer system embodying the invention. While the invention has been particularly described and illustrated with reference to a preferred embodiment, it will be understood by those skilled in the art that changes in the description or illustrations may be made with respect to form or detail without departing from the spirit and scope of the invention.

What is claimed is:

1. In a versioned data management system, a computer-implemented method for managing promotion of contents of the versioned data management system in response to changes to the contents resulting from execution of a single user task among a plurality of user tasks, the contents of the versioned data management system including a plurality of parts, each part being either an entity or a relationship of the versioned data management system, the method comprising the steps of:

providing a plurality of promote groups associated with the user tasks, each promote group of the plurality of promote groups including a list of parts, and their variant levels, changed as a result of execution of a respective user task of the plurality of user tasks;

receiving identification of a promote group of the plurality of promote groups to be associated with part changes;

responsive to a part change, placing the changed part and its variant level in the identified promote group;

responsive to a request to promote the parts at a first variant level and in a designated promote group, determining a set of parts which are candidates for promotion; and responsive to a promotion of a variant of a part in the designated promote group, updating the variant level entries of other promote groups which include the part at the first variant level to indicate a second variant level, higher than the first variant level, for the promotion.

2. A method as recited in claim 1, wherein said step of determining a set of parts which are candidates for promotion further comprises the substeps of:

a. designating to the set of parts which are candidates all parts at the first variant level and in the designated promote group, b. identifying other promote groups containing parts in the set of parts which are candidates for promotion at the first variant level, c. adding to the set of parts which are candidates for promotion all parts in the identified other promote groups, and d. repeating substeps 2b and 2c for the added parts until substep 2b identifies no other promote group.

3. A method as recited in claim 2, wherein every user task has an associated promote group.

4. A method as recited in claim 2, wherein changed parts include any parts explicitly changed by user tools and triggered changes performed by the versioned data management system.

5. A method as recited in claim 4, wherein a changed part appears multiple times in the promote group, each appearance having a different variant level.

6. A data storage apparatus tangibly embodying a program of machine-readable instructions executable by a digital processing apparatus to perform method steps to manage contents of a versioned data management system in response to changes to the contents resulting from execution of a single user task among a plurality of user tasks, the contents of the versioned data management system including a plurality of parts, each part being either an entity or a relationship of the versioned data management system, said method steps comprising:

provided a plurality of promote groups associated with the user tasks, each promote group of the plurality of promote groups including a list of parts, and their variant levels, changed as a result of execution of a respective user task of the plurality of user tasks;

receiving identification of a promote group of the plurality of promote groups to be associated with part changes;

responsive to part changes that occur, placing the changed parts and their corresponding variant levels in the identified promote group;

responsive to a request to promote the parts at a first variant level and in a designated promote group, designating a set of parts that are candidates for promotion; and responsive to a promotion of a variant of a part in the designated set, updating the variant level entries of other promote groups that include the part at the first variant level to indicate a second variant level, higher than the first variant level, for the promotion.

7. The data storage apparatus of claim 6, wherein the step of designating a set of parts that are candidates for promotion further comprises the substeps of:

designating to the set of parts that are candidates all parts at the first variant level and in the designated promote group;

identifying other promote groups containing parts in the set of parts that are candidates for promotion at the first variant level;

adding to the set of parts that are candidates for promotion all parts in the identified other promote groups; and repeating the identifying and adding substeps for the added parts until the identifying substep identifies no other promote group.

8. The data storage apparatus of claim 7, wherein every user task has an associated promote group.

9. The data storage apparatus of claim 7, wherein changed parts include any parts explicitly changed by user tools and triggered changes performed by the versioned data management system.

10. The data storage apparatus of claim 9, wherein a changed part appears multiple times in the promote group, each appearance having a different variant level.

* * * * *